US005760901A

United States Patent [19]
Hill

[11] Patent Number: 5,760,901
[45] Date of Patent: Jun. 2, 1998

[54] METHOD AND APPARATUS FOR CONFOCAL INTERFERENCE MICROSCOPY WITH BACKGROUND AMPLITUDE REDUCTION AND COMPENSATION

[75] Inventor: Henry A. Hill, Tucson, Ariz.

[73] Assignee: Zetetic Institute, Tucson, Ariz.

[21] Appl. No.: 789,885

[22] Filed: Jan. 28, 1997

[51] Int. Cl.$^6$ .................................................. G01B 9/02
[52] U.S. Cl. ........................... 356/345; 356/349; 356/351
[58] Field of Search .................................. 356/345, 349, 356/351, 359, 360

[56] References Cited

U.S. PATENT DOCUMENTS

| | | |
|---|---|---|
| 4,213,706 | 7/1980 | Hill et al. . |
| 4,304,464 | 12/1981 | Hill et al. . |
| 4,340,306 | 7/1982 | Bacasubramanian . |
| 4,818,110 | 4/1989 | Davidson . |
| 5,112,129 | 5/1992 | Davidson et al. . |
| 5,248,879 | 9/1993 | Keastons et al. . |
| 5,321,501 | 6/1994 | Swanson et al. . |

OTHER PUBLICATIONS

D. A. Agard and J. W. Sedat, "Three–Dimensional Analysis of Biological Specimens Utilizing Image Processing Techniques," *Proc. Soc. PhotoOpt. Instrum. Eng., SPIE*, 264, pp. 110–117, 1980.

D. A. Agard, R. A. Steinberg, and R. M. Stroud, "Quantitative Analysis of Electrophoretograms: A Mathematical Approach to Super–Resolution," *Anal. Biochem.* 111, pp. 257–268, 1981.

D. A. Agard, Y. Hiraoka, P. Shaw, and J. W. Sedat, "Fluorescence Microscopy in Three Dimensions," *Method Cell Biol.* 30, pp. 353–377, 1989.

D. A. Agard, "Optical Sectioning Microscopy: Cellular Architecture in Three Dimensions," *Annu. Rev. Biophys. Bioeng.* 13, pp. 191–219, 1984.

Y. Hiraoka, J. W. Sedat, and D. A. Agard, "The Use of a Charge–Coupled Device for Quantitative Optical Microscopy of Biological Structures," *Sci.* 238, pp. 36–41, 1987.

W. Denk, J. H. Strickler, and W. W. Webb, "Two–Photon Laser Scanning Fluorescence Microseopy," *Sci.* 248, pp. 73–76, 1990.

J. Kristian and M. Blouke, "Charge–coupled Devices in Astromomy," *Sci. Am.* 247, pp. 67–74, 1982.

M. Davidson, K. Kaufman, I. Mazor, and F. Cohen, "An Application of Interference Microscope to Integrated Circuit Inspection and Metrology," *SPIE*, 775, pp. 233–247 (1987).

J. Schwider and L. Zhou, "Dispersive Interferometric Profilometer," *Opt. Lett.* 19(13), pp. 995–997 (1994).

(List continued on next page.)

*Primary Examiner*—Samuel A. Turner
*Attorney, Agent, or Firm*—Cahill, Sutton & Thomas P.L.C.

[57] ABSTRACT

A system discriminates an in-focus image from an out-of-focus image so as to reduce both systematic and statistical errors in a measurement of the in-focus image. The system produces a probe beam and a reference beam from a point source, and antisymmetric spatial properties are produced in the reference beam. An in-focus return probe beam is produced as a result of directing a probe beam into an in-focus image point, and antisymmetric spatial properties are produced in the in-focus return probe beam. The reference beam is interfered with a beam from an out-of-focus image point, and the reference beam is interfered with the in-focus return probe beam. The reference beam is detected by a single-pixel detector as a square of an amplitude of the reference beam, and the in-focus return probe beam is detected by the detector as an interference term between a return reference beam and the in-focus return probe beam. An amplitude of an interference term between an amplitude of the out-of-focus image beam and an amplitude of the return reference beam is substantially reduced, resulting in reducing both systematic and statistical errors in data produced by the detector. In the described embodiment, the beam from the out-of-focus image point is an out-of-focus return probe beam.

39 Claims, 41 Drawing Sheets

OTHER PUBLICATIONS

U. Schnell, E. Zimmermann, and R. Dändliker, "Absolute Distance Measurement With Synchronously Sampled White–Light Channelled Spectrum Interferometry," *Pure Appl. Opt.* 4, pp. 643–651 (1995).

D. K. Hamilton and C. J. R. Sheppard, "A Confocal Interference Microscope," *Optica Acta* 29(12), pp. 1573–1577 (1982).

C. Zanoni, "Differential Interferometer Arrangements for Distance and Angle Measurements: Principles, Advantages, and Applications," *VDI Berichte NR.* 749, pp. 93–106, (1989).

K. Takada, N. Takato, J. Noda, and Y. Noguchi, "Characterization of Silica–Based Waveguides with a Interferometric Optical Time–Domain Reflectometry System Using a 1.3–μ—m Wavelength Superluminescent Diode," *Opt. Lett.* 14(13), pp. 706–708 (1989).

W. Drexler, C. K. Hitzenberger, H. Sattmann, and A. F. Fercher, "Measurement of the Thickness of Fundus Layers by Partial Coherence Tomography," *Opt. Eng.* 34(3), pp. 701–710 (1995).

E. A. Swanson, J. A. Izatt, M. R. Hee, D. Huang, C. P. Lin, J. S. Schuman, C. A. Puliafito, and J. G. Fujimoto, "In Vivo Retinal Imaging by Optical Coherence Tomography," *Opt. Lett.* 18(21), pp. 1864–1866 (1993).

L. Deck and P. de Groot, "High–Speed Noncontact Profiler Based on Scanning White–Light Interferometry," *Appl. Opt.* 33(31), pp. 7334–7338 (1994).

K. Kuba, S.–Y. Hua, and M. Nonmi, "Spatial and Dynamic Changes in Intracellular $Ca^{2+}$ Measured by Confocal Laser–Scanning Microscopy in Bullfrog Sympatetic Ganglion Cells," *Neurosci. Res.* 10, pp. 245–259 (1991).

C. Bliton, J. Lechleiter and D. E. Clapham, "Optical Modifications Enabling Simultaneous Confocal Imaging With Dyes Excited by Ultraviolet–and Visible–Wavelength Light," *J. Microsc.* 169(Pt. 1), pp. 15–26 (1993).

J. B. Pawley, "Fundamental and Practical Limits in Confocal Light Microscopy," *Scanning* 13, pp. 184–198 (1991).

J. E. Wampler and K. Kutz, "Quantitative Fluorescence Microscopy Using Photomultiplier Tubes and Imaging Detectors," *Methods Cell Biol.* 29, pp. 239–267 (1989).

Z. Jericevic, B. Wiese, J. Bryan, and L. C. Smith, "Validation of an Imaging System: Steps to Evaluate and Validate a Microscope Imaging System for Quantitative Studies," *Methods Cell Biol.* 30, 47–83 (1989).

R. C. Youngquist, S. Carr, and D. E. N. Davies, "Optical Coherence–Domain Reflectometry: A New Optical Evaluation Technique," *Opt. Lett.* 12(3), pp. 158–160 (1987).

K. Takada, I. Yokohama, K. Chida, and J. Noda, "New Measurement System for Fault Location in Optical Waveguide Devices Based on an Interferometric Technique," *Appl. Opt.* 26(9), p. 1603–1606 (1987).

C. J. R. Sheppard and C. J. Cogswell, "Three–dimensional Imaging In Confocal Microscopy," *Confocal Microscopy*, edited by T. Wilson, (Academic Press, London), pp. 143–169 (1990).

M. Born and E. Wolf, *Principles of Optics*, Section 8.6.3, (Pergamon Press, New York) 1959.

C. J. R. Sheppard, "Scanning optical microscopy," *Advances in optical and electron microscopy*, 10, (Academic, London) (1987).

C. J. R. Sheppard and A. Choudhury, *Optica Acta*, 24 (10), pp. 1051–1073 (1977).

C. J. R. Sheppard and C. J. Cogswell, *J. Microscopy*, 159(Pt 2), pp. 179–194 (1990).

C. J. R. Sheppard and T. Wilson, *Optics Lett.*, 3, pp. 115–117 (1978).

C. J. R. Sheppard, D. K. Hamilton, and I. J. Cox, *Proc. R. Soc. Lond.*, A 387, pp. 171–186 (1983).

M. Gu and C. J. R. Sheppard, *Appl. Opt.*, 31(14), pp. 2541–2549, (1992).

C. J. R. Sheppard and X. Q. Mao, *J. Opt. Soc. Am. A*, 6(9), pp. 1260–1269 (1989).

E. Wolf, *Opt. Commun.*, 1, pp. 153–156 (1969).

S. Kawata, O. Nakamura, T. Noda, H. Ooki, K Ogino, Y. Kuroiwa, and S. Minami, "Laser Computed–Tomography Microscope," *Appl. Opt.* 29, pp. 3805–3809 (1990).

M. Pétran and M. Hadravsky, "Tandem–Scanning Reflected–Light Microscope," *J. Opt. Soc. A.* 58(5), pp. 661–664 (1968).

G. Q. Xiao, T. R. Corle, and G. S. Kino, "Real–Time Confocal Scanning Optical Microscope," *Appl. Phys. Lett.* 53, pp. 716–718 (1988).

H. J. Tiziani and H.–M. Uhde, "Three–Dimensional Analysis by a Microlens–Array Confocal Arrangement," *Appl. Opt.* 33(4), pp. 567–572 (1994).

T. Zapf and R. W. Wijnaendts–van–Resandt, "Confocal Laser Microscope For Submicron Structure Measurement," *Microelectronic Engineering* 5, pp. 573–580 (1986).

J. T. Lindow, S. D. Bennett, and I. R. Smith, "Scanned Laser Imaging for Integrated Circuit Metrology," *SPIE*, 565, pp. 81–87 (1985).

M. Montag, J. Kululies, R. Jörgens, H. Gundlach, M. F. Trendelenburg, and H. Spring, "Working with the Confocal Scanning UV–Laser Microscope: Specific DNA Localization at High Sensitivity and Multiple–Parameter Fluorescence," *J. Microsc(Oxford)* 163 (Pt. 2), pp. 201–210 (1991).

M. Abramowitz and I. A. Stegun, *Handbook of Mathematical Functions*, (Nat. Bur. of Standards, Appl. Math. Ser. 55), Sect. 7.3, pp. 300–302, (1964).

METHOD AND APPARATUS FOR CONFOCAL INTERFERENCE MICROSCOPY WITH BACKGROUND AMPLITUDE REDUCTION AND COMPENSATION

FIELD OF THE INVENTION

This invention is related to optical, acoustical, and electron imaging, including utilizing such images to perform precision measurements on biological, integrated circuit, and other samples.

BACKGROUND OF THE INVENTION

This application is related to the commonly owned, copending application by H. A. Hill, P. H. Oglesby, and D. A. Ziebell entitled "Method and Apparatus for Discriminating in-focus Images from Out-Of-Focus Light Signals from Background and Foreground Light Sources", Ser. No. 08-658,365 filed Jun. 5, 1996, Attorney Docket No. 5391-A-03, the contents of which are specifically incorporated by reference herein in their entirety.

The invention relates to techniques for rapidly, accurately producing an in-focus image of an object, or a cross-section thereof, wherein the effect of light signals from out-of-focus foreground and/or background light sources are mostly eliminated with regard to both statistical and systematic errors. Confocal and confocal interference microscopy are finding many applications in, for example, the life sciences, the study of biological samples, industrial inspection, and semiconductor metrology. This is because of the unique three-dimensional imaging capability of these instruments.

Perhaps the most difficult multi-dimensional imaging is encountered when the background from out-of-focus images is significantly larger than the signal from the in-focus images. Such circumstances arise frequently in the study of thick samples, particularly when working in the reflection mode in contrast to the transmission mode of confocal systems.

There are two general approaches for determining the volume properties of three-dimensional microscopical specimens. Such approaches are based on conventional microscopy and confocal microscopy. Generally, the conventional microscopy approach requires less time to acquire the data but more time to process the data for a three-dimensional image, compared to the confocal microscopy approach.

In a conventional imaging system, when a part of the object to be imaged is axially displaced from its best focus location, the image contrast decreases but the brightness remains constant so that displaced, unfocused parts of the image interfere with the view of focused parts of object.

If the system's point-spread function is known and images are obtained for each independent section of the object, known computer algorithms can be applied to such images to effectively remove the signal contributed by the out-of-focus light and produce images that contain only in-focus data. Such algorithms are of several distinct types, are referred to as "computer deconvolutions," and generally require expensive computer equipment and considerable computing time and considerable mounts of data to obtain the desired statistical accuracy.

The wide field method (WFM) (D. A. Agard and J. W. Sedat, "Three-Dimensional Analysis of Biological Specimens Utilizing Image Processing Techniques," *Proc. Soc. PhotoOpt. Instrum. Eng., SPIE,* 264, pp. 110–117, 1980; D. A. Agard, R. A. Steinberg, and R. M. Stroud, "Quantitative Analysis of Electrophoretograms: A Mathematical Approach to Super-Resolution," *Anal. Biochem.* 111, pp. 257–268, 1981; D. A. Agard, Y. Hiraoka, P. Shaw, and J. W. Sedat, "Fluorescence Microscopy in Three Dimensions," *Methods Cell Biol.* 30, pp. 353–377, 1989; D. A. Agard, "Optical Sectioning Microscopy: Cellular Architecture in Three Dimensions," *Annu. Rev. Biophys. Bioeng.* 13, pp. 191–219, 1984; Y. Hiraoka, J. W. Sedat, and D. A. Agard, "The Use of a Charge-Coupled Device for Quantitative Optical Microscopy of Biological Structures," *Sci.* 238, pp. 36–41, 1987; W. Denk, J. H. Strickler, and W. W. Webb, "Two-Photon Laser Scanning Fluorescence Microscopy," *Sci.* 248, pp. 73–76, 1990) uses a conventional microscope to sequentially acquire a set of images of adjacent focus planes throughout the volume of interest. Each image is recorded using a cooled charge-coupled device (CCD) image sensor (J. Kristian and M. Blouke, "Charge-coupled Devices in Astronomy," *Sci. Am.* 247, pp. 67–74, 1982) and contains data from both in-focus and out-of-focus image planes.

The technique of laser computed tomography is implemented using a conventional microscope. The system discussed by S. Kawata, 0. Nakamura, T. Noda, H. Ooki, K Ogino, Y. Kuroiwa, and S. Minami, "Laser Computed-Tomography Microscope," *Appl. Opt.* 29, pp. 3805–3809 (1990) is based on a principal that is closely related to the technique of X-ray computed tomography, but uses three-dimensional volume reconstruction rather than two-dimensional slice reconstruction. Projected images of a thick three-dimensional sample are collected with a conventional transmission microscope modified with oblique illumination optics, and the three-dimensional structure of the interior of the sample is reconstructed by a computer. Here, the data is acquired in a time short compared to that required to process data for a three-dimensional image. In one experiment by Kawata et al., op. cit., the 80×80×36-voxel reconstruction required several minutes to collect all projections and send them to a minicomputer. Approximately thirty minutes then were required for digital reconstruction of the image, in spite of utilizing a vector processor at a speed of 20 million floating point operations per second (MFLOPS).

In a conventional point or pinhole-confocal microscope, light from a point source is focused within a very small space, known as a spot. The microscope focuses light reflected from, scattered by, or transmitted through the spot onto a point detector. In a reflecting point-confocal microscope the incident light is reflected or back-scattered by that portion of the sample in the spot. Any light which is reflected or back scattered by the sample outside of the spot is not well focused onto the detector, thus it is spread out so the point detector receives only a small portion of such reflected or back-scattered light. In a transmitting point-confocal microscope, incident light is transmitted unless it is scattered or absorbed by that portion of the sample in the spot. Generally, the point source and point detector are approximated by placing masks containing a pinhole in front of a conventional light source and a conventional detector, respectively.

Similarly, in a conventional slit-confocal microscope system, light from a line source is focused into a very narrow elongated space, which is also known as a spot- The slit-confocal microscope focuses light reflected from, scattered by or transmitted through the spot onto a line detector. The line source and line detector can be approximated using a mask with a slit in front of a conventional light source and row of conventional detectors, respectively. Alternately, a line source can be approximated by sweeping a focused laser beam across the object to be imaged or inspected.

Since only a small portion of the object is imaged by the confocal microscope, either the object to be imaged must be moved, or the source and detector must be moved, in order to obtain sufficient image data to produce a complete two-dimensional or three-dimensional view of the object. Previous slit-confocal systems have moved the object linearly in a direction perpendicular to the slit to obtain successive lines of two-dimensional image data. On the other hand, point-confocal systems having only one pinhole have to be moved in a two-dimensional manner in order to acquire two-dimensional image data and in a three-dimensional manner in order to acquire a three-dimensional set of image data. The raw image data are typically stored and later processed to form a two-dimensional cross-section or a three-dimensional image of the object that was inspected or imaged. The reduced sensitivity to out-of-focus images relative to conventional microscopy leads to improved statistical accuracy for a given amount of data and the processing operation is considerably simpler in comparison to that required when processing data obtained in conventional microscopy approach.

In a system known as the Tandem Scanning Optical Microscope (TSOM), a spiral pattern of illumination and detector pinholes are etched into a Nipkow disk so, as the disk rotates, the entire stationary object is scanned in two dimensions [cf. M. Petran and M. Hadravsky, "Tandem-Scanning Reflected-Light Microscope," *J. Opt. Soc. A.* 58(5), pp. 661–664 (1968); G. Q. Xiao, T. R. Corle, and G. S. Kino, "Real-Time Confocal Scanning Optical Microscope," *Appl. Phys. Lett.* 53, pp. 716–718 (1988)]. In terms of the optical processing, the TSOM is basically a single point confocal microscope with a means for efficiently scanning a two-dimensional section one point at a time.

Examples of two techniques implemented to reduce the amount of scanning required to obtain a two-dimensional image with a confocal arrangement are found in the work of H. J. Tiziani and H.-M. Uhde, "Three-Dimensional Analysis by a Microlens-Array Confocal Arrangement," *Appl. Opt.* 33(4), pp. 567–572 (1994) and in the patent of P. J. Kerstens, J. R. Mandeville, and F. Y. Wu, "Tandem Linear Scanning Confocal Imaging System with Focal Volumes at Different Heights," (U.S. Pat. No. 5,248,876 issued September 1993). The microlens-array confocal arrangement of Tiziani and Uhde op. cit. has out-of-focus image discrimination that is the same as using a multi-pinhole source and multielement detector in a confocal configuration. Such a system allows for a number of points to be examined simultaneously but at a compromise in discrimination against out-of-focus images. The higher the density of microlenses, the poorer the ability of the system to discriminate against out-of-focus images, and consequently, an increase in complexity and cost of the computer deconvolutions required to produce a three-dimensional image.

Further, the Tiziani and Uhde op. cit. system has serious limitations in axial range. This range cannot exceed the focal length of the microlens, which is proportional to the diameter of the microlens for a given numerical aperture. Therefore, as the density of the microlenses is increased, there is an associated decrease in the permitted axial range.

The Kerstens et al., op. cit. system incorporates a number of pinholes and matching pinpoint detectors in a confocal arrangement to allow for a number of points to be examined simultaneously. However, as noted in the preceding paragraph, this gain is at a compromise in discrimination against off-of-focus images and as a result an increase in complexity and cost of required subsequent computer deconvolutions. The higher the density of pinholes, the poorer the ability of the system to discriminate against out-of-focus images. The highest discrimination would be achieved when using only one pinhole.

Application of confocal microscopes to inspection of electronics was suggested in T. Zapf and R. W. Wijnaendts-van-Resandt, "Confocal Laser Microscope For Submicron Structure Measurement," *Microelectronic Engineering* 5, pp. 573–580 (1986) and J. T. Lindow, S. D. Bennett, and I. R. Smith, "Scanned Laser Imaging for Integrated Circuit Metrology," *SPIE,* 565, pp. 81–87 (1985). The axial discrimination provided by confocal systems make them useful in the semi-conductor manufacturing environment. For example, such systems could provide for improved inspection of height dependent features such as delamination, blisters, and thickness of structures and coatings. However, there are some problems associated with using confocal imaging systems for inspection of electronics. For example, single pinhole systems require too much time for scanning the object in two directions. Optical systems for scanning a laser beam over the object are too complex; and the spinning disk approach used in the previous TSOM resulted in alignment and maintenance problems.

The number of different depth slices required (and therefore the amount of image data collected) depends upon the range of height that must be measured, and also upon the desired height resolution and performance of the optical system. For typical electronics inspection, images of 10 to 100 different depth slices would be required. Furthermore, data in several color bands may be required to differentiate materials. In confocal imaging systems, a separate two-dimensional scan is required for each desired elevation. If data for multiple color bands is desired, then multiple two-dimensional scans at each elevation are required. By shifting the focus level, similar data can be obtained from adjacent planes and a three-dimensional intensity data set can be acquired.

Thus, none of the prior art confocal microscopy systems can be configured for rapid and/or reliable three-dimensional tomographic imaging, especially in the field of inspection or imaging.

Although the confocal approach is more straightforward and works better, for example in confocal fluorescence work, when the concentration of stained structure is high, the conventional microscopy approach still has several practical advantages. The most important of these is that the latter can utilize dyes that are excited in the ultraviolet (UV) range and these often seem more robust and efficient than those excited in the visible range. Although, a UV laser can be incorporated as the light source of a confocal microscope [M. Montag, J. Kululies, R. Jörgens, H. Gundlach, M. F. Trendelenburg, and H. Spring, "Working with the Confocal Scanning UV-Laser Microscope: Specific DNA Localization at High Sensitivity and Multiple-Parameter Fluorescence," *J. Microsc(Oxford)* 163 (Pt. 2), pp. 201–210, 1991; K. Kuba, S.-Y. Hua, and M. Nohmi, "Spatial and Dynamic Changes in Intracellular $Ca^{2+}$ Measured by Confocal Laser-Scanning Microscopy in Bullfrog Sympatetic Ganglion Cells," *Neurosci. Res.* 10, pp. 245–259, 1991; C. Bliton, J. Lechleiter and D. E. Clapham, "Optical Modifications Enabling Simultaneous Confocal Imaging With Dyes Excited by Ultraviolet- and Visible-Wavelength Light," *J. Microsc.* 169(Pt. 1), pp. 15–26, 1993], or UV dyes can be excited with infrared (IR) light using the "two photon" technique (W. Denk, et al., op. cit.), these techniques involve considerable expense and practical difficulty.

Furthermore, the cooled CCD detectors used in conventional microscopy systems collect the data in parallel rather than serially, as does the photomultiplier (PMT) in a confocal microscopy system. As a result, if the CCD can be made to read out more rapidly without degrading its performance, the three-dimensional data recording rate of the conventional microscopy system may prove to be significantly higher than that of the confocal microscopy system, even though the time needed for computer deconvolution computations means that there might be an additional delay before the data could be actually viewed as three-dimensional image.

The signal-to-noise ratio in relation to statistical accuracy must also be considered when making a choice between a CCD detector used to record in parallel a two-dimensional data array and a slit or pinhole confocal microscope. The well capacity of a two-dimensional CCD pixel is of the order of 200,000 electrons. This limits the statistical accuracy that can be achieved in a single exposure as compared to that achievable with other photoemissive detectors such as PMT's or photovoltaic devices. Consequently, for those applications where the off-of-focus background contributions are significantly larger than the in-focus image signals, consideration of the signal-to-noise ratio may lead to the conclusion that a one-dimensional parallel recording of data in a slit confocal microscope will perform better than a two-dimensional recording of data in a standard microscope configuration or a point by point recording of data in a single pinhole confocal microscope will perform better than a one-dimensional parallel recording of data in a slit confocal microscope, all other considerations being equal.

When the consideration of statistical accuracy as measured by the signal-to-noise ratio influences the selection of a system such as a slit confocal microscope over a standard microscope, or a single pinhole confocal microscope over a slit confocal microscope, the residual signals from the out-of-focus images for the system chosen can be comparable to or larger than the in-focus signals. Such is the case for example when examining deep into biological samples at optical wavelengths where scattering of optical radiation dominates over absorption. In this case, one is left with the need for a lengthy computer deconvolution, i.e. long compared to the time required to acquire the data. Note that this is in general true for the single pinhole confocal microscope as well as the slit confocal microscope when looking for an in-focus image signal that is much smaller than the residual out-of-focus image signals.

Although it is easier to accurately digitize the signal from a CCD detector than from a PMT (J. B. Pawley, "Fundamental and Practical Limits in Confocal Light Microscopy," *Scanning* 13, pp. 184–198, 1991), the PMT is a single device that can be accurately characterized, whereas the CCD is actually a large array of discrete detectors and additional noise is associated with correcting for the pixel-to-pixel variations in sensitivity and offset that characterize its operation (Y. Hiraoka, et al., op. cit.; J. E. Wampler and K. Kutz, "Quantitative Fluorescence Microscopy Using Photomultiplier Tubes and Imaging Detectors," *Methods Cell Biol.* 29, p. 239–267, 1989; Z. Jericevic, B. Wiese, J. Bryan, and L. C. Smith, "Validation of an Imaging System: Steps to Evaluate and Validate a Microscope Imaging System for Quantitative Studies," *Methods Cell Biol.* 30, p. 47–83, 1989).

It should be noted that the above distinction between the photodetectors used in the two methods of three-dimensional microscopy should not be considered to be complete, because the cooled CCD detector is the most suitable photodetector for those confocal microscopes that accomplish the scanning function by using holes in a spinning disk (Petran, et al., op. cit.; Xiao, et al.,op cit.).

Another technique known as "optical coherence-domain reflectometry" (OCDR) has been used to obtain information about the three-dimensional properties of a system. This method is described in the following articles: (1) "Optical Coherence-Domain Reflectometry: A New Optical Evaluation Technique," by R. C. Youngquist, S. Carr, and D. E. N. Davies, *Opt. Lett.* 12(3), pp. 158–160 (1987); (2) "New Measurement System for Fault Location in Optical Waveguide Devices Based on an Interferometric Technique," K. Takada, I. Yokohama, K. Chida, and J. Noda, *Appl. Opt.* 26(9), pp. 1603–1606 (1987); (3) "Guided-Wave Reflectometry with Micrometer Resolution," B. L. Danielson and C. D. Whittenberg, *Appl. Opt.* 26(14), pp. 2836–2842 (1987). The OCDR method differs from the coherent optical time domain reflectometry (OTDR) technique in that instead of a pulsed light source one uses a broadband continuous-wave source with a short coherence length. The source beam enters an interferometer in which one arm has a movable mirror, with the reflected light from this mirror providing a reference beam, and the other arm contains the optical system being tested. The interference signal in the coherently mixed reflected light from the two arms is detected by the usual heterodyne method and yields the desired information about the optical system.

The heterodyne detection of the backscattered signals in the OCDR technique is accomplished by the method of "white-light interferometry," in which the beam is split into the two arms of an interferometer, reflected by the adjustable mirror and the backscattering site, and coherently recombined. This method utilizes the fact that interference fringes will appear in the recombined beam only when the difference in the optical path length between the two arms is less than the coherence length of the beam. The OCDR systems described in references (1) and (3) above make use of this principle, and reference (3) shows interferograms of fiber gaps in test systems obtained by scanning the adjustable mirror and measuring the strength of the recombined signal. Reference (1) also describes a modified method in which the mirror in the reference arm oscillates at a controlled frequency and amplitude, causing a Doppler shift in the reference signal, and the recombined signal is fed into a filtering circuit to detect the beat frequency signal.

Another variation of this technique is illustrated in reference (2), in which the reference arm mirror is at a fixed position and the difference in optical path lengths in the two arms may exceed the coherence length. The combined signal is then introduced into a second Michelson interferometer with two mirrors, one fixed in position and the other being moveable. This moveable mirror is scanned and the difference in path length between the arms of the second interferometer compensates for the delay between the backscattered and reference signals at discrete positions of the moveable mirror corresponding to the scattering sites. In practice, an oscillating phase variation at a definite frequency is imposed on the signal from the backscattering site by means of a piezoelectric transducer modulator in the fiber leading to this site. The output signal from the second Michelson interferometer is fed to a lock-in amplifier, which detects the beat frequency signal arising from both the piezoelectric transducer modulation and the Doppler shift caused by the motion of the scanning mirror. This technique has been used to measure irregularities in glass waveguides with a resolution as short as 15 µm ["Characterization of Silica-Based Waveguides with a Interferometric Optical Time-Domain Reflectometry System Using a 1.3-µ-Wavelength Superluminescent Diode," K. Takada, N. Takato, J. Noda, and Y. Noguchi, *Opt. Lett.* 14(13), pp. 706–708 (1989)].

Another variation of the OCDR is the dual-beam partial coherence interferometer (PCI) which has been used to measure the thickness of fundus layers in the eye ["Measurement of the Thickness of Fundus Layers by Partial Coherence Tomography," by W. Drexler, C. K. Hitzenberger, H. Sattmann, and A. F. Fercher, *Opt. Eng.* 34(3), pp. 701–710 (1995)]. In the PCI used by Drexler, et al., an external Michelson interferometer splits a light beam of high spatial coherence but very short coherence length of 15 μm into two parts: the reference beam (1) and the measurement beam (2). At the interferometer exit, these two components are combined again to form a coaxial dual beam. The two beam components, which have a path difference of twice the interferometer arm length difference, illuminate the eye and are reflected at several intraocular interfaces, which separate media of different refractive index. Therefore each beam component (1 and 2) is further split into subcomponents by reflection at these interfaces. The reflected subcomponents are superimposed on a photodetector. If the optical distance between two boundaries within the eye equals twice the interferometer arm length difference, there are two subcomponents that will travel over the same total path length and will consequently interfere. Each value of the interferometer arm length difference where an interference pattern is observed, is equal to an intraocular optical distance. Provided that there is no other strong reflection nearby, the absolute position of these interfaces can be determined in vivo with a precision of 5 μm. However, the PCI suffers from limitations due to motion of the object during the time required for the 3-D scanning.

Another variation of the OCDR called optical coherent tomography (OCT) has been reported for in vivo retinal imaging by E. A. Swanson, J. A. Izatt, M. R. Hee, D. Huang, C. P. Lin, J. S. Schuman, C. A. Puliafito, and J. G. Fujimoto, "In Vivo Retinal Imaging by Optical Coherence Tomography," *Opt. Lett.* 18(21), pp. 1864–1866 (1993), and E. A. Swanson, D. Huang, J. G. Fujimoto, C. A Puliafito, C. P. Lin, and J. S. Schuman, "Method and Apparatus for Optical Imaging with Means for Controlling the Longitudinal Range of the Sample," U.S. Pat. No. 5,321,501, issued Jun. 14, 1994. The above referenced patent describes a method and apparatus for performing optical imaging on a sample wherein longitudinal scanning or positioning in the sample is provided by either varying relative optical path lengths for an optical path leading to the sample and to a reference reflector, or by varying an optical characteristic of the output from an optical source applied to the apparatus. Transverse scanning in one or two-dimensions is provided on the sample by providing controlled relative movement between the sample and a probe module in such direction and/or by steering optical radiation in the probe module to a selected transverse position. The reported spatial resolution is <20 μm with a high sensitive (100 dB dynamic range). However the OTC suffers from limitations due to motion of the object during the time required for the three-dimensional scanning.

Optical interferometric profilers are widely used for three-dimensional profiling of surfaces when noncontact methods are required. These profilers typically use phase-shifting interferometric (PSI) techniques and are fast, accurate, and repeatable, but suffer from the requirement that the surface be smooth relative to the mean wavelength of the light source. Surface discontinuities greater than a quarter-wavelength (typically 150 nm) cannot be unambiguously resolved with a single-wavelength measurement because of the cyclic nature of the interference. Multiwavelength measurements can extend this range, but the constraints imposed on wavelength accuracy and environmental stability can be severe (U.S. Pat. No. 4,340,306 issued Jul. 20, 1982 to N. Balasubramanian entitled "Optical System for Surface Topography Measurement.")

Profilers based on scanning white-light interferometry (SWLI) overcome many of the limitations of conventional PSI profilers for the measurement of rough or discontinuous surfaces. A number of articles describe this technique in detail [cf. Refs. 2–7 in L. Deck and P. de Groot, *Appl. Opt.* 33(31), pp. 7334–7338 (1994)]. Typically these profilers record the position of a contrast reference feature (i.e., peak contrast or peak fit) for each point in the field of view while axially translating one arm of an equal-path interferometer illuminated with a broadband source. A common problem with this technique is the enormous amount of computation required for calculating the contrast for each point in real time. Often the contrast calculation alone is insufficiently precise because of the discrete sampling interval, forcing either an increase in the sampling density or incorporating an interpolation technique, both of which further slow the acquisition process. The Coherence Probe Microscope (CPM) is an example of this class of profiler [U.S. Pat. No. 4,818,110 issued Apr. 4, 1989 to M. Davidson entitled "Method and Apparatus of Using a Two Beam Interference Microscope for Inspection of Integrated Circuits and the Like"; M. Davidson, K. Kaufman, I. Mazor, and F. Cohen, "An Application of Interference Microscope to Integrated Circuit Inspection and Metrology," *SPIE*, 775, pp. 233–247 (1987); U.S. Pat. No. 5,112,129 issued May 12, 1992 to M. Davidson, K. Kaufman, and I. Mazor entitled "Method of Image Enhancement for the Coherence Probe Microscope with Applications to Integrated Circuit Metrology."]. Profilers in general and the CPM in particular are not able to work with three-dimensional objects, have the background typical of a conventional interference microscopy, are sensitive to vibrations, and require computer intensive analysis.

One of the problems encountered in white-light interferometry (WLI) is the problem of phase ambiguities. A profilometry method that has been received attention with respect to the phase ambiguity problem is the dispersive interferometric profilometer (DIP) proposed by J. Schwider and L. Zhou in a paper entitled "Dispersive Interferometric Profilometer," *Opt. Lett.* 19(13), pp. 995–997 (1994). A similar approach for WLI has also been reported by U. Schnell, E. Zimmermann, and R. Dandliker in an article entitled "Absolute Distance Measurement With Synchronously Sampled White-Light Channelled Spectrum Interferometry," *Pure Appl. Opt.* 4, pp. 643–651 (1995).

In general, the phase ambiguity problem can be completely avoided with the use of DIP. In the DIP apparatus, a parallel beam of a white-light source perpendicularly impinges upon the real wedge of a Fizeau interferometer in front of an apochromatic microscope objective. The Fizeau interferometer is formed by the inner surface of the reference plate and the object surface. Then the light is reflected back onto the slit of a grating spectrometer, which disperses the sofar invisible fringe pattern and projects the spectrum onto a linear array detector. On the detector each point of the surface selected by the slit of the spectrometer furnishes a dispersed spectrum of the air gap in the Fizeau interferometer. The fringe patterns can be evaluated by use of Fourier-transform and filtering methods to obtain the phase information from the intensity distribution of a wedge-type interferogram.

Although the phase ambiguity problem can be avoided with the use of DIP, DIP is not suitable in applications requiring the examination of three-dimensional objects. This is a consequence of the intrinsic relatively large background produced in DIP from out-of-focus images. The background problem is comparable to the background problem faced when trying to produce three-dimensional images using standard interference microscopy.

The above cited background problem encountered in interference microscopy is reduced in an interference version of the confocal microscope described by D. K. Hamilton and C. J. R. Sheppard in an article entitled "A Confocal Interference Microscope," *Optica Acta* 29(12), pp. 1573–1577 (1982). The system is based on the confocal microscope, in which the object is scanned relative to a focused laser spot, which is arranged to coincide with the back-projected image of a point detector. An interference form of the reflection confocal microscope is based on a Michelson interferometer in which one beam is focused onto the object. This system has the important property of a reduced background from out-of-focus images intrinsic to confocal interference microscopy systems. The confocal interference microscope of Hamilton and Sheppard op. cit. measures the reflected signal at only one point at a time in a three-dimensional object making the system sensitive to sample motion during the required data acquisition scan in three dimensions.

The copending application by Hill et al., op cit. is well suited to reducing the systematic errors introduced in tomographic imaging by background due to out-of-focus images in the object and/or at the detector. This technology is also operative in parallel data acquisition schemes. The Hill et al., op. cit. technology utilizes the difference in transverse spatial properties of in-focus and out-of-focus images to discriminate the one from the other. However, the technology of Hill et al., op cit. can not be used to reduce the statistical error introduced by background comprised of out-of-focus images. Also the embodiments listed in the copending application of Hill et. al. are all designed for use in the confocal microscope configurations where the square of the amplitude's magnitude of the desired images is recorded and not the complex amplitude itself.

What is needed is a system that combines a sensitivity of image data to out-of-focus images that is reduced below that inherent in prior art confocal and confocal interference microscopy systems, the reduced sensitivity of the image data to out-of-focus images being with respect to both systematic and statistical errors; a reduced requirement of computer deconvolutions associated with reduced sensitivity to off-of-focus images; the potential for high signal-to-noise ratios intrinsic to confocal interference microscopy systems; and the potential to measure the complex amplitude of the scattered and/or the reflected light or acoustic beam.

SUMMARY OF THE INVENTION

Accordingly, it is an object of the invention to provide rapid, reliable one-, two-, and three-dimensional tomographic complex amplitude imaging.

It is an object of the invention to provide a tomographic complex amplitude imaging technique which conveniently reduces or eliminates both the statistical and the systematic error effects of light from out-of-focus image points.

It is another object of the invention to provide an improved tomographic complex amplitude imaging technique which avoids the shortcomings of the above described prior art.

It is another object of the invention to provide an improved technique for tomographic complex amplitude imaging wherein systematic effects of out-of-focus light images are greatly reduced or eliminated.

It is another object of the invention to provide a tomographic complex amplitude imaging technique which allows simultaneous imaging of an object in multiple image points.

It is another object of the invention to provide a convenient technique for tomographic complex amplitude imaging in one, two, and three dimensions with the means to obtain a signal-to-noise ratio for the images that is achievable with an interferometric system.

It is another object of the invention to provide a tomographic complex amplitude imaging system and technique which avoids the computation difficulties of solving nonlinear differential equations.

Briefly described, and in accordance with one embodiment thereof, I provide a method and apparatus for discriminating the complex amplitude of an in-focus image from the complex amplitude of an out-of-focus image by focusing optical radiation from a broadband spatially incoherent point source onto a source pinhole. Rays emanating from the source pinhole are collimated and directed to a first phase shifter. The phase of a first portion of the collimated rays is shifted by the phase shifter to produce a first quantity of phase-shifted rays, and the phase of a second portion of the collimated rays is shifted by the phase shifter to produce a second quantity of phase-shifted rays. The first and second quantities of phase-shifted rays are focused to a first spot.

Rays of the first quantity of phase-shifted rays emanating from the first spot are collimated and directed to a beam splitter. A first portion of the collimated rays pass through the beam splitter to form a first quantity of a probe beam and a second portion of the collimated rays reflected by the beam splatter to form a first quantity of a reference beam. Rays of the second quantity of phase-shifted rays emanating from the first spot are collimated and directed to the beam splitter. A first portion of the collimated rays pass through the beam splitter to form a second quantity of the probe beam and a second portion of the collimated rays are reflected by the beam splitter to form a second quantity of the reference beam.

The rays of the first and second quantities of the probe beam are directed to a second phase-shifter. The rays of the first quantity of the probe beam are phase shifted to form a third quantity of the probe beam and rays of the second quantity of the probe beam are phase shifted to form a fourth quantity of the probe beam, the net phase shifts produced by the said first and second phase shifters for the third and fourth quantities of the probe beam being the same. The third and fourth quantities of the probe beam are focused by a probe lens onto a spot in the object material to thereby illuminate the object material.

Rays of the first and second quantities of the reference beam are directed to a third phase-shifter. Rays of the first quantity of the reference beam are phase shifted to form a third quantity of the reference beam and rays of the second quantity of the reference beam are phase shifted to form a fourth quantity of the reference beam, the net phase shifts produced by the first and third phase shifters for the third and fourth quantities of the reference beam being the same. The third and fourth quantities of the reference beam are focused by a reference lens onto a spot on a reference mirror.

Reflected and/or scattered rays of the probe beam emanating from the illuminated object in the direction of the probe lens form a scattered probe beam, are collimated by the probe lens, and directed to the second phase shifter. The phase of a first portion of the collimated rays is shifted to produce a first scattered probe beam quantity of phase-shifted rays, and the phase of a second portion of the collimated rays is shifted to produce a second scattered probe beam quantity of phase-shifted rays. Rays of the first and second scattered probe beam quantities are directed to the beam splitter. A portion of the first and second scattered probe beam quantities are reflected by the beam splitter to form third and fourth quantities of the scattered probe beam, respectively. The collimated rays of the third and fourth quantities of the scattered probe beam are focused by a detector lens onto plane of a detector pinhole.

Reflected rays emanating from the spot on the reference mirror in the direction of the reference lens form a reflected reference beam and are collimated and directed by the reference lens to the third phase shifter. The phase of a first portion of the collimated rays is shifted to produce a first reflected reference beam quantity of phase-shifted rays and the phase of a second portion of the collimated rays is shifted to produce a second reflected reference beam quantity of phase-shifted rays. Rays of the first and second reflected reference beam quantities are directed to the beam splitter. A portion of the first and second reflected reference beam quantities are transmitted by the beam splitter to form third and fourth quantities of the reflected reference beam, respectively. Collimated rays of the third and fourth quantities of the reflected reference beam are focused by the detector lens onto the plane of the detector pinhole.

The intensity of the superimposed third and fourth quantities of the scattered probe beam and the third and fourth quantities of the reflected reference beam transmitted by the detector pinhole is measured by a single pixel detector as a first measured intensity value. The phases of the third and fourth quantities of the reflected reference beam are shifted by $\pi$ radians by a fourth phase shifter to form a fifth and sixth quantities of the reflected reference beam, respectively. The intensity of the superimposed third and fourth quantities of the scattered probe beam and fifth and sixth quantities of the reflected reference beam transmitted by the detector pinhole is measured by the single pixel detector as a second measured intensity value.

The phases of the third and fourth quantities of the reflected reference beam are shifted by an additional $-\pi/2$ radians by the fourth phase shifter to form a seventh and eighth quantities of the reflected reference beam, respectively. The intensity of the superimposed third and fourth quantities of the scattered probe beam and the seventh and eighth quantities of the reflected reference beam transmitted by the detector pinhole is measured by the single pixel detector as a third measured intensity value. The phases of the third and fourth quantities of the reflected reference beam are shifted by an additional $\pi$ radians by the fourth phase shifter to form a ninth and tenth quantities of the reflected reference beam, respectively. The intensity of the superimposed third and fourth quantities of the scattered probe beam and the ninth and tenth quantities of the reflected reference beam transmitted by the detector pinhole is measured by the single pixel detector as a fourth measured intensity value.

In a next step, the first, second, third, and fourth measured intensity values are sent to a computer for processing. The second measured intensity value is subtracted from the first measured intensity value by the computer to yield a measurement of a first component value of the complex amplitude of the scattered probe beam that is in focus at the plane of the detector pinhole with the effects of light from out-of-focus images canceled out. The fourth measured intensity value is subtracted from the third measured intensity value by the computer to yield a measurement of a second component value of the complex amplitude of the scattered probe beam that is in-focus in the plane of the detector pinhole with the effects of light from out-of-focus images canceled out.

The first and second component values of the amplitude of the scattered probe beam are values of orthogonal components and as such, give within a complex constant an accurate measurement of the complex amplitude of the scattered probe beam that is in-focus in the plane of the detector pinhole with the effects of light from out-of-focus images canceled out. Using the computer and computer algorithms known to those skilled in the art, accurate one-, two-, and three-dimensional representations of the object material are obtained from one-, two-, and three-dimensional arrays, respectively, of the first, second, third, and fourth intensity values acquired through scanning of the object material in one, two, and three dimensions, respectively. The scanning of the object material is achieved by systematically moving the object material in one, two, and three dimensions with a translator which is controlled by the computer. The computer algorithms may include computer deconvolutions which are known to those skilled in the art should correction for out-of-focus images be desired beyond the compensation achieved by the apparatus of the present invention.

In accordance with a second embodiment thereof, I provide a method and apparatus for discriminating the complex amplitude of an in-focus image from the complex amplitude of an out-of-focus image by imaging optical radiation from a broadband, spatially extended, spatially incoherent line source onto a linear array of source pinholes comprising the apparatus and electronic processing means of the previously described embodiment wherein the source pinhole of the first embodiment has been replaced by the linear array of source pinholes whose direction is perpendicular to the system optical axis, the detector pinhole of the first embodiment has been replaced by a one-dimensional linear array of detector pinholes, and the single pixel detector of the first embodiment has been replaced by a one-dimensional linear array of detector pixels, the linear arrays of detector pinholes and detector pixels being orientated with the image of the linear array of source pinholes in the in-focus plane at the detector. The measured orthogonal complex-amplitude components of the scattered probe beam give within a complex constant an accurate measurement of the complex amplitude of the scattered probe beam that is in-focus at the plane of the linear array of detector pinholes with the effects of light from out-of-focus images canceled out. An accurate one-dimensional representation of a linear array of points on a line section of the object is obtained in a direction selected by orientation of the linear array of source pinholes with no scanning required. Using computer algorithms known to those skilled in the art, an accurate one-dimensional representation of the object is obtained from two-dimensional arrays of the first, second, third, and fourth intensity values acquired through scanning of the object in the direction selected by the orientation of the linear array of source pinholes over a length equal to the distance between the images in the object of two contiguous source pinholes. In addition, using computer algorithms known to those skilled in the art, accurate two- and three-dimensional representations of the object are obtained from two- and three-dimensional arrays, respectively, of the first, second, third, and fourth intensity values acquired through scanning of the object in the direction selected by the orientation of the linear array of source pinholes over a length equal to the distance between the images in the object of two contiguous source pinholes plus scanning of the object in a second dimension and second and third dimensions, respectively. The computer algorithms may include computer deconvolutions which are known to those skilled in the art should correction for out-of-focus images be desired beyond the compensation achieved by the apparatus of the present invention.

Alternative embodiments to the first and second preferred embodiments of the invention include the ability to improve and optimize the signal-to-noise ratio using additional optical means and substantially the same electronic processing means as are employed in the primary apparatus of the first and second preferred embodiments of the invention. The additional optical means comprises modified paths for the reference and probe beams whereby the amplitude of reflected reference beam focused on either the detector pinhole for the first embodiment or the linear array of detector pinholes for the second embodiment can be adjusted relative to the amplitude of the scattered probe beam imaged on either the detector pinhole or the linear array of detector pinholes, respectively.

In accordance with a third embodiment thereof, I provide a method and apparatus for discriminating the complex amplitude of an in-focus image from the complex amplitude of an out-of-focus image with means to improve and optimize the signal-to-noise ratio comprising the apparatus of the previously described first embodiment and an optical means to adjust the amplitude of a reflected reference beam focused on a detector pinhole relative to the amplitude of the scattered probe beam imaged on the detector pinhole. Rays from a broadband spatially incoherent point source are focused onto a source pinhole. Rays emanating from the source pinhole are collimated and directed to a first phase shifter. The phase of a first portion of the collimated rays is shifted to produce a first quantity of phase-shifted rays, and the phase of a second quantity of the collimated rays is shifted to produce a second quantity of phase-shifted rays. The first and second quantities of phase-shifted rays impinge on a first beam splitter. A first portion of the first quantity of phase-shifted rays pass through the first beam splitter to form a first quantity of the probe beam and a second portion of the first quantity of phase shifted rays is reflected by the first beam splitter to form a first quantity of the reference beam. A first portion of the second quantity of phase-shifted rays pass through the first beam splitter to form a second quantity of the probe beam and a second portion of the second quantity of phase-shifted rays is reflected by the first beam splitter to form a second quantity of the reference beam. The first and second quantities of the probe beam are focused to a first probe beam spot. The first and second quantities of the reference beam are focused to a first reference beam spot.

Rays of the first quantity of the probe beam emanating from the first probe beam spot are collimated and directed to a second beam splitter. A first portion of the collimated rays pass through the second beam splitter to form a third quantity of the probe beam. Rays of the second quantity of probe beam emanating from the first probe beam spot are collimated and directed to the second beam splitter. A first portion of the collimated rays pass through the second beam splitter to form a fourth quantity of the probe beam. The rays of the third and fourth quantities of the probe beam are directed to a second phase shifter. The rays of the third quantity of the probe beam pass through the second phase shifter and are phase shifted to form a fifth quantity of the probe beam. The rays of the fourth quantity of the probe beam pass through the second phase shifter and are phase shifted to form a sixth quantity of the probe beam, the net phase shifts produced by the first and second phase shifters for the fifth and sixth quantities of the probe beam being the same.

Rays of the first quantity of the reference beam emanating from the first reference beam spot are collimated, directed to a third phase shifter, and emerge as a third quantity of the reference beam. Rays of the second quantity of the reference beam emanating from the first reference beam spot are collimated, directed to the third phase shifter, and emerge as a fourth quantity of the reference beam, the net phase shifts produced by the first and third phase shifters for the third and fourth quantities of the reference beam being the same. A first portion of the third quantity of the reference beam is reflected by a third beam splitter to form a fifth quantity of the reference beam. A first portion of the fourth quantity of the reference beam is reflected by the third beam splitter to form a sixth quantity of the reference beam.

The collimated fifth and sixth quantities of the probe beam are focused by a probe lens onto a second probe beam spot in the object material to thereby illuminate the object material. The collimated fifth and sixth quantities of the reference beam are focused by a reference lens onto a second reference beam spot on the reference mirror.

Reflected and/or scattered rays of the probe beam emanating from the illuminated object in the direction of the probe lens form a scattered probe beam. The scattered probe beam is collimated by the probe lens and directed to the second phase shifter. The phase of a first portion of the collimated rays is shifted to produce a first scattered probe beam quantity of phase-shifted rays, and the phase of a second portion of the collimated rays is shifted to produce a second scattered probe beam quantity of phase-shifted rays. Rays of the first and second scattered probe beam quantities are directed to the second beam splitter. A portion of the first and second scattered probe beam quantities are reflected by the second beam splitter to form a third and fourth quantities of the scattered probe beam, respectively. Collimated rays of the third and fourth quantities of the scattered probe beam are focused by a detector lens to form a scattered probe beam spot in the plane of the detector pinhole.

Reflected rays emanating from the second reference beam spot in the direction of the reference lens form a reflected reference beam and are collimated and directed to the third beam splitter. A portion of the reflected reference beam is transmitted by the third beam splitter and is incident on a fourth phase shifter. The phase of a first portion of the incident beam transmitted by the fourth phase shifter is shifted to produce a first reflected reference beam quantity of phase-shifted rays. The phase of a second portion of the incident beam transmitted by the fourth phase shifter is shifted to produce a second reflected reference beam quantity of phase-shifted rays. Rays of the first and second reflected reference beam quantities are directed to the second beam splitter. A portion of the first and second reflected reference beam quantities are transmitted by the second beam splitter to form a third and fourth quantities of the reflected reference beam, respectively. Collimated rays of the third and fourth quantities of the reflected reference beam are focused by the detector lens to form a reflected reference beam spot in the plane of the detector pinhole.

The intensity of the superimposed third and fourth quantities of the scattered probe beam and the third and fourth quantities of the reflected reference beam transmitted by the detector pinhole is measured by a single pixel detector as a first measured intensity value. The phases of the third and fourth quantities of the reflected reference beam are shifted by π radians by a fifth phase shifter to form a fifth and sixth quantities of the reflected reference beam, respectively. The intensity of the superimposed third and fourth quantities of the scattered probe beam and the fifth and sixth quantities of the reflected reference beam transmitted by the detector pinhole is measured by the single pixel detector as a second measured intensity value.

The phases of the third and fourth quantities of the reflected reference beam are shifted by an additional $-\pi/2$ radians by the fifth phase shifter to form a seventh and eighth quantities of the reflected reference beam. The intensity of the superimposed third and fourth quantities of the scattered probe beam and the seventh and eighth quantities of the reflected reference beam transmitted by the detector pinhole is measured by the single pixel detector as a third measured intensity value. The phases of the third and fourth quantities of the reflected reference beam are shifted by an additional π radians by the fifth phase shifter to form a ninth and tenth quantities of the reflected reference beam. The intensity of the superimposed third and fourth quantities of the scattered probe beam and the ninth and tenth quantities of the reflected reference beam transmitted by the detector pinhole is measured by the single pixel detector as a fourth measured intensity value.

In a next step, the first, second, third, and fourth measured intensity values are sent to a computer for processing. The second measured intensity value is subtracted from the first measured intensity value by the computer to yield a measurement of a first component value of the complex amplitude of the scattered probe beam that is in focus at the plane of the detector pinhole with the effects of light from out-of-focus images canceled out. The fourth measured intensity value is subtracted from the third measured intensity value by the computer to yield a measurement of a second component value of the complex amplitude of the scattered probe beam that is in focus in the plane of the detector pinhole with the effects of light from out-of-focus images canceled out.

The first and second component values of the amplitude of the scattered probe beam are values of orthogonal components and as such; give within a complex constant an accurate measurement of the complex amplitude of the scattered probe beam that is in-focus at the plane of the detector pinhole with the effects of light from out-of-focus images canceled out. Using the computer and computer algorithms known to those skilled in the art, accurate one-, two-, and three-dimensional representations of the object material are obtained from one-, two-, and three-dimensional arrays, respectively, of the first, second, third, and fourth intensity values acquired through scanning of the object material in one, two, and three dimensions, respectively. Scanning of the object material is achieved by systematically moving the object material in one, two, and three dimensions with a translator which is controlled by the computer. The computer algorithms may include computer deconvolutions which are known to those skilled in the art should correction for out-of-focus images be desired beyond the compensation achieved by the apparatus of the present invention.

The signal-to-noise ratio can be optimized in the third embodiment with respect to measuring the desired complex amplitudes. The optimization is accomplished by adjusting the ratio of the amplitude of the third and fourth quantities of the scattered probe beam and the amplitude of the third and fourth quantities of the reflected reference beam by altering the reflection-transmission properties of the first, second, and third beam splitters.

In accordance with a fourth embodiment thereof, I provide a method and apparatus for discriminating the complex amplitude of an in-focus image from the complex amplitude of an out-of-focus image with means to adjust or optimize the signal-to-noise ratio by imaging optical radiation from a broadband, spatially extended, spatially incoherent source onto a linear array of source pinholes comprising the apparatus and electronic processing means of the previously described third embodiment wherein the source pinhole of the third embodiment has been replaced by the linear array of source pinholes whose direction is perpendicular to the optical axis, the detector pinhole of the third embodiment has been replaced by a one-dimensional linear array of detector pinholes, and the single pixel detector of the third embodiment has been replaced by a one-dimensional linear array of detector pixels, the linear arrays of detector pinholes and pixels being aligned with the image of the linear array of source pinholes in the in-focus plane at the linear array of detector pinholes. The measured values of the orthogonal complex-amplitude components of the scattered probe beam give within a complex constant an accurate measurement of the complex amplitude of the scattered probe beam that is in-focus in the plane of the linear array of detector pinholes with the effects of light from out-of-focus images canceled out. An accurate one-dimensional representation of a linear array of points on a line section of the object is obtained in the direction selected by orientation of the linear array of source pinholes with no scanning required. Using computer algorithms known to those skilled in the art, an accurate one-dimensional representation of the object is obtained from two-dimensional arrays of the first, second, third, and fourth intensity values acquired through scanning of the object in the direction selected by the orientation of the linear array of source pinholes over a length equal to the distance between the image in the object of two contiguous source pinholes. In addition, using computer and computer algorithms known to those skilled in the art, accurate two- and three-dimensional representations of the object are obtained from two- and three-dimensional arrays, respectively, of the first, second, third, and fourth intensity values acquired through scanning of the object in the direction selected by the orientation of the linear array of source pinholes over a length equal to the distance between the image in the object of two contiguous source pinholes plus scanning of the object in a second dimension and second and third dimensions, respectively. Scanning of the object material is achieved by systematically moving the object material in one and two dimensions with a translator which is controlled by the computer. The computer algorithms may include computer deconvolutions which are known to those skilled in the art should correction for out-of-focus images be desired beyond the compensation achieved by the apparatus of the present invention.

The signal-to-noise ratio obtained in the fourth embodiment can be optimized with respect to measuring the desired complex amplitudes. The optimization is accomplished by adjusting the ratio of the amplitude of the third and fourth quantities of the scattered probe beam and the amplitude of the third and fourth quantities of the reflected reference beam by altering the reflection-transmission properties of the first, second, and third beam splitters.

Fifth and sixth alternative preferred embodiments to the first, second, third, and fourth preferred embodiments includes the ability to discriminate the complex amplitude of an in-focus image from the complex amplitude of an out-of-focus image for images obtained from light transmitted through the object material nominally in the same direction as the direction of propagation of the probe beam comprising substantially the same apparatus and electronic processing means of the primary four preferred embodiments with additional optical means. The additional optical means preferable comprises interferometer configurations that operate in the prescribed transmission mode.

It should be appreciated that the "enabling technology" of the invention applies for any electromagnetic radiation, electron beams as used for example in electron microscopes, or even acoustic waves for which suitable collimating lenses, imaging lenses, and phase shifters can be provided. For applications wherein the amplitude of the beam is detected instead of the intensity, the function of producing the square of the amplitude must be done in the electronic processing following the detector.

The line source need not be spatially incoherent in the direction of the line source in the case of either the second, fourth, or sixth preferred embodiments to achieve a reduced systematic error although the systematic error will generally be lower when a spatially incoherent line source is used.

Source can be either a narrow spectral line or a broadened spectral line.

An advantage of the invention is that the complex scattering amplitude of the object is obtained instead of the magnitude of the scattering amplitude as in the case of PCI and OCT. This is particularly important with respect to the amount of computer analysis required to obtain a given type of one-, two- or three-dimensional image of the object material.

Another advantage is that the computer processing required to obtain the complex scattering amplitude in one-, two-, and three-dimensional imaging is greatly reduced compared to that required in prior art confocal systems currently employed.

Another advantage is that if it is necessary to correct for out-of-focus images which are already greatly reduced in the apparatus of the present invention, the computer processing required with the apparatus of the present invention is significantly reduced compared to the computer processing required in prior art scanning single-pinhole confocal interference microscopy to achieve a given level of correction.

Another advantage is that the contribution of background radiation to the statistical noise in the measured complex scattering amplitude at a given point in the object for a given measurement interval of time can be reduced to that which derives principally from the size of the complex scattering amplitude itself, in particular for the case where the amplitude of the background radiation is relatively large compared to the size of desired complex scattering amplitude. This is not achievable in prior art scanning single-pinhole confocal microscopy systems.

The statistical error in images obtained with the apparatus of the present invention is reduced compared to the statistical error in images obtained with prior art confocal interference microscopy systems.

The apparatus of the present invention can, in summary, be operated to (1) reduce systematic error, (2) reduce statistical error, (3) reduce dynamic range requirement for detector and processing electronics, (4) reduce the computer processing required to generate either a one-, two-, or three-dimensional image, (5) can be operative with either narrow or broadband sources, and/or (6) can be operative when imaging through a turbid medium. Generally, one or more of these features can be implemented for operation in parallel.

BRIEF DESCRIPTION OF THE DRAWINGS

In the drawings, wherein like reference characters denote similar elements throughout the several views:

FIG. 1b illustrates subsystem 80;

FIG. 1c illustrates subsystem 81;

FIG. 1d illustrates subsystem 82 for the case of probe beam entering subsystem 82;

FIG. 1e illustrates subsystem 83 for the case of reference beam entering subsystem 83;

FIG. 1f illustrates subsystem 82 for the case of probe beam exiting subsystem 82;

FIG. 1g illustrates subsystem 83 for the case of reference beam exiting subsystem 83;

FIG. 1h illustrates subsystem 84 for the case of probe beam entering subsystem 84;

FIG. 1i illustrates subsystem 84 for the case of reference beam entering subsystem 84;

FIG. 1j illustrates subsystems 82 and 84 for the case of an out-of-focus beam in subsystem 84 originating from scattering and/or reflection of light in subsystem 82;

FIG. 2b illustrates subsystem 80a;

FIG. 2c illustrates subsystem 84a for the case of probe beam entering subsystem 84a;

FIG. 2d illustrates subsystem 84a for the case of reference beam entering subsystem 84a;

FIG. 3b illustrates subsystem 80;

FIG. 3c illustrates subsystem 81a;

FIG. 3d illustrates subsystem 82 for the case of probe beam entering subsystem 82;

FIG. 3e illustrates subsystem 81b;

FIG. 3f illustrates subsystem 83a for the case of reference probe beam entering subsystem 83a;

FIG. 3g illustrates subsystem 82 for the case of probe beam exiting subsystem 82;

FIG. 3h illustrates subsystem 83a for the case of reference beam exiting subsystem 83a;

FIG. 3i illustrates subsystem 84 for the case of probe beam entering subsystem 84;

FIG. 3j illustrates subsystem 84 for the case of reference beam entering subsystem 84;

FIG. 4b illustrates subsystem 80a;

FIG. 4c illustrates subsystem 84a for the case of probe beam entering subsystem 84a;

FIG. 4d illustrates subsystem 84a for the case of reference beam entering subsystem 84a;

FIG. 5b illustrates subsystem 80b;

FIG. 5c illustrates subsystem 82a;

FIG. 5d illustrates subsystem 81b;

FIG. 5e illustrates subsystem 85 for the case of probe beam entering subsystem 85;

FIG. 5f illustrates subsystem 85 for the case of reference probe beam entering subsystem 85;

FIG. 6b illustrates subsystem 80c;

FIG. 6c illustrates subsystem 85a for the case of probe beam entering subsystem 85a;

FIG. 6d illustrates subsystem 85a for the case of reference beam entering subsystem 85a;

FIG. 1j) in the detector pinhole plane 47 for a four element phase shifting system (m=2) as a function of $(x_3 d_0/\lambda f)$ for $y_3=0$ and $z_3=50\lambda(f/d_0)^2$ in accordance with the six preferred embodiments of the present invention.

DETAILED DESCRIPTION OF THE INVENTION

Figure 1A:
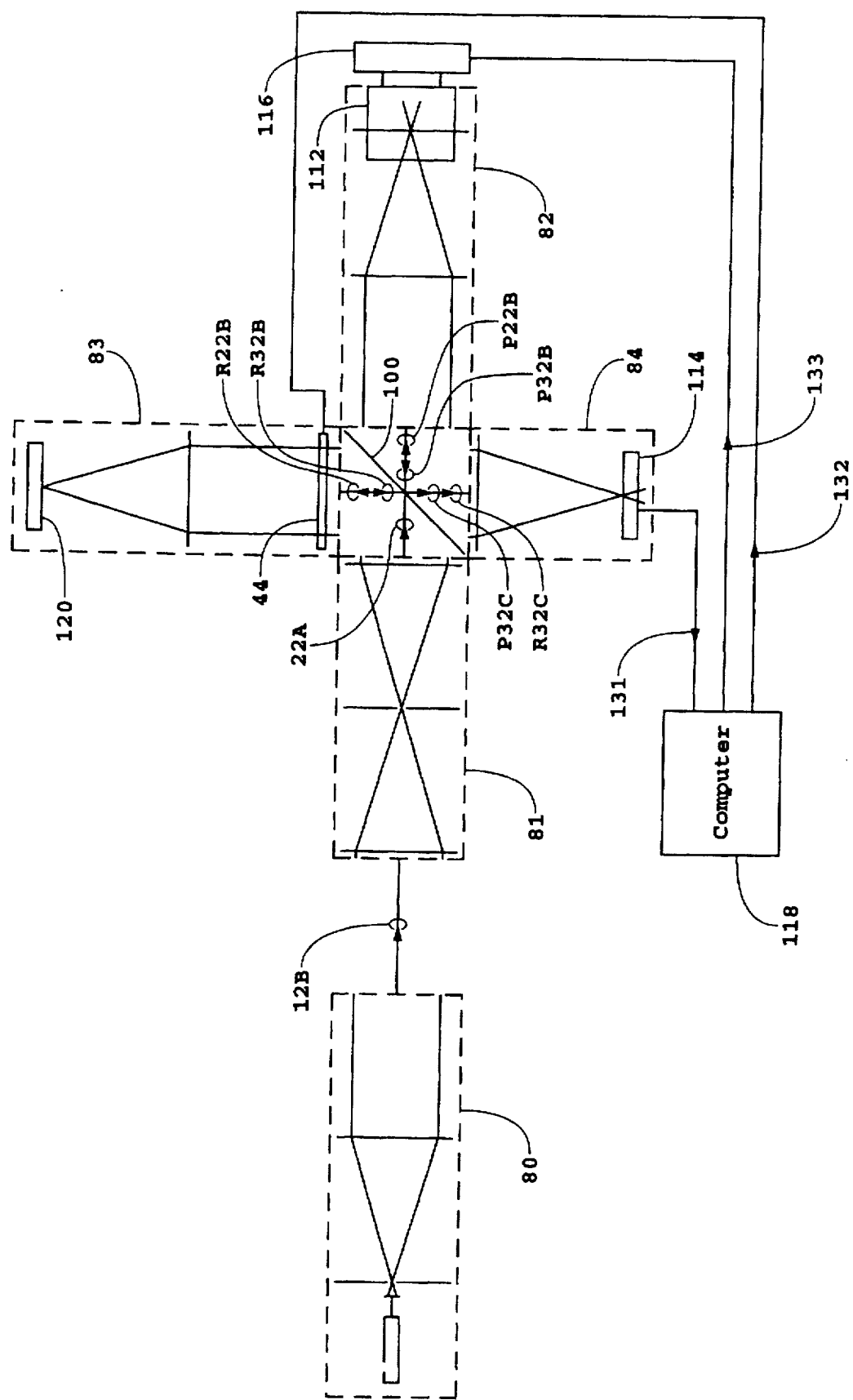
FIGS. 1a–j taken together illustrate, in schematic form, the presently preferred first embodiment of the present invention with FIG. 1a showing optical paths between subsystems 80 and 81, 81 and 82, 81 and 83, 82 and 84, and 83 and 84, paths of the electronic signals from computer 118 to translator 116 and to phase shifter 44 in subsystem 83, and path of electronic signal from detector 114 in subsystem 84 to computer 118.

The present invention permits the separation of the complex amplitude of reflected and/or scattered light by a volume element of three-dimensional image space or region from the complex amplitude of the background light produced by superimposed out-of-focus images of structures before, behind, and to the side of the volume element under examination. The described tomographic technique can separate a desired complex amplitude signal in an image plane from "background" and "foreground" complex amplitude signals generated by various mechanisms. Such background and foreground complex amplitude signals may be (1) out-of-focus images of sections of an object material other than the slice being imaged, (2) scattering of a desired amplitude signal, (3) scattering of signals originating from sources other than the slice being imaged, and/or (4) thermal radiation. Scattering sites and thermal radiation sources may be located in the space before, behind and/or in the object slice under examination.

The technique of the present invention is implemented with one of two different levels of discrimination against off-of-focus images. In the first level (Level 1), the impulse response functions of imaging subsystems are manipulated in one plane by introducing one dimensional patterns of phase changes at the pupils of respective subsystems of the apparatus of the present invention. In the second level (Level 2), the impulse response functions of imaging subsections are manipulated in two orthogonal planes by introducing two-dimensional patterns of phase changes at the pupils of the respective subsystems. A Level 2 implementation leads to a more effective discrimination of out-of-focus images from in-focus images than a Level 1 implementation. However, when using a Level 1 discrimination in either the second, fourth, and sixth embodiments of the present invention, the linear array of source pinholes may be configured as a slit whereas when using a Level 2 discrimination in the second, fourth, and sixth embodiments, the spacing between source pinholes should be larger than a minimum value in accordance with subsequently set fourth Eq. (38). Level 1 and Level 2 discriminations may be implemented for any of the preferred embodiments that are described.

The enabling technology of the present invention which is common to each of the preferred embodiments of the apparatus of the present invention configured with either of the Level 1 or Level 2 discriminations is described herein only for the preferred embodiments with Level 1 discrimination.

The various physical embodiments and their operation will be described first, and then the supporting theory will be set fourth.

Referring to the drawings in detail, FIGS. 1–j depict in schematic form presently preferred first preferred embodiment of the present invention.

As shown in FIGS. 1a–j, the preferred embodiment of the present invention is an interferometer comprised of a beam splitter 100, object material 112 supported by xyz translator 116, a reference mirror 120, and a detector 114. This configuration is known in the art as a Michelson interferometer, and is shown as a simple illustration. Other forms of interferometer known in the art such as a polarized Michelson interferometer and as described in an article entitled "Differential Interferometer Arrangements for Distance and Angle Measurements: Principles, Advantages, and Applications," by C. Zanoni (VDI Berichte NR. 749, pp. 93–106, 1989) may be incorporated into the apparatus of FIGS. 1a–j without significantly departing from the spirit and scope of the preferred first embodiment of the present invention.

Figure 1B:
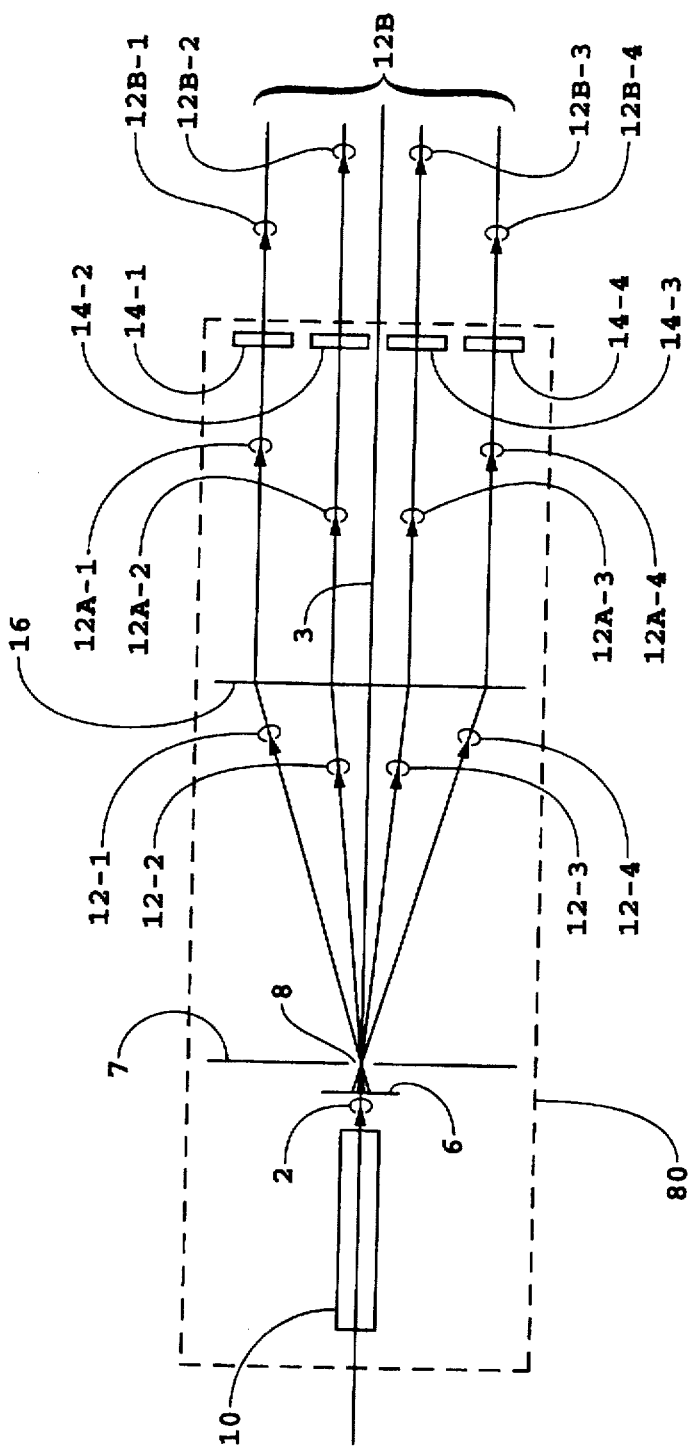

FIG. 1b depicts in schematic form one embodiment of the subsystem 80 shown in FIG. 1a. For the first preferred embodiment, light source 10 is preferably a point source or a spatially incoherent source of radiation across the surface of the source, preferably a laser or like source of coherent or partially coherent radiation, and preferably polarized. Light source 10 emits input beam 2 aligned with optical axis 3 of subsystem 80. As shown in FIG. 1b, input beam 2 enters focusing lens 6 and is focused at pinhole 8 in image plane 7. Light beam 12 comprised of a plurality of light beams 12-1,-2,-3,-4 diverges from the pinhole 8 and enters lens 16 having an optical axis aligned with optical axis 3 of subsystem 80. Light beam 12 emerges from lens 16 as collimated light beam 12A comprised of light beams 12A-1,-2, -3,-4 and enters phase shifter 14. Phase shifter 14 is comprised of rectangular phase shifters 14-1,-2,-3,-4 which are located so that their respective optical axes are parallel to optical axis 3 of subsystem 80. Note that the number of phase shifters may be any suitable number 2 m, m being an integer. The example shown in FIG. 1b is for the case of m=2, the case of four phase shifters being sufficient to clearly show the relationship between the components of the apparatus of the present invention. Parallel light beams 12A-1,-2,-3,-4 pass through phase shifters 14-1,-2,-3,-,4, respectively, and emerge from phase shifter 14 as light beams 12B-1,-2,-3,-4, respectively, which comprise light beam 12B. Each of the phase shifters 14-2 and 14-4 introduce a phase shift of $\pi$ radians more than the phase shift introduced by each of the phase shifters 14-1 and 14-3, the phase shifts introduced by phase shifters 14-1 and 14-3 being the same.

Figure 1C:
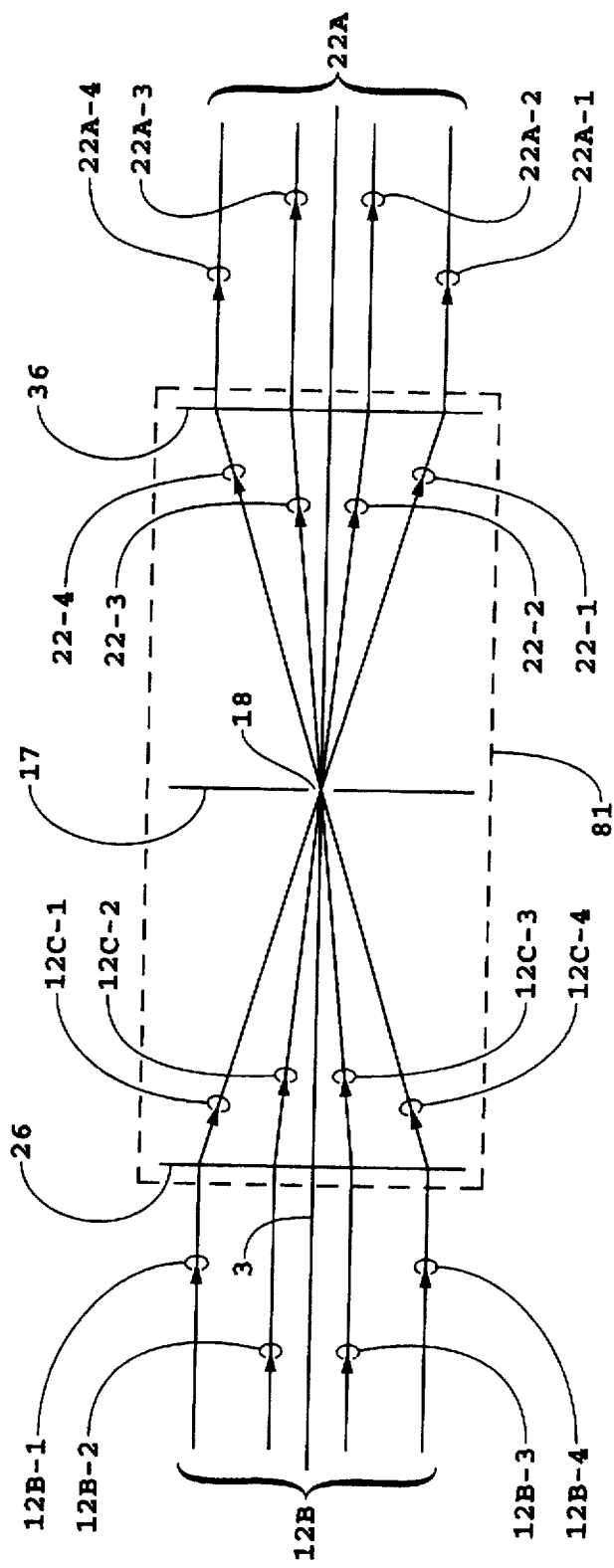

In FIG. 1a, light beam 12B exits subsystem 80 and enters subsystem 81. In FIG. 1c, light beam 12B enters lens 26 and emerges as light beam 12C comprised of light beams 12C-1,-2,-3,-4. Lens 26 focuses light beam 12C to point image 18 in in-focus image plane 17. Light beam 12C emerges from point image 18 as light beam 22 comprised of light beams 22-1,-2,-3,-4. Light beam 22 enters lens 36 having an optical axis aligned with optical axis 3 subsystem 81. Light beam 22 emerges from lens 36 and exits subsystem 81 as collimated light beam 22A comprised of light beams 22A-1,-2,-3,-4.

Figure 1D:
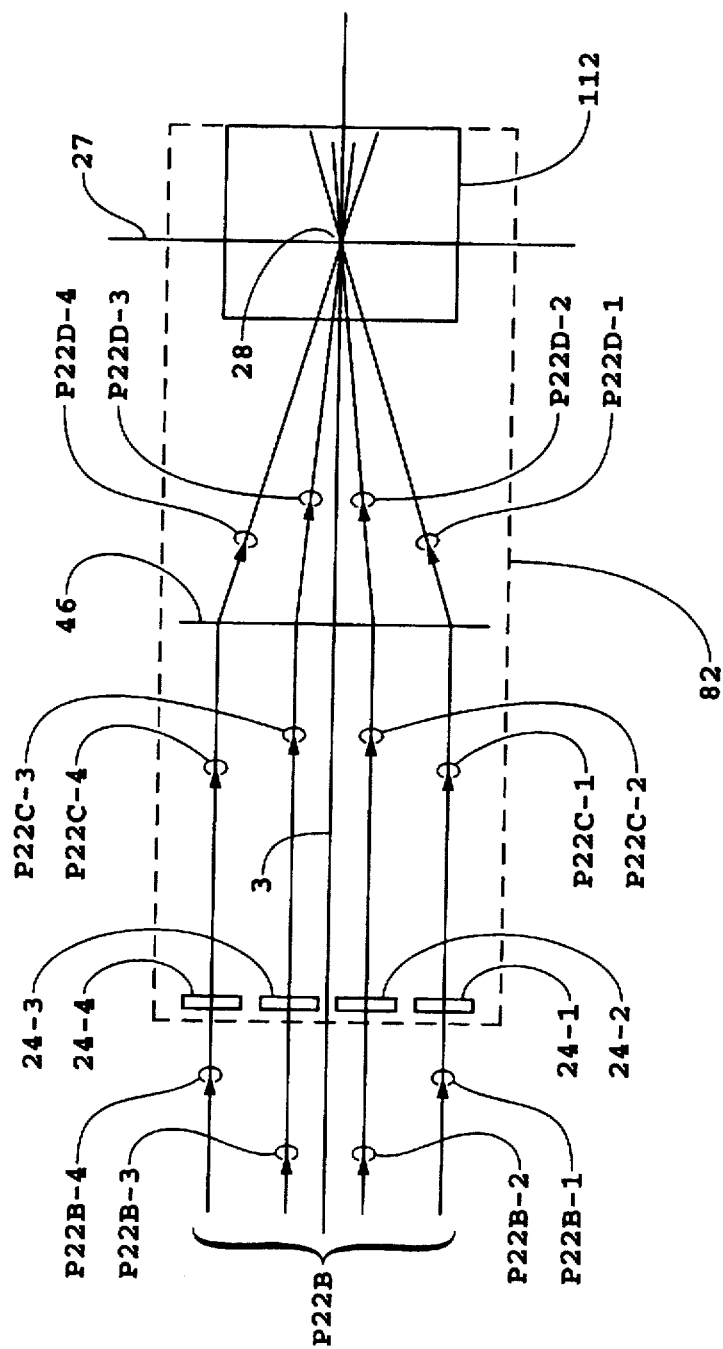

As shown in FIG. 1a, light beam 22A is partially transmitted by beam splitter 100 as light beam P22B comprised of light beams P22B-1,-2,-3,-4 and enters subsystem 82 which is shown in FIG. 1d.

In FIG. 1d, light beam P22B impinges onto a phase shifter 24 comprised of phase shifters 24-1,-2,-3,-4. Phase shifter 24 is comprised of the same number of 2m elements as phase shifter 14 and is shown in FIG. 1d with m=2. Light beams P22B-1,-2,-3,-4 pass through phase shifters 24-1,-2,-3,-4, respectively, and emerge as light beam P22C comprised of light beams P22C-1,-2,-3,-4, respectively. The phase shifts introduced by phase shifters 24-1 and 24-3 are of equal values which are $\pi$ radians more than the phase shift introduced by either phase shifter 24-2 or 24-4, the phase shifts introduced by phase shifters 24-2 and 24-4 being of equal values.

The sum of the phase shifts produced by each pair of phase shifters 14-1 and 24-1, 41-2 and 24-2, 14-3 and 24-3, and 14-4 and 24-4 is $\pi$ radians. Thus there is no net relative phase shift between any two of the light beams P22C-1,-2, -3,-4. Light beam P22C passes through lens 46 as light beam P22D comprised of light beams P22D-1,-2,-3,-4 which is focused to point image 28 in in-focus image plane 27 in object material 112. Optical axis of lens 46 is aligned with optical axis 3 of subsystem 82.

Figure 1E:
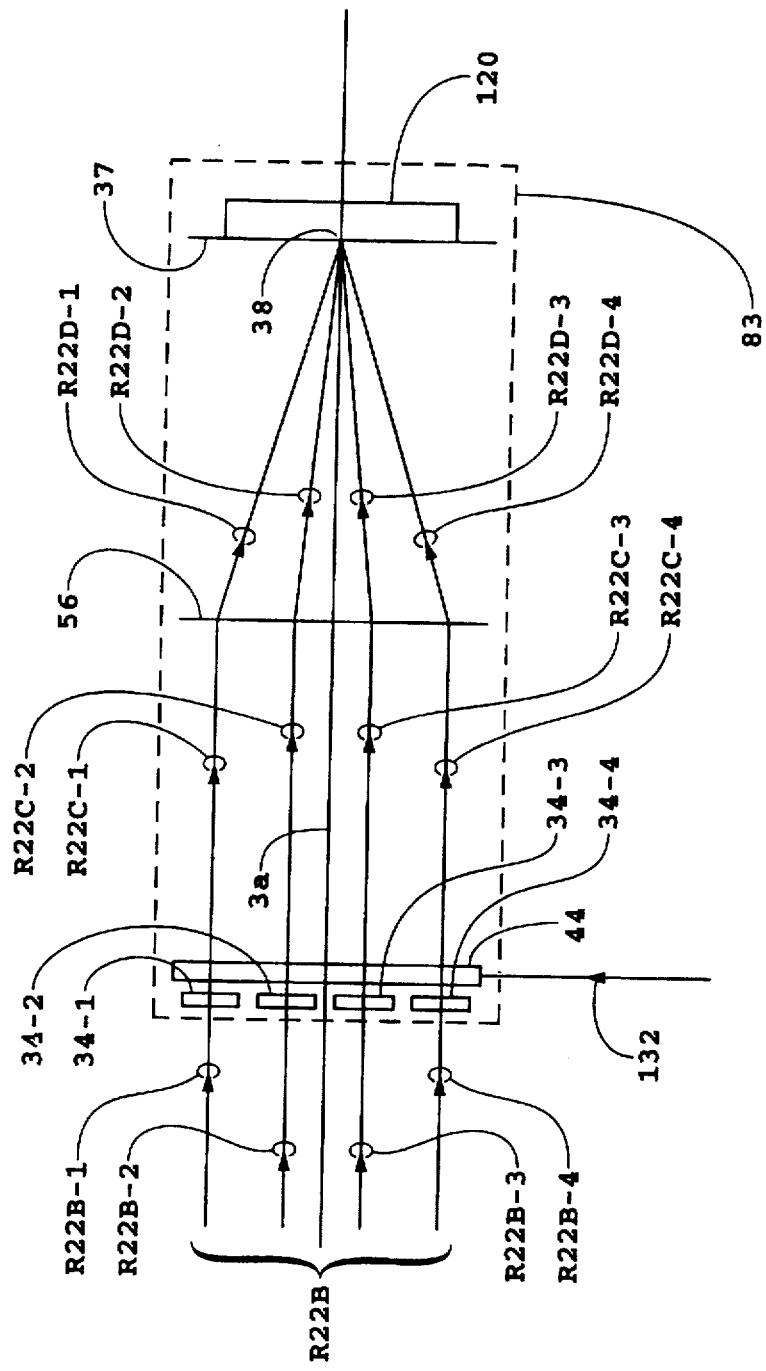

In FIG. 1a, light beam 22A is partially reflected by beam splitter 100 as light beam R22B comprised of light beams R22B-1,-2,-3,-4. Light beam R22B enters subsystem 83 which is shown in FIG. 1e. As shown in FIG. 1e, light beam R22B impinges on phase shifter 34 comprised of phase shifters 34-1,-2,-3,-4. Phase shifter 34 contains the same number of elements, 2 m, as phase shifter 14 and is shown in FIG. 1e with m=2. Light beam R22B passes through phase shifter 34 and then through phase shifter 44 to emerge as light beam R22C comprised of light beams R22C-1,-2,-3-4. The phase shift introduced by phase shifter 44 is controlled by signal 132 from computer 118. The phase shifts introduced by phase shifters 34-1 and 34-3 are of equal values which are $\pi$ radians more than the phase shift introduced by either phase shifter 34-2 or 34-4, the phase shifts introduced by phase shifters 34-2 and 34-4 being of equal values. Thus there is no net relative phase shift between any two of the light beams R22C-1,-2,-3,-4. Light beam R22C passes through lens 56 as light beam R22D comprised of light beams R22D-1,-2,-3,-4. Light beam R22D is focused by lens 56 to point image 38 in in-focus image plane 37 on reference mirror 120. Optical axis of lens 56 is aligned with optical axis 3a of subsystem 83.

Figure 1F:
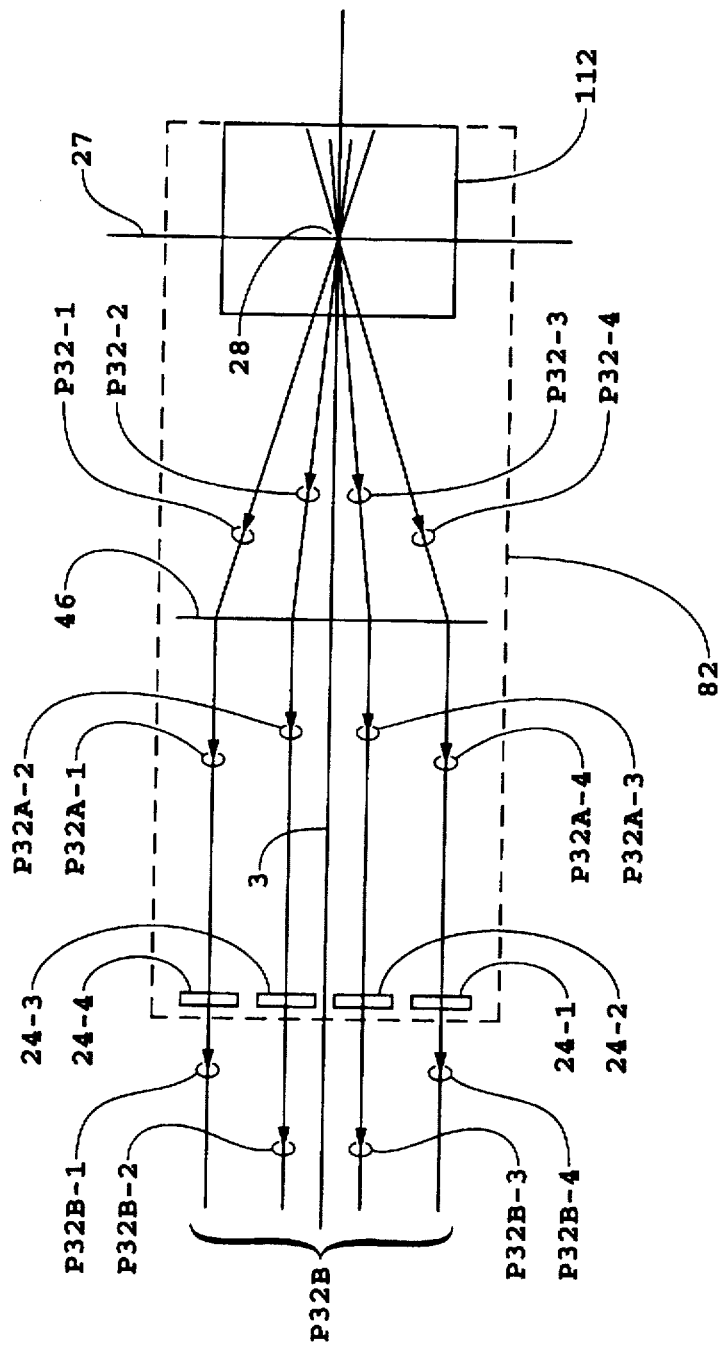

In FIG. 1f, a portion of light beam P22D (cf. FIG. 1d) is reflected and/or scattered by the object material at point image 28 as a plurality of light beams P32-1,-2,-3,-4 comprising light beam P32. Light beam P32 diverges from point image 28 in in-focus image plane 27 and enter lens 46. As shown in FIG. 1f, light beam P32 emerges from lens 46 as collimated light beam P32A comprised of light beams P32A-1,-2,-3,-4. Light beams P32A-1,-2,-3,-4 pass through phase shifters 24-4,-3,-2,-1, respectively, and emerge as light beams P32B-1,-2,-3,-4, respectively. Light beams P32B-1,-2,-3,-4 comprise light beam P32B which exits subsystem 82. The phase shifts introduced by phase shifters 24-1 and 24-3 are of equal values which are $\pi$ radians more than the phase shift introduced by either phase shifter 24-2 or 24-4, the phase shifts introduced by phase shifters 24-2 and 24-4 being of equal values.

Figure 1G:
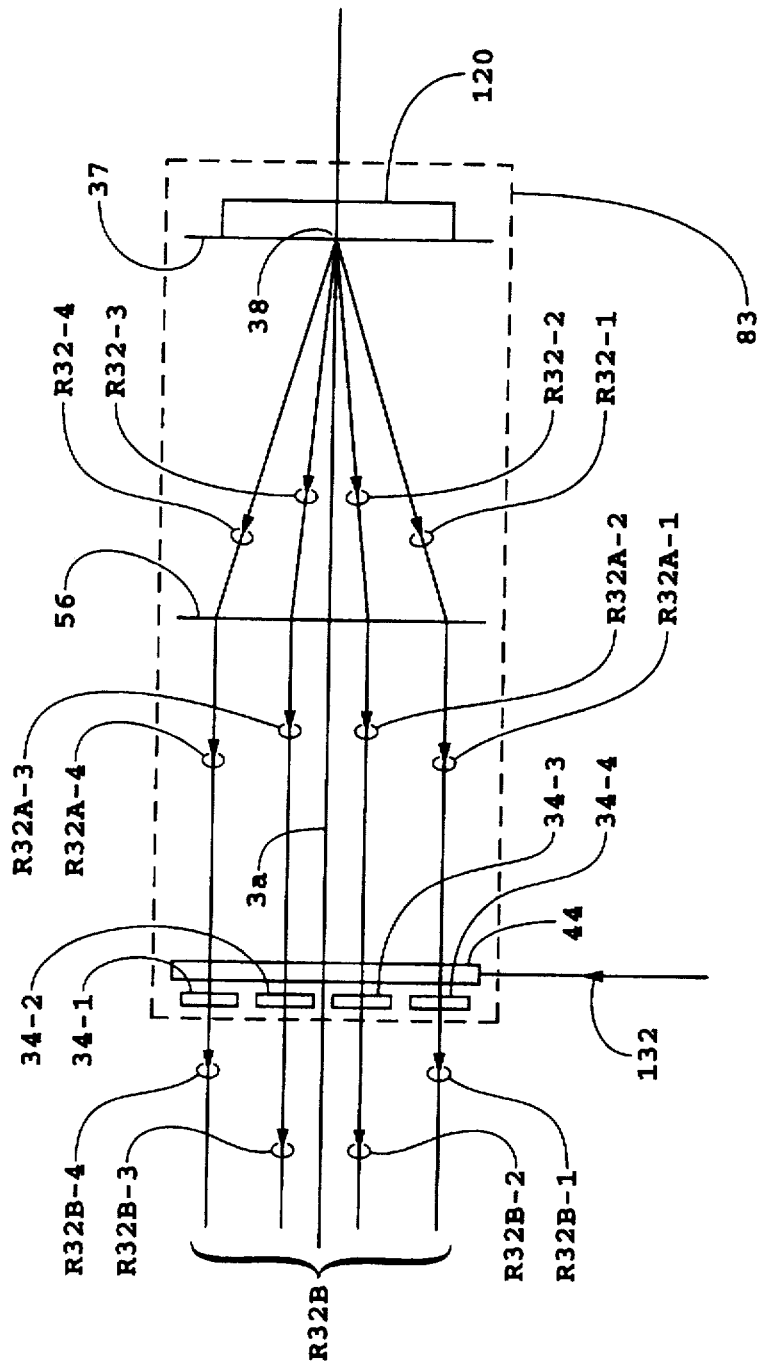

In FIG. 1g, light beam R22D (cf. FIG. 1e) is reflected by reference mirror 120 as light beam R32 comprised of light beams R32-1,-2,-3,-4. Light beam R32 diverges from point image 38 in in-focus image plane 37 and enters lens 56. As shown in FIG. 1g, light beam R32 emerges from lens 56 as collimated light beam R32A comprised of light beams R32A-1,-2,-3,-4. Light beams R32A-1,-2,-3,-4 pass first through phase shifter 44 and then through phase shifters 34-4,-3,-2,-1, respectively, to emerge as light beams R32B-1,-2,-3,-4, respectively. The phase shift introduced by phase shifter 44 is controlled by signal 132 from computer 118. The phase shifts introduced by phase shifters 34-1 and 34-3 are of equal values which are $\pi$ radians more than the phase shift introduced by either phase shifter 34-2 or 34-4, the phase shifts introduced by phase shifters 34-2 and 34-4 being of equal values. Light beams R32B-1,-2,-3,-4 comprise light beam R32B which exits subsystem 83.

Figure 1H:
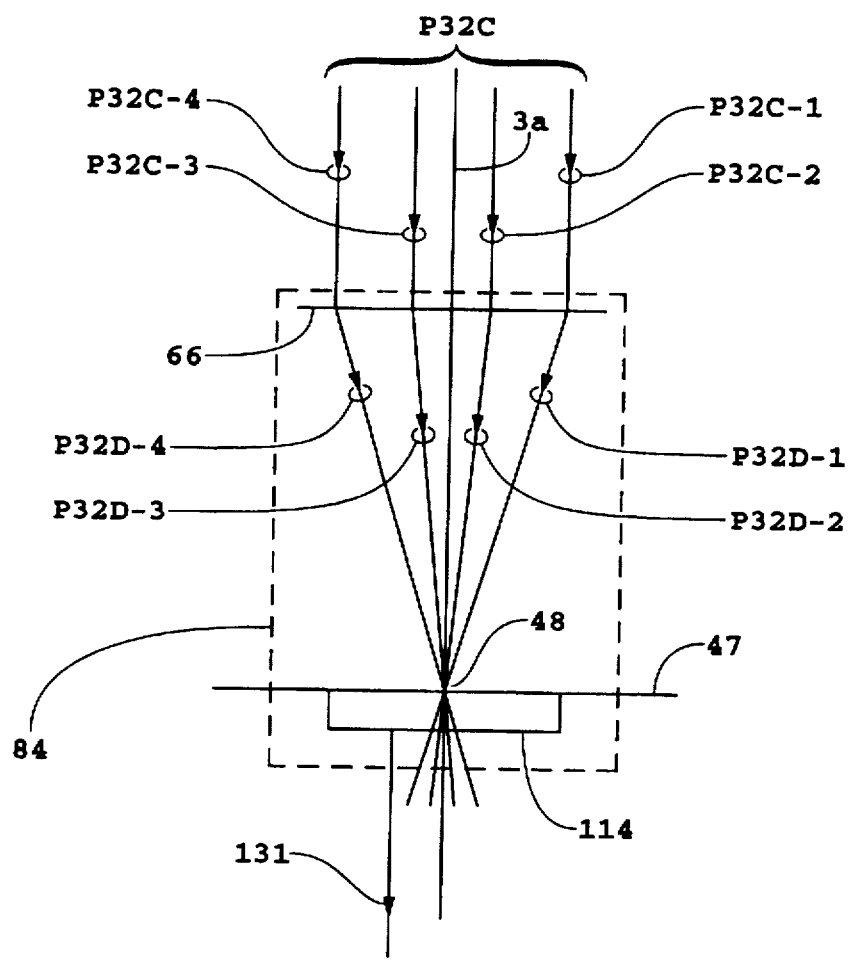

It is shown in FIG. 1a that light beam P32B is partially reflected by beam splitter 100 as light beam P32C which is comprised of light beams P32C-1,-2,-3,-4. Light beam P32C enters subsystem 84 which is shown in FIG. 1h, passes through lens 66 and emerges as light beam P32D comprised of light beams P32D-1,-2,-3,-4. Light beam P32D is focused by lens 66 to point image 48 in in-focus image plane 47 on single pixel detector 114. Optical axis of lens 66 is aligned with subsystem optical axis 3b of cell 84.

Figure 1I:
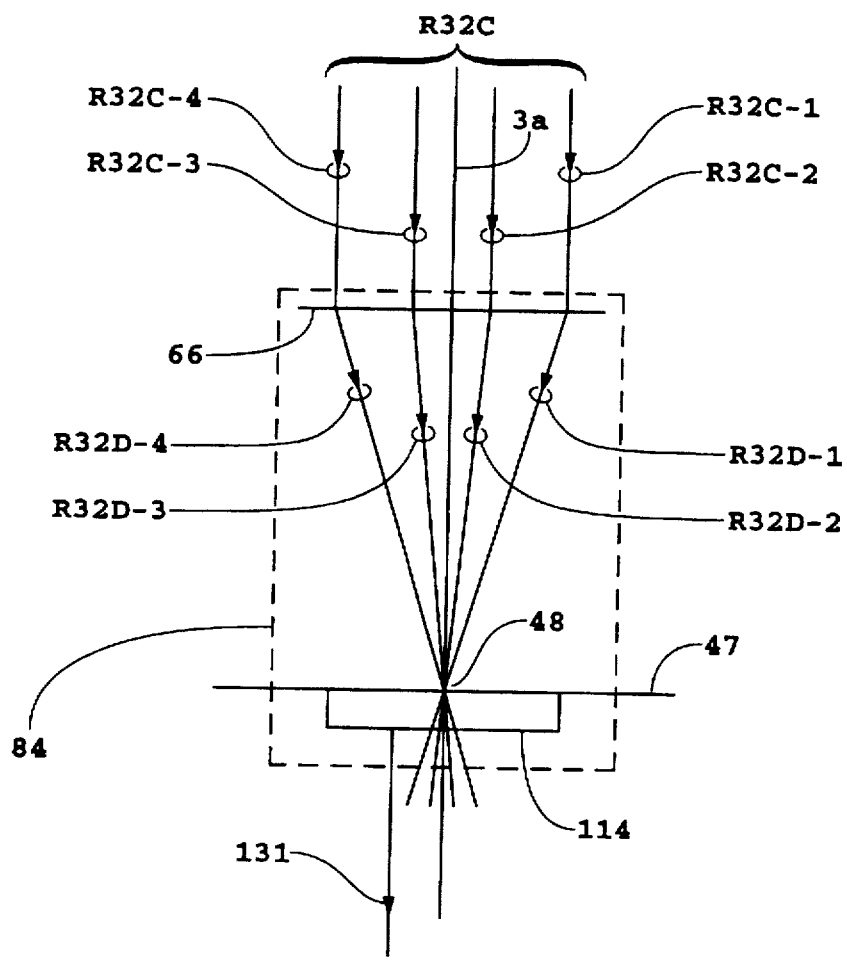

It is shown in FIG. 1a that light beam R32B is partially transmitted by beam splitter 100 as light beam R32C comprised of light beams R32C-1,-2,-3,-4. Light beam R32C enters subsystem 84 shown in FIG. 1i. In FIG. 1i, light beam R32C passes through lens 66 and emerges as light beam R32D comprised of light beams R32D-1,-2,-3,-4. Light beam R32D is focused by lens 66 to point image 48 in in-focus image plane 47 on single pixel detector 114.

Figure 1J:
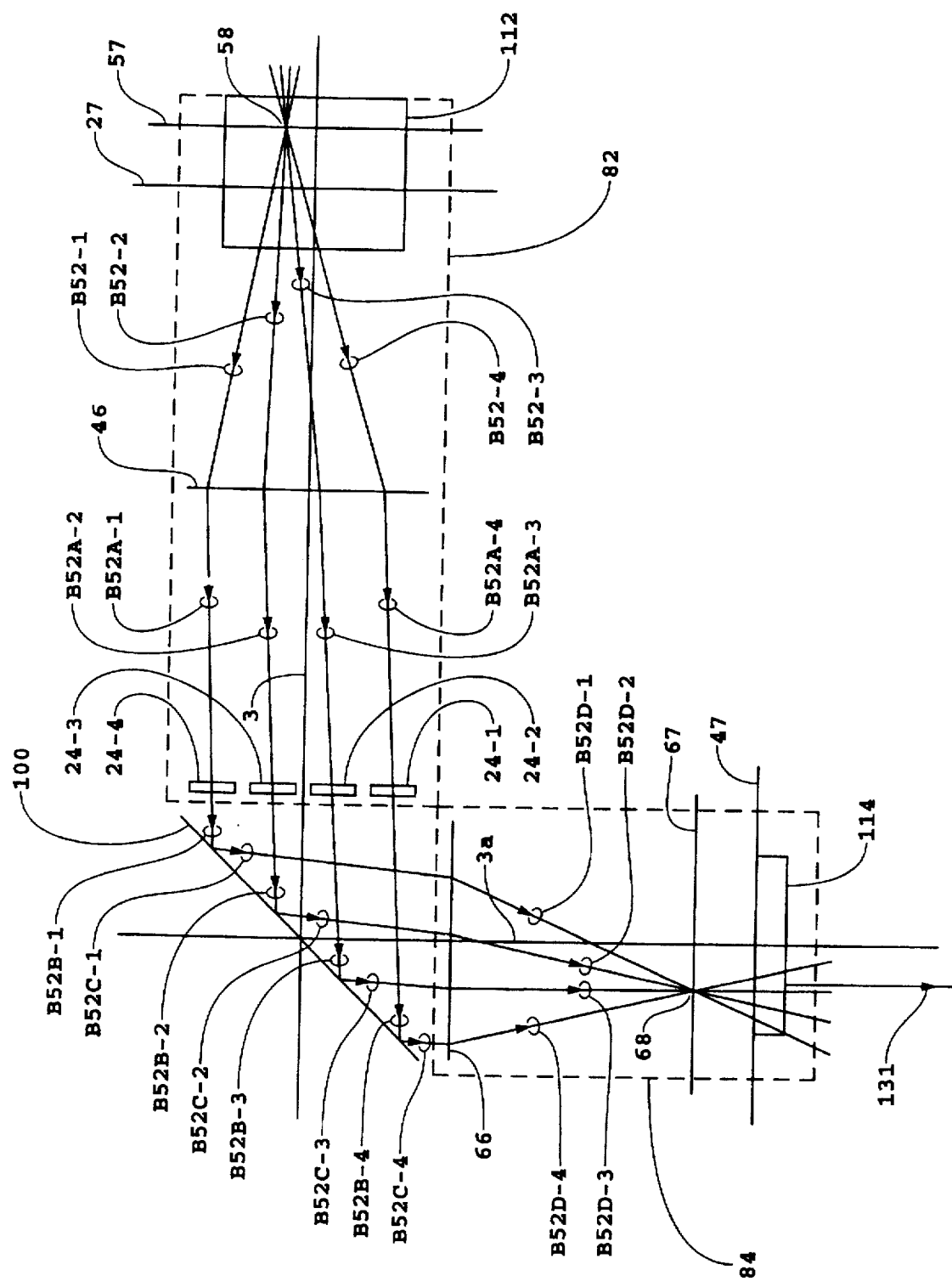

In FIG. 1j, a portion of light beam P22 (cf. FIGS. 1a and 1d) is reflected and/or scattered by the object material at an "out-of-focus" point image 58 in out-of-focus image plane 57 as light beam B52 comprised of a plurality of light beams B52-1,-2,-3,-4. Light beam B52 diverges from out-of-focus point image 58 and enter lens 46. As shown in FIG. 1j, light beam B52 emerges from lens 46 as substantially collimated light beam B52A comprised of light beams B52A-1,-2,-3,-4. Light beams B52A-1,-2,-3,-4 pass through phase shifters 24-4,-3,-2,-1, respectively, and emerge as light beams B52B-1,-2,-3,-4, respectively. Light beams B52B-1,-2,-3,-4 comprise light beam B52B. The phase shifts introduced by phase shifters 24-1 and 24-3 are of equal values which are $\pi$ radians more than the phase shift introduced by either phase shifter 24-2 or 24-4. Light beam B52B is partially reflected by beam splitter 100 as light beam B52C comprised of light beams B52C-1,-2,-3,-4. Light beam B52C passes through lens 66 and emerges as light beam B52D comprised of light beams B52D-1,-2,-3,-4. Light beam B52D is focused by lens 66 onto point image 68 in out-of-focus image plane 67 which is displaced from the in-focus image plane 47.

The operation of the apparatus of the present invention depicted in FIGS. 1a–j is based on the acquisition of a sequence of four intensity measurements by the single pixel detector 114. The sequence of the four intensity values $I_1$, $I_2$, $I_3$, and $I_4$ are made by the single pixel detector 114 with phase shifter 44 introducing a sequence of phase shifts (the total phase shift of the reference beam which includes the phase shifts produced in passing through phase shifter 44 in both directions) $\chi_0$, $\chi_0+\pi$, $\chi_0+\pi/2$, and $\chi_0+3\pi/2$ radians, respectively, where $X_0$ is some fixed value of phase shift. (Of course, the function of phase shifters 34 and 44 could be combined into a single phase shifter controlled by the computer 118.) The four intensity values $I_1$, $I_2$, $I_3$, and $I_4$ are sent to computer 118 as signal 131, in either digital or analog format, for subsequent processing. Conventional conversion circuitry, i.e., analog-to-digital converters, is included in either detector 114 or computer 118 for converting the four intensity values $I_1$, $I_2$, $I_3$, and $I_4$ to a digital format. The phase shift of phase shifter 44 is controlled by signal 132 which is generated and subsequently transmitted by computer 118 in accordance with subsequently set fourth Eq. (25). Phase shifter 44 can be of the electro-optical type or the type subsequently described herein for use in broadband operation with respect to optical wavelength. The intensity differences $I_1-I_2$ and $I_3-I_4$ are then computed by computer 118 according to subsequently set fourth Eqs. (24a) and (24b) and these differences contain with relatively high efficiency only the interference cross term between the complex amplitude of the in-focus scattered probe beam P32D and the complex amplitude of the in-focus reflected reference beam R32D.

The relatively high efficiency for isolation of the interference cross term between the complex amplitude of the in-focus scattered probe beam P32D (cf. FIG. 1h) and the complex amplitude of the in-focus reflected reference beam R32D (cf. FIG. 1i) is a consequence of two system properties. The first system property is that within a complex scale factor, the spatial distributions of the complex amplitudes of the in-focus scattered probe beam P32D and the in-focus reflected reference beam R32D at in-focus point image 48 are substantially the same for an arbitrary phase shift introduced by the phase shifter 44. The second system property is that the interference cross term between the complex amplitude of the in-focus scattered probe beam P32D and the complex amplitude of the in-focus reflected reference beam R32D changes sign when the phase shift introduced by phase shifter 44 is incremented or decremented by $\pi,3\pi,\ldots$ radians. Since the interference cross term between the complex amplitude of the in-focus scattered probe beam P32D and the complex amplitude of the in-focus reflected reference beam R32D changes sign when the phase shift introduced by phase shifter 44 is incremented or decremented by $\pi,3\pi,\ldots$ radians, this interference cross term does not cancel out in the intensity differences $I_1-I_2$ and $I_3-I_4$. However, all non interference cross terms, i.e. the intensities of the in-focus scattered probe beam P32D and of the in-focus reflected reference beam R32D will cancel out in the intensity differences $I_1-I_2$ and $I_3-I_4$. The referenced system properties are features that are in common with the confocal interference microscope and henceforth will be referred to as the "confocal interferometric system property".

For the out-of-focus scattered probe beam B52D (cf. FIG. 1j) at in-focus point image 48, the intensity differences $I_1-I_2$ and $I_3-I_4$ will contain only the interference cross term between the complex amplitude of the out-of-focus scattered probe beam B52D and the complex amplitude of the in-focus reflected reference beam R32D as a consequence of the confocal interferometric system property. However, the size of the interference cross term between the complex amplitude of the out-of-focus scattered probe beam B52D and the complex amplitude of the in-focus reflected reference beam R32D will be greatly reduced in relation to the corresponding interference cross term in the prior art confocal interference microscope.

For the common case where both the in-focus scattered probe beam P32D and the out-of-focus scattered probe beam B52D are present simultaneously, there will be two interference cross terms present in the intensity differences $I_1-I_2$ and $I_3-I_4$, the interference cross term between the complex amplitude of the in-focus scattered probe beam P32D and the complex amplitude of the in-focus reflected reference beam R32D and the interference cross term between the complex amplitude of the out-of-focus scattered probe beam B52D and the complex amplitude of the in-focus reflected reference beam R32D. Note that the interference cross term between the complex amplitude of the out-of-focus scattered probe beam B52D and the complex amplitude of the in-focus scattered probe beam P32D cancel out in the intensity differences $I_1-I_2$ and $I_3-I_4$ as a consequence of the confocal interferometric system property.

The interference cross term between the complex amplitude of the out-of-focus scattered probe beam B52D and the complex amplitude of the in-focus reflected reference beam R32D is representative of the background from out-of-focus images. For the apparatus of the present invention in comparison to prior art interference confocal microscopy systems, the size of the interference cross term between the complex amplitude of the out-of-focus scattered probe beam B52D and the complex amplitude of the in-focus reflected reference beam R32D is in general reduced in magnitude whereas there is substantially no reduction in the magnitude of the interference cross term between the complex amplitude of the in-focus scattered probe beam P32D and the complex amplitude of the in-focus reflected reference beam R32D. The reduction of the interference cross term between the complex amplitude of the out-of-focus scattered probe beam B52D and the complex amplitude of the in-focus reflected reference beam R32D follows in part from the fact that the amplitude of a beam decreases as the distance to the image plane is increased. This property is the basis of the reduced background in prior-art confocal interference microscopy. However, in the apparatus of the present invention, the reduction in the magnitude of the interference cross term between the complex amplitude of the out-of-focus scattered probe beam B52D and the complex amplitude of the in-focus reflected reference beam R32D is enhanced in relation to that achieved in prior-art confocal interference microscopy The enhanced reduction referred to in the preceding paragraph is realized by the presence of phase shifters 14, 24, and 34. The phase shifters 14, 24, and 34 modify the spatial properties of the complex amplitudes of the in-focus scattered probe beam P32D, the in-focus reflected reference beam R32D, and the out-of-focus scattered probe beam B52D at the in-focus image plane 47. Although the spatial properties of the complex amplitudes of the in-focus scattered probe beam P32D and the in-focus reflected reference beam R32D are both modified by the phase shifters 14, 24, and 34, the modified spatial distributions of their respective complex amplitudes are substantially the same. This feature was noted earlier in relation to the discussion of the sensitivity of the intensity differences $I_1-I_2$ and $I_3-I_4$ to the interference cross term between the complex amplitude of the in-focus scattered probe beam P32D and the complex amplitude of the in-focus reflected reference beam R32D.

However, the respective modified spatial distributions of the complex amplitude of the out-of-focus scattered probe beam B52D and the complex amplitude of the in-focus reflected reference beam R32D on the in-focus image plane 47 are distinctly different. The complex amplitude of the in-focus reflected reference beam R32D is an antisymmetric function about the center of the in-focus reflected reference beam R32D. In contrast, that part of the out-of-focus scattered probe beam B52D which interferes with the complex amplitude of the in-focus reflected reference beam R32D is the complex amplitude associated principally with one of the light beams B52D-1,-2,-3, or B52D-4 as shown in FIG. 1j, which generally displays only small relative changes across the space of the in-focus image of the reflected reference beam R32D. Thus the spatial distribution of the interference cross term between the complex amplitude of the out-of-focus scattered probe beam B52D and the complex amplitude of the in-focus reflected reference beam R32D is comprised primarily of an antisymmetric distribution about the center of the in-focus reflected reference beam R32D.

The contribution of the interference cross term between the complex amplitude of the out-of-focus scattered probe beam B52D and the complex amplitude of the in-focus reflected reference beam R32D to the intensity value recorded by the single pixel detector 114 at point image 48 is the integral of this interference cross term across the space of the in-focus image of the reflected reference beam R32D. The integration of an antisymmetric function over a space interval centered about the function's axis of antisymmetry is identically zero. Thus the net contribution of the interference cross term between the complex amplitude of the out-of-focus scattered probe beam B52D and the complex amplitude of the in-focus reflected reference beam R32D to the intensity value recorded by the single pixel detector 114 at image point 48 is significantly reduced beyond that achieved in prior-art confocal interference microscopy.

For example, in the system of FIGS. 1a–j, the interference between the complex amplitude of the scattered probe beam B52D and the complex amplitude of the in-focus reflected reference beam R32D results in a substantially reduced number of photoelectrons generated in the single pixel detector 114 compared to the prior art. Since the statistical uncertainty of the integrated charge and hence the output signal is related to the square root of the integrated number of photoelectrons generated in the single pixel detector, the statistical error in the output signal is substantially reduced for the apparatus in FIGS. 1a–j.

It was noted in the detailed description of the first embodiment that there was no net relative phase-shift between any two of the light beams P22C-1,-2,-3,-4. This feature makes it possible to achieve the following objective enunciated in the detailed description of the first embodiment: the generation of conjugate images of pinhole 8 in in-focus image plane 27 in object material 112 and in in-focus image plane 37 on reference mirror 120 that are substantially unchanged by the presence of phase shifters 14 and 24 and phase shifters 14 and 34, respectively, but producing substantial changes in the in-focus images in in-focus image plane 47 which are conjugate to the image point 28 in object material 112 and to the image point 38 in in-focus image plane 37 on reference mirror 120.

Insight into the interrelationship between phase shifters 14, 24, and 34 may also be gained by considering what would be the consequence should phase shifter 14 be removed from the first embodiment. In this case, the in-focus reflected reference beam R32D would change from an antisymmetric function to a symmetric function with no substantial change in the spatial properties of the out-of-focus scattered probe beam B52D. Thus the spatial distribution of the interference cross term between the complex amplitude of the out-of-focus scattered probe beam B52D and the complex amplitude of the in-focus reflected reference beam R32D would be comprised primarily of an symmetric distribution about the center of the in-focus reflected reference beam R32D. But the integration of a symmetric function over a space interval centered about the function's axis of symmetry is not zero in general and there would be substantially no reduction in the intensity value recorded by the single pixel detector 114 at image point 48 beyond that achieved in prior-art confocal interference microscopy.

Although the foregoing refers to a particular in-focus image point 28 at a particular portion of object material 112, computer 118 can apply control signal 133 to translator 116 so as to position other portions of object material 112 at in-focus image point 28, to allow the system to "scan" a desired line section, plane section, or volume section of object material 112.

Figure 2A:
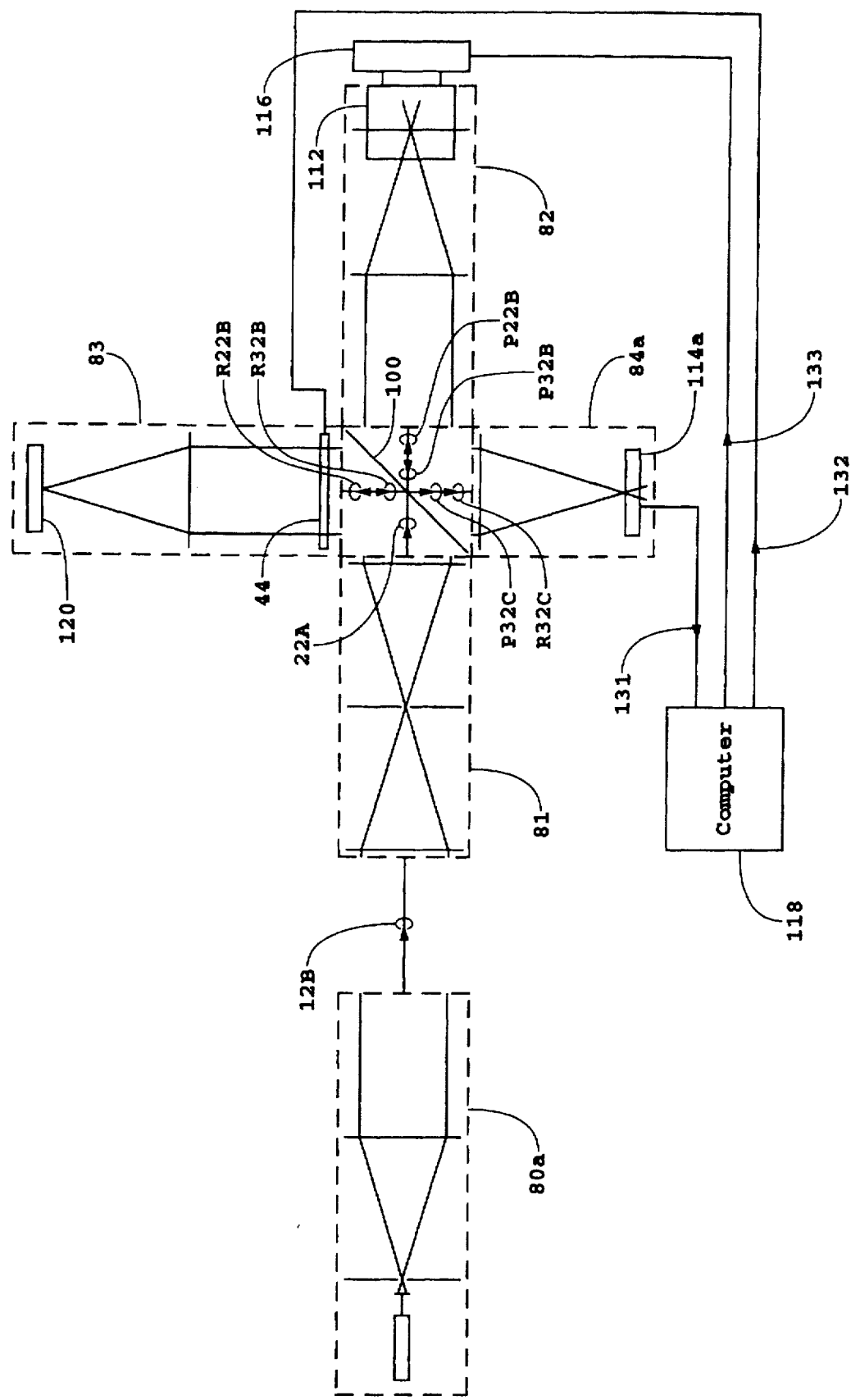
FIGS. 2a–d taken together illustrate, in schematic form, the presently preferred second embodiment of the present invention with FIG. 2a showing optical paths between subsystems 80a and 81, 81 and 82, 81 and 83, 82 and 84a, and 83 and 84a, paths of the electronic signals from computer 118 to translator 116 and to phase shifter 44 in subsystem 83, and path of electronic signal from detector 114a in subsystem 84a to computer 118.
Figure 2B:
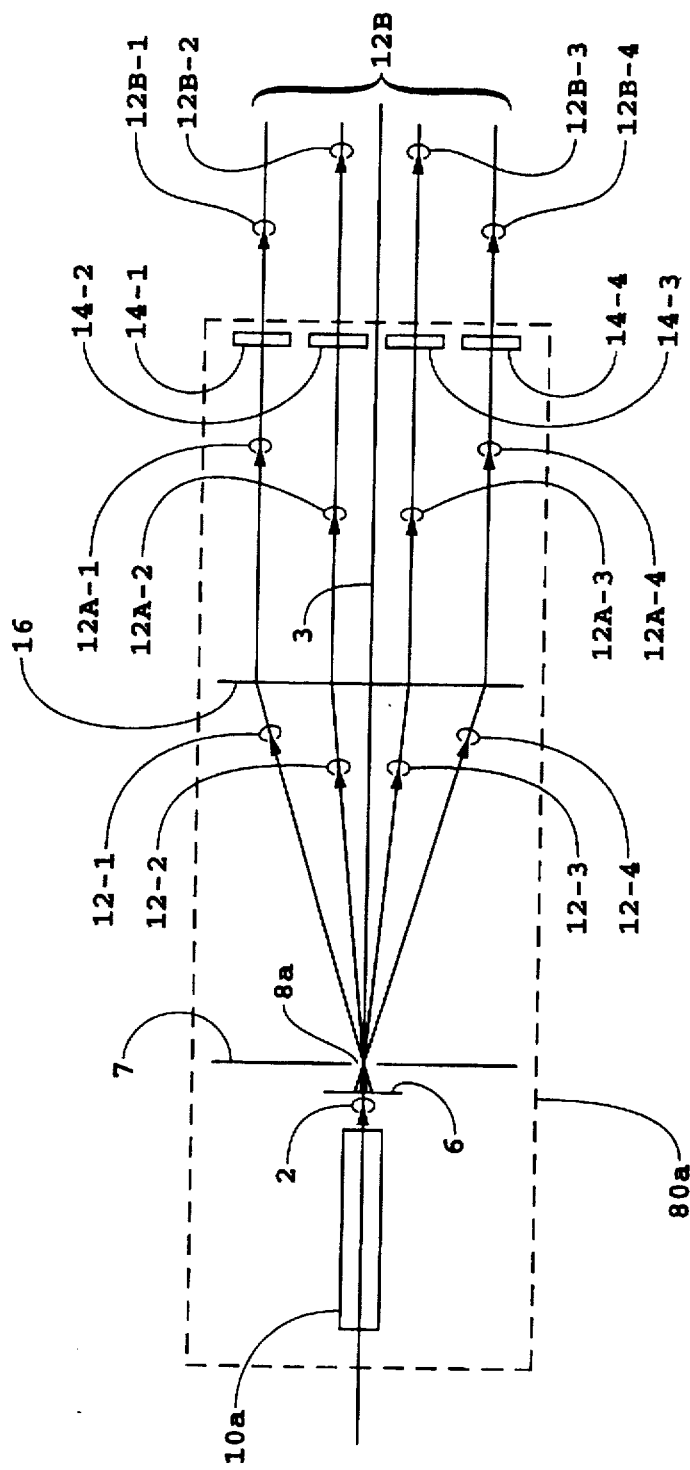
Figure 2C:
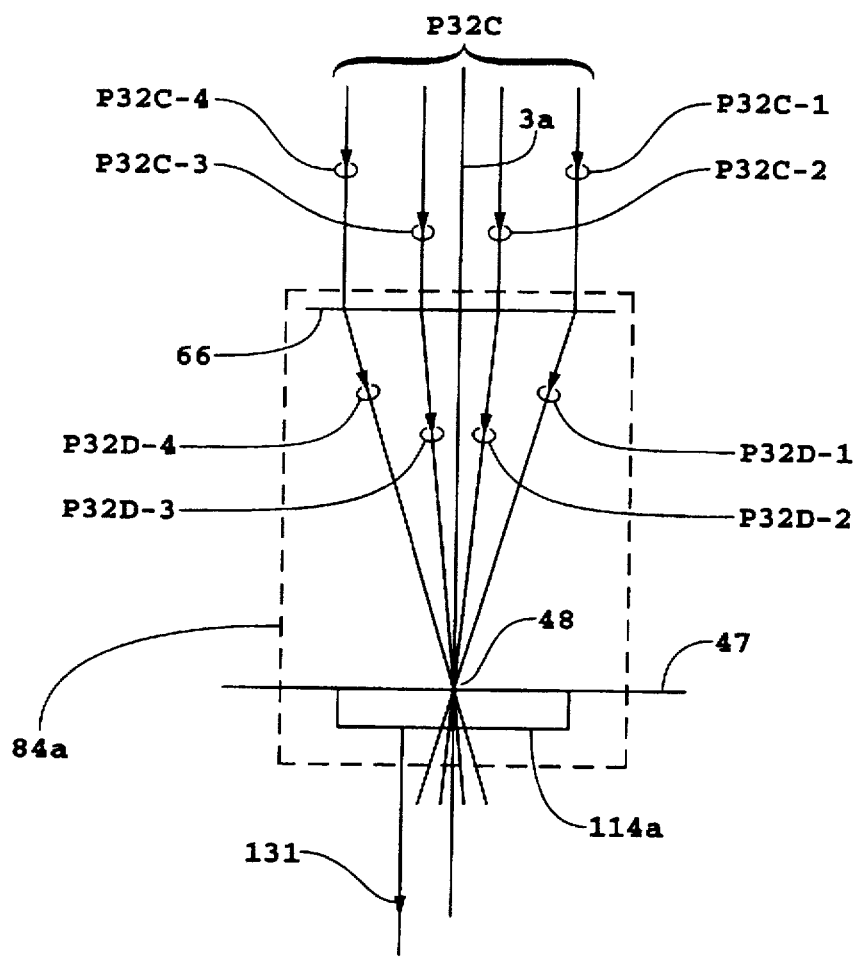
Figure 2D:
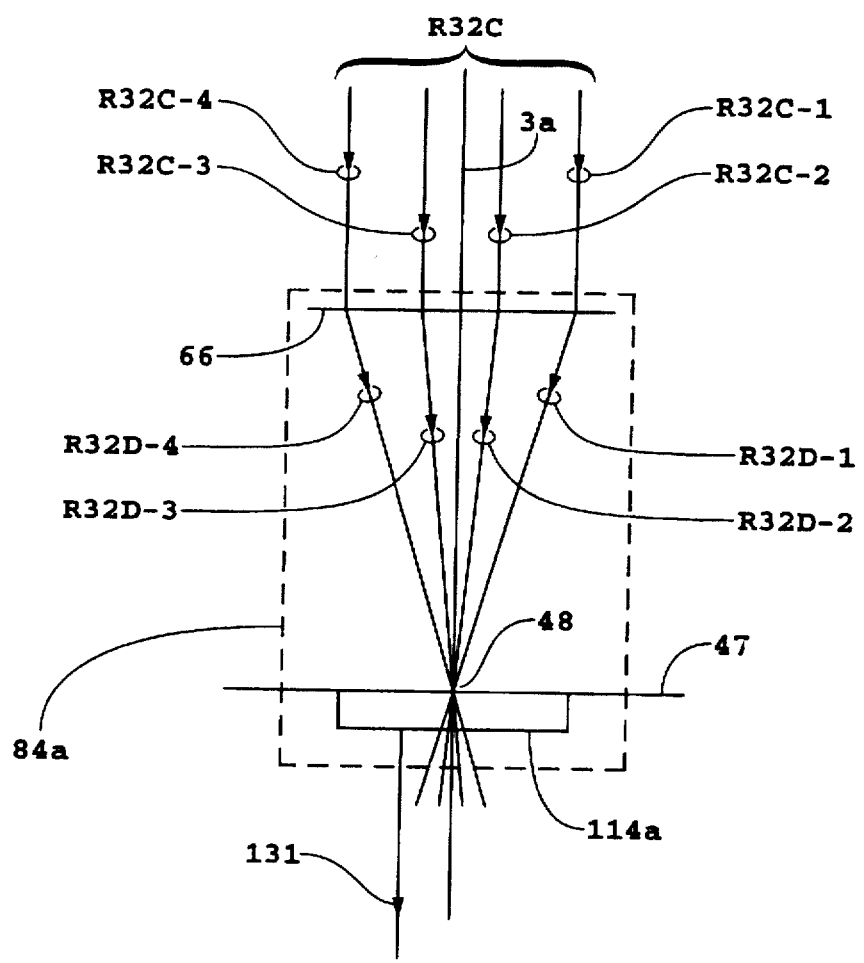

Referring now to FIGS. 2a–d, FIG. 2a depicts in schematic form a second embodiment of the instant invention in which the source subsystem 80a and the detector subsystem 84a are preferably configured for slit confocal microscopy. Like reference numerals are used in FIGS. 2a–d for like elements previously described with reference to FIGS. 1a–j. The modifications in subsystem 80a shown in FIG. 2b exist in the area of the source 10a which is now preferably comprised of a broadband, spatially incoherent line source, preferably a lamp filament or laser diode array, and in the area of the pinhole 8 of the first embodiment which is now preferably comprised of a linear array of source pinholes 8a aligned with the image of line source 10a formed by lens 6. The modifications in subsystem 84a shown in FIGS. 2c and 2d exist in the area of the detector 114a in which the pinhole in the image plane 47 of the first embodiment is now preferably a linear array of detector pinholes aligned with the image of the linear array of source pinholes 8a in image plane 47 and the single pixel detector 114 of the first embodiment is now preferably a linear array detector 114a comprised of a linear array of pixels. In FIG. 2b, the linear array of source pinholes 8a and source 10a are aligned perpendicular to the plane of FIG. 2b and in FIGS. 2c and 2d, the linear array of detector pinholes and the linear array of detector pixels are aligned perpendicular to the plane of FIGS. 2c and 2d.

The remainder of the second embodiment depicted in FIGS. 2a–d is preferably the same as described for the first preferred embodiment in the description of FIGS. 1a–j and will not be described again.

Referring now to FIGS. 3a–j, there is shown an alternative third embodiment of the present invention in which the paths for the reference and probe beams of the first preferred embodiment have been modified for the purpose of improving and optimizing the signal-to-noise ratio. The apparatus and electronic processing means for the third embodiment are substantially the same as for the first preferred embodiment with additional optical means which reconfigure the interferometer of the first embodiment so that the ratio of the amplitudes of the reference and probe beams can be adjusted, optical elements of the third preferred embodiment performing like operations as like denoted elements in the first preferred embodiment and the electronic processing means of the third preferred embodiment performing like operations as like denoted electronic operations of first preferred embodiment. The ratio of the amplitudes of the reference and probe beams are adjusted by altering the transmission/reflection coefficients of beam splitters 100, 100a, and 100b depicted in FIG. 3a. For example, in FIGS. 1a–j the progenitor beams of both the reflected reference beam R32D and the in-focus scattered probe beam P32D experience one transmission through and one reflection from beam splitter 100. Consequently, the ratio of the amplitudes of the reference beam R32D and probe beam P32D in FIGS. 1a–j can not be adjusted by altering the transmission/reflection coefficients of beam splitter 100. However, in FIGS. 3a–j the progenitor beams of reflected reference beam R32D undergo one transmission and one reflection at beam splitters 100 and 100a, respectively, while the progenitor beams of in-focus scattered probe beam P32D undergo one transmission at beam splitter 100a and one reflection and one transmission at beam splitter 100. Thus the progenitor beams of reflected reference beam R32D and the in-focus scattered probe beam P32D do not receive identical treatment by beam splitters 100 and 100a as in the case of FIGS. 1a–j. For example, in the embodiment of FIGS. 3a–j the ratio of the amplitudes of the reflected reference beam R32D and the in-focus scattered probe beam P32D can be increased by increasing the transmission coefficient of beam splitter 100 and/or the reflection coefficient of beam splitter 100a.

As shown in FIGS. 3a–j, the third preferred embodiment of the present invention is an interferometer comprised of beam splitters 100, 100a, and 100b, object material 112, a reference mirror 120, and a detector 114. This configuration is known in the art as a form of a Michelson interferometer, and is shown as a simple illustration. Other forms of interferometers known in the art such as a polarized Michelson interferometer and as described in an article entitled "Differential Interferometer Arrangements for Distance and Angle Measurements: Principles, Advantages, and Applications," by Zanoni op. cit. may be incorporated into the apparatus of FIGS. 3a–j without significantly departing from the spirit and scope of the preferred third embodiment of the present invention.

Figure 3A:
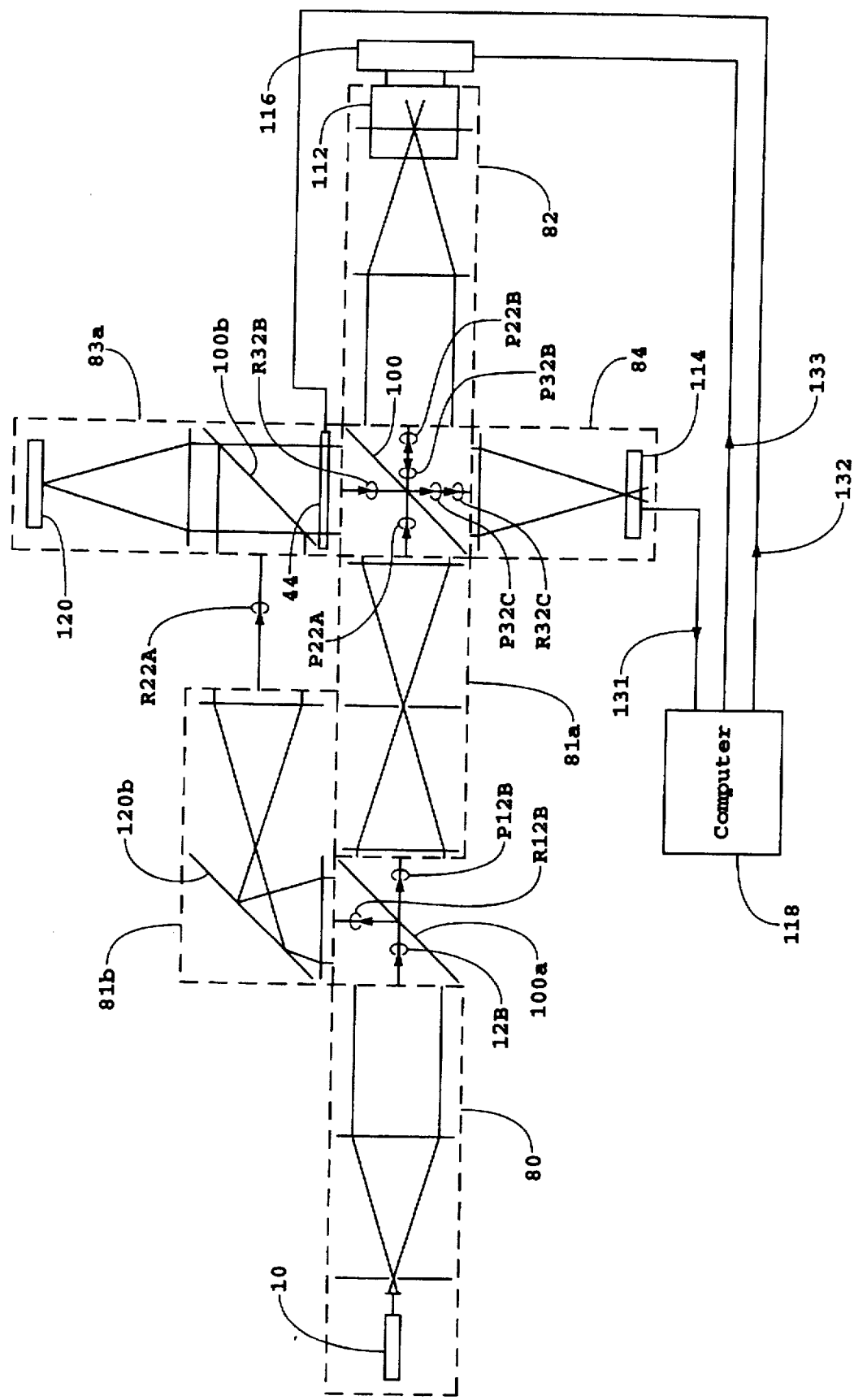
FIGS. 3a–j taken together illustrate, in schematic form, the presently preferred third embodiment of the present invention with FIG. 3a showing optical paths between subsystems 80 and 81a, 80 and 81b, 81a and 82, 81b and 83a, 82 and 84, and 83a and 84, paths of the electronic signals from computer 118 to translator 116 and to phase shifter 44 in subsystem 83a, and path of electronic signal from detector 114 in subsystem 84 to computer 118.
Figure 3B:
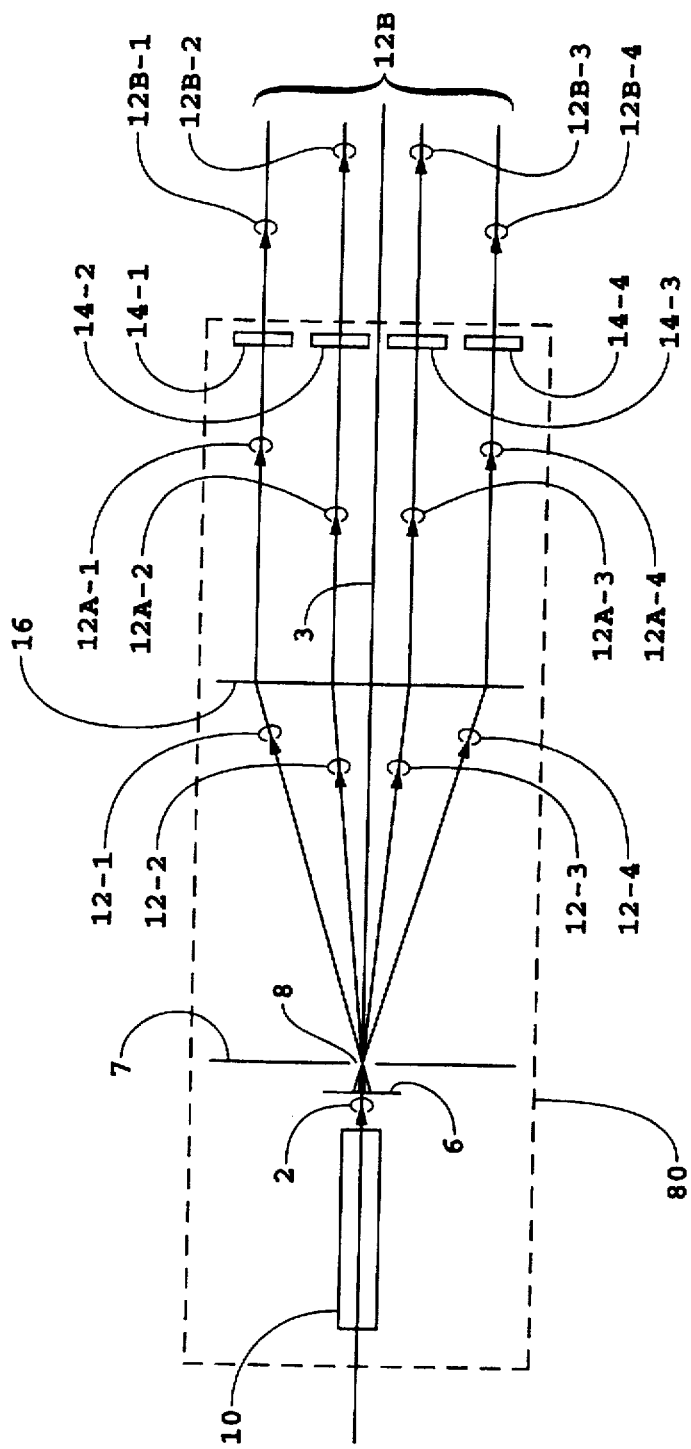

FIG. 3b depicts in schematic form the embodiment of the subsystem 80 shown in FIG. 3a. For the third preferred embodiment, light source 10 is preferably a point source or a spatially incoherent source of radiation across surface of the source, preferably a laser or like source of coherent or partially coherent radiation, and preferably polarized. Light source 10 emits input beam 2 aligned with the subsystem 80 optical axis 3. As shown in FIG. 3b, light beam 2 enters focusing lens 6 and is focused at pinhole 8 in image plane 7. Light beam 12, comprised of a plurality of light beams 12-1,-2,-3,-4, diverges from the pinhole 8 and enters lens 16 having an optical axis aligned with subsystem 80 optical axis 3. Light beam 12 emerges from lens 16 as collimated light beam 12A comprised of light beams 12A-1,-2,-3,-4 and enters phase shifter 14. Phase shifter 14 is comprised of rectangular phase shifters 14-1,-2,-3,-4 which are located so that their respective optical axes are parallel to optical axis 3 of subsystem 80. Note that the number of phase shifters may be any suitable number 2 m, m being an integer. The example shown in FIG. 3b is for the case of m=2, the case of four phase shifters being sufficient to clearly show the relationship between the components of the apparatus of the present invention. Parallel light beams 12A-1-2,-3,-4 pass through phase shifters 14-1,-2,-3,-4, respectively, and emerge from phase shifter 14 as light beams 12B-1,-2,-3,-4, respectively, which comprise light beam 12B. Each of the phase shifters 14-2 and 14-4 introduce a phase shift of π radians more the phase shift introduced by each of the phase shifters 14-1 and 14-3, the phase shifts introduced by phase shifters 14-1 and 14-3 being the same.

Figure 3C:
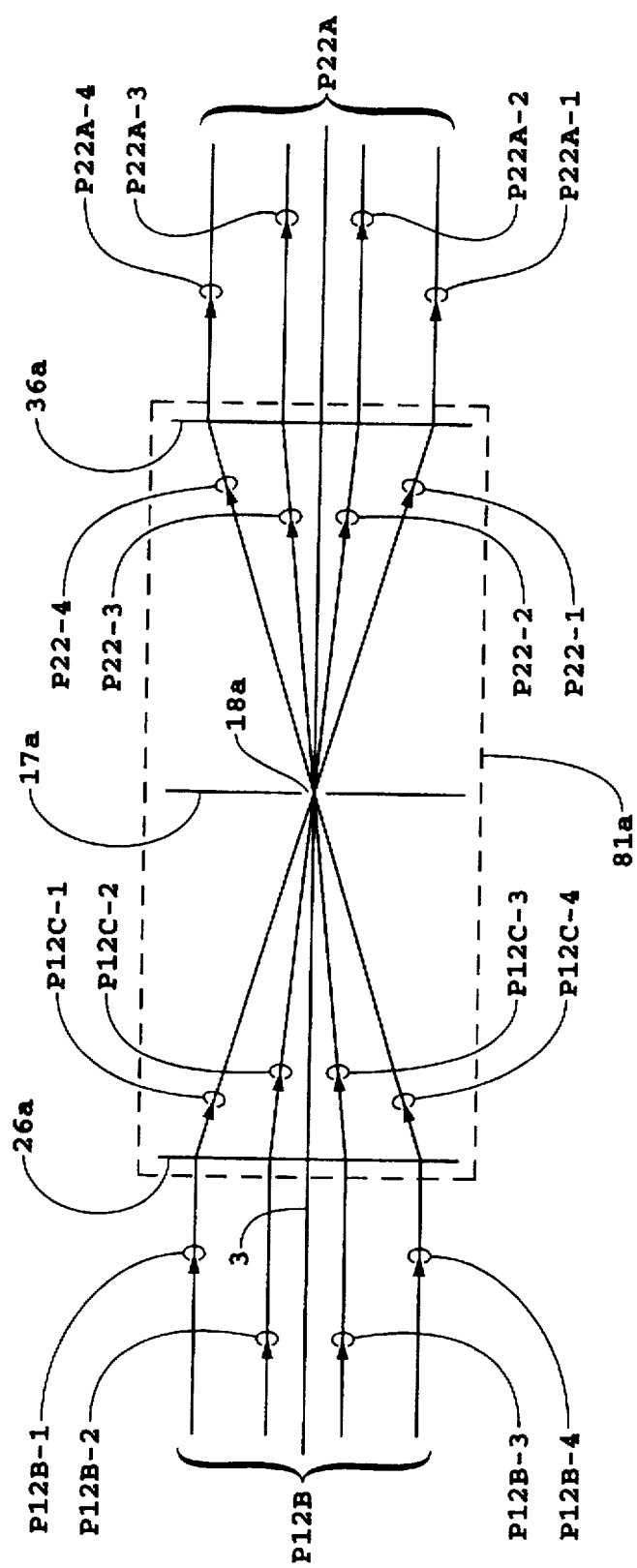

In FIG. 3a, light beam 12B exits subsystem 80 and is partially transmitted by beam splitter 100a as light beam P12B comprised of light beams P12B-1,-2,-3,-4. Light beam P12B enters subsystem 81a. In FIG. 3c, light beam P12B enters lens 26a and emerges as light beam P12C comprised of light beams P12C-1,-2,-3,-4. Lens 26a focuses light beam P12C to image point 18a in in-focus image plane 17a. Light beam P12C emerges from point image 18a as light beam P22 comprised of light beams P22-1,-2,-3,-4. Light beam P22 enters lens 36a having an optical axis aligned with optical axis 3 of subsystem 81a. Light beam P22 emerges from lens 36a and exits subsystem 81a as collimated light beam P22A comprised of light beams P22A-1,-2,-3,-4.

Figure 3D:
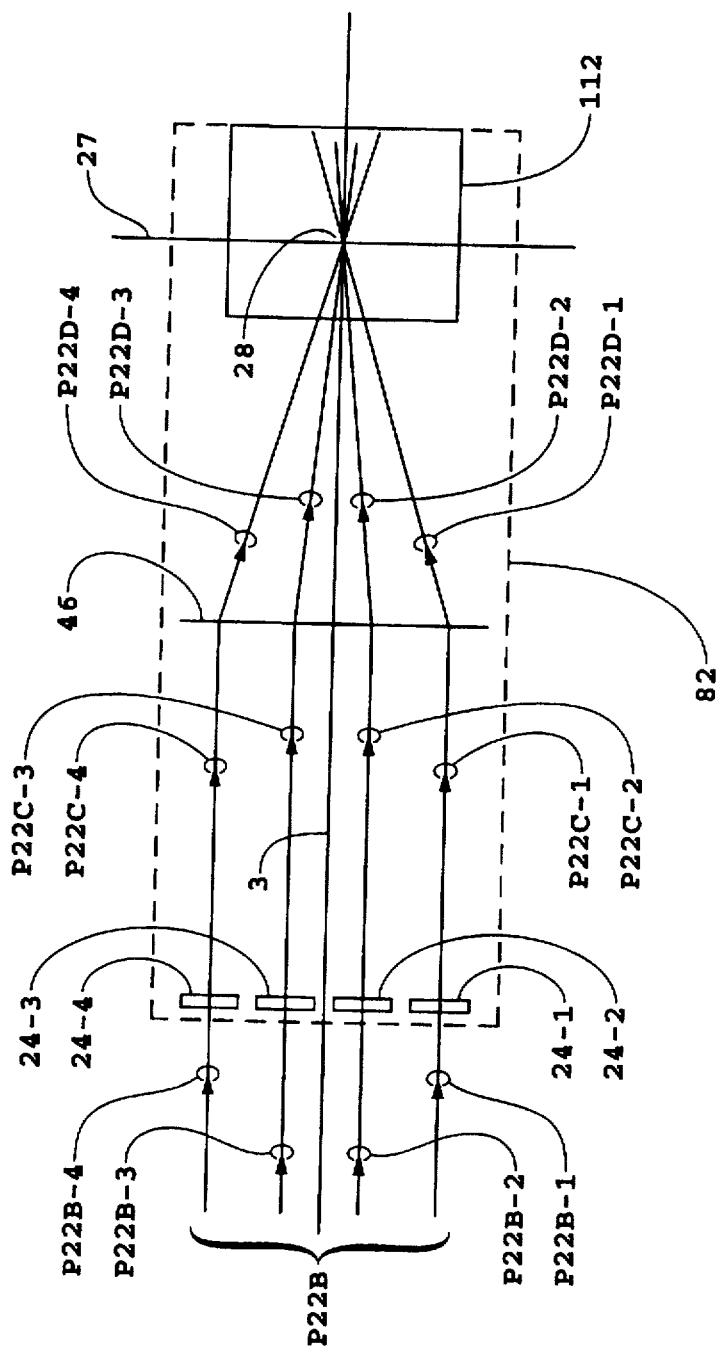

As shown in FIG. 3a, light beam P22A is partially transmitted by beam splitter 100 as light beam P22B comprised of light beams P22B-1,-2,-3,-4 and enters subsystem 82 shown in FIG. 3d.

In FIG. 3d, light beam P22B impinges onto a phase shifter 24 comprised of elements 24-1,-2,-3,-4. Phase shifter 24 is comprised of the same number of 2in elements as phase shifter 14 and is shown in FIG. 3d with m=2. Light beams P22B-1,-2,-3,-4 pass through phase shifters 24-1,-2,-3,-4, respectively, and emerge as light beam P22C comprised of light beams P22C-1,-2,-3,4, respectively. The phase shifts introduced by phase shifters 24-1 and 24-3 are of equal values which are π radians more than the phase shift introduced by either phase shifter 24-2 or 24-4, the phase shifts introduced by phase shifters 24-2 and 24-4 being of equal values. Thus, as previously explained, there is no net relative phase shift between any two of the light beams P22C-1,-2,-3,-4. Light beam P22C passes through lens 46 as light beam P22D comprised of light beams P22D-1,-2,-3,-4 which is focused to point image 28 in in-focus image plane 27 in object material 112. Optical axis of lens 46 is aligned with optical axis 3 of subsystem 82.

In FIG. 3a, light beam 12B is partially reflected by beam splitter 100a as light beam R12B comprised of light beams R12B-1,-2,-3,-4. Light beam R12B enters subsystem 81b.

Figure 3E:
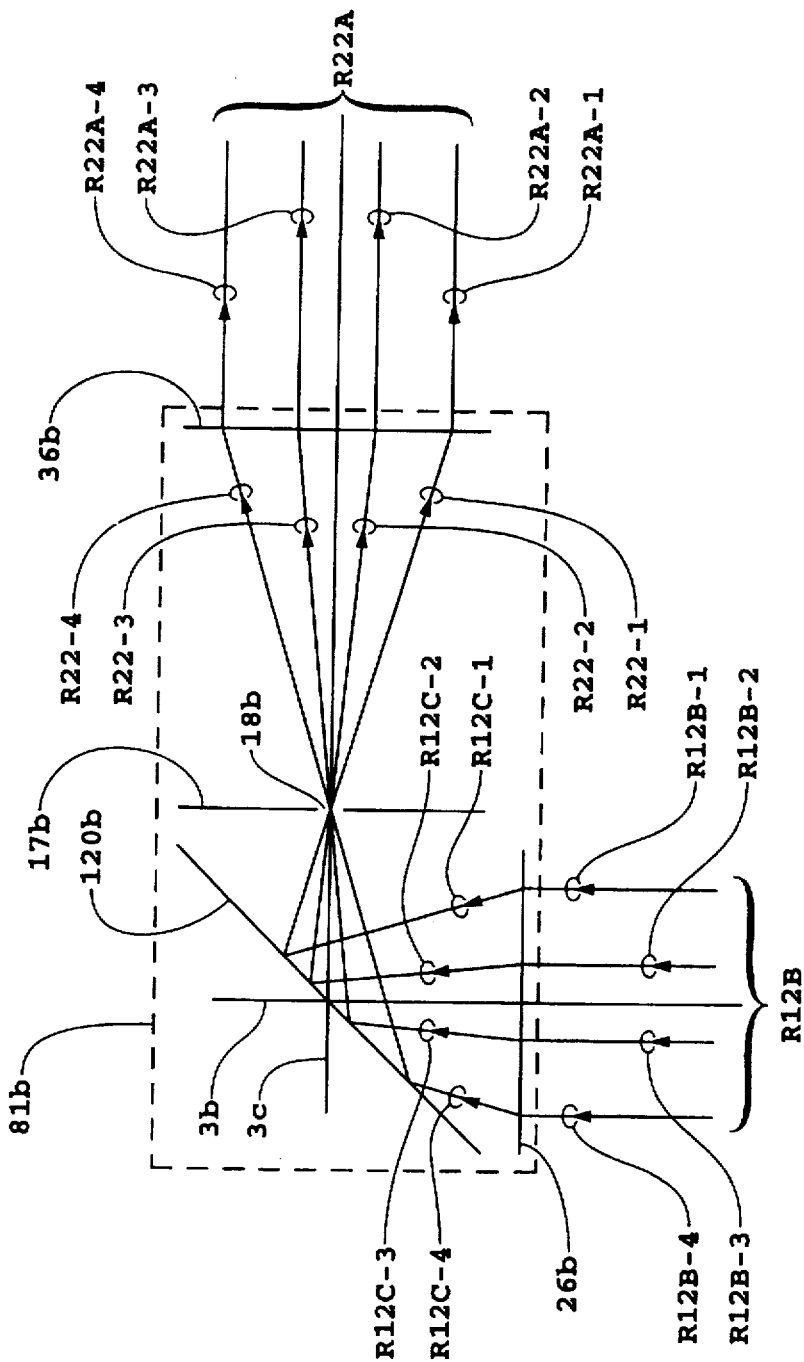

In FIG. 3e, light beam R12B enters lens 26b and emerges as light beam R12C comprised of light beams R12C-1,-2,-3,-4. Lens 26b has an optical axis aligned with optical axis 3b of subsystem 81b. Lens 26b in conjunction with plane mirror 120b focuses light beam R12C to point image 18b in in-focus image plane 17b. Light beam R12C emerges from point image 18b as light beam R22 comprised of light beams R22-1,-2,-3,-4. Light beam R22 enters lens 36b having an optical axis aligned with optical axis 3c of subsystem 81b. Light beam R22 emerges from lens 36b and exits subsystem 81b as collimated light beam R22A comprised of light beams R22A-1,-2,-3,-4.

Figure 3F:
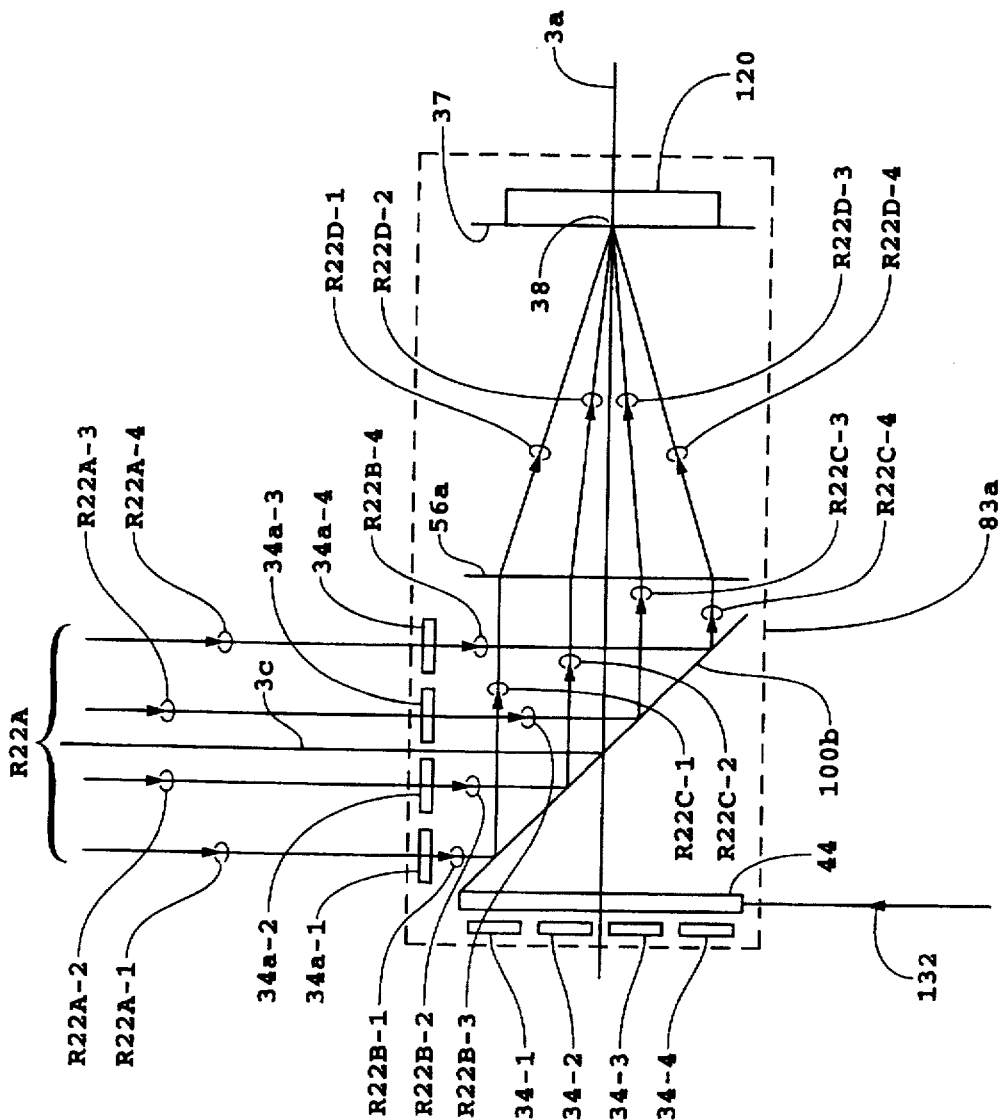

As shown in FIG. 3a, light beam R22A after exiting subsystem 81b enters subsystem 83a. In subsystem 83a shown in FIG. 3f, light beam R22A impinges on phase shifter 34a comprised of 34a-1,-2,-3,-4. Phase shifter 34a contains the same number of elements, 2 m, as phase shifter 14 and is shown in FIG. 3f with m=2. Light beam R22A passes through phase shifter 34a as lignt beam R22B which is then partially reflected as light beam R22C comprised of light beams R22C-1,-2,-3,-4. The phase shifts introduced by phase shifters 34a-1 and 34a-3 are of equal values which are $\pi$ radians more than the phase shifts introduced by either phase shifter 34a-2 or 34a-4, the phase shifts introduced by phase shifters 34a-2 and 34a-4 being of equal values. Thus there is no net relative phase shift between any two of the light beams R22C-1,-2,-3,-4. Light beam R22C passes through lens 56a as light beam R22D comprised of light beams R22D-1,-2,-3,-4. Light beam R22D is focused by lens 56a to point image 38 in in-focus image plane 37 on reference mirror 120. Optical axis of lens 56a is aligned with optical axis 3a of subsystem 83a.

Figure 3G:
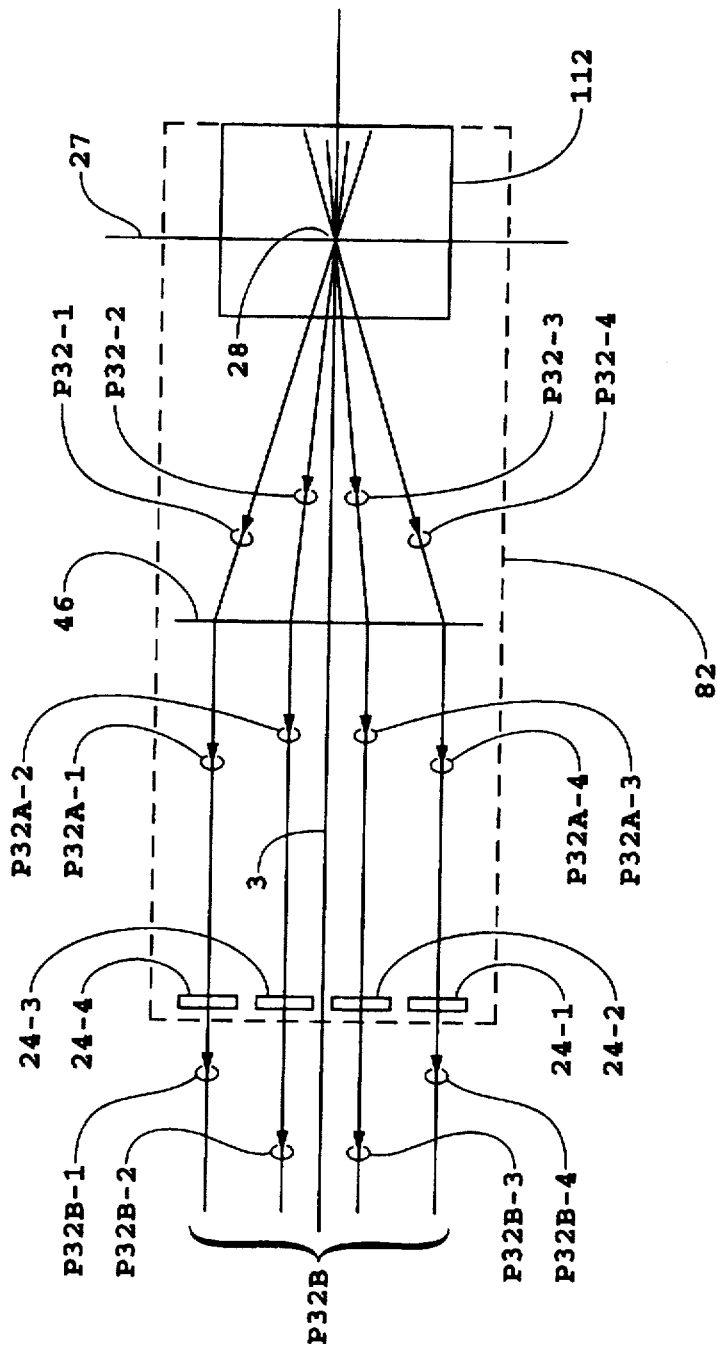

In FIG. 3g, a portion of light beam P22D (cf. FIG. 3d) is reflected and/or scattered by the object material at point image 28 as a plurality of light beams P32-1,-2,-3,-4 comprising light beam P32. Light beam P32 diverges from point image 28 in in-focus image plane 27 and enters lens 46. As shown in FIG. 3g, light beam P32 emerges from lens 46 as collimated light beam P32A comprised of light beams P32A-1,-2,-3,-4. Light beams P32A-1,-2,-3,-4 pass through phase shifters 24-4,-3,-2,-1, respectively, and emerge as light beams P32B-1,-2,-3,-4, respectively. Light beams P32B-1,-2,-3,-4 comprise light beam P32B which exits subsystem 82. The phase shifts introduced by phase shifters 24-1 and 24-3 are of equal values which are $\pi$ radians more than the phase shifts introduced by either phase shifter 24-2 or 24-4, the phase shifts introduced by phase shifters 24-2 and 24-4 being of equal values.

Figure 3H:
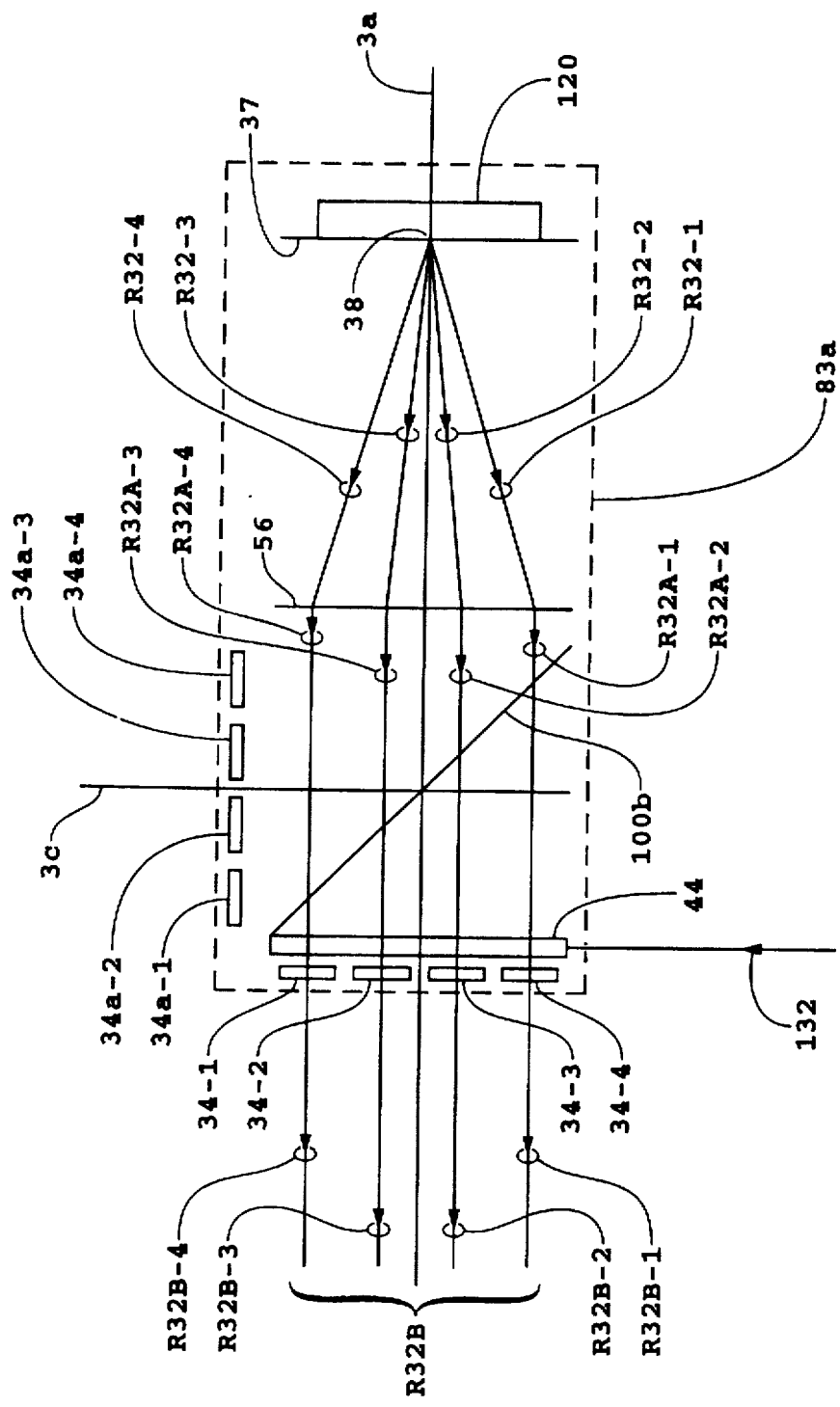
Figure 3I:
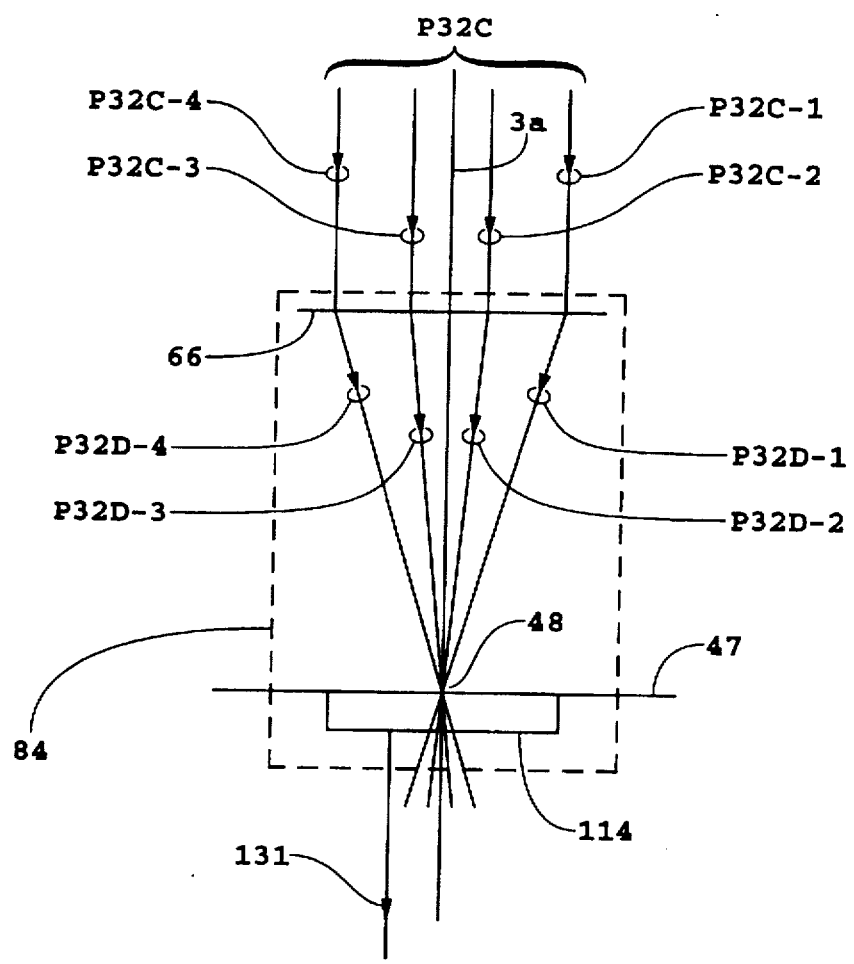

In FIG. 3h, light beam R22D (cf. FIG. 3f) is reflected by reference mirror 120 as light beam R32 comprised of light beams R32-1,-2,-3,-4. Light beam R32 diverges from point image 38 in in-focus image plane 37 and enters lens 56a. As shown in FIG. 3h, light beam R32 emerges from lens 56a as collimated light beam R32A comprised of light beams R32A-1,-2,-3,-4. Light beams R32A-1,-2,-3,-4 are partially transmitted by beam splitter 100b with the partially transmitted beams subsequently passing through phase shifter 44 and then through phase shifters 34-4,-3,-2,-,1, respectively, to emerge as light beams R32B-1,-2,-3,-4, respectively. The phase shift introduced by phase shifter 44 is controlled by signal 132 from computer 118. The phase shifts introduced by phase shifters 34-1 and 34-3 are of equal values which are $\pi$ radians more than the phase shifts introduced by either phase shifter 34-2 or 34-4, the phase shifts introduced by phase shifters 34-2 and 34-4 being of equal values. Light beams R32B-1,-2,-3,-4 comprise light beam R32B which exits subsystem 83a.

It is shown in FIG. 3a that light beam P32B is partially reflected by beam splitter 100 as light beam P32C which is comprised of light beams P32C-1,-2,-3,-4. Light beam P32C enters subsystem 84 shown in FIG. 3i, subsequently passes through lens 66, and emerges as light beam P32D comprised of light beams P32D-1,-2,-3,-4. Light beam P32D is focused by lens 66 to point image 48 in in-focus image plane 47 on single pixel detector 114. Optical axis of lens 66 is aligned with subsystem optical axis 3a of cell 84.

Figure 3J:
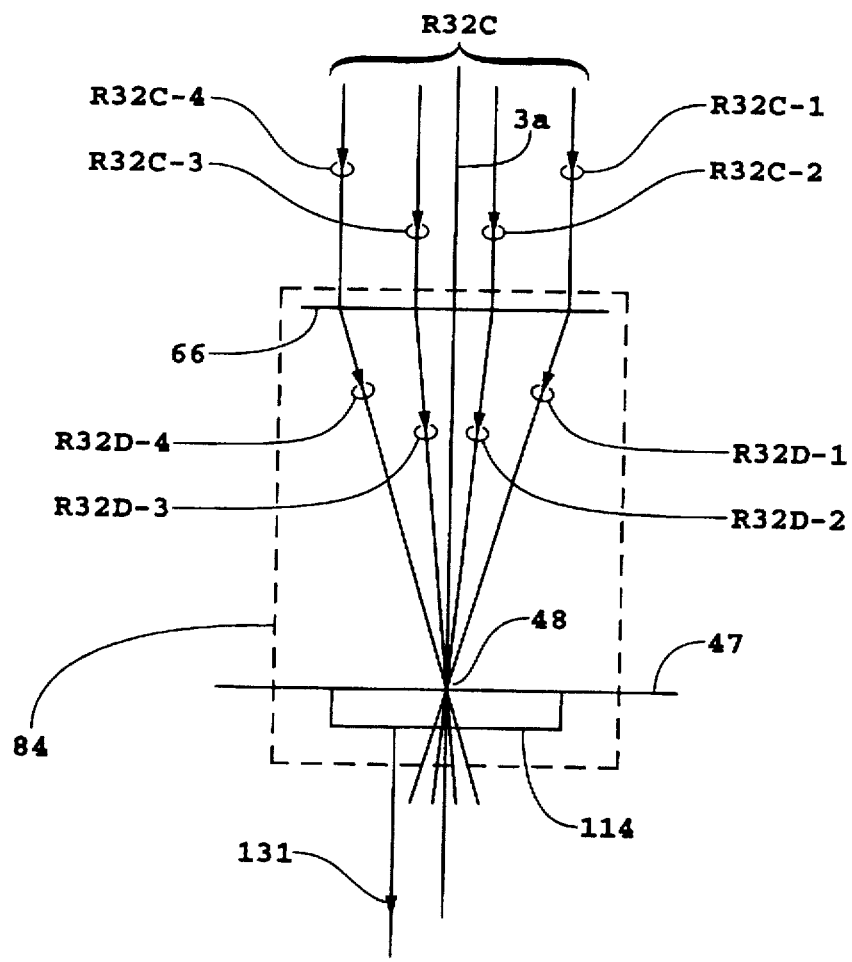

It is shown in FIG. 3a that light beam R32B is partially transmitted by beam splitter 100 as light beam R32C which is comprised of light beams R32C-1,-2,-3,-4. Light beam R32C subsequently enters subsystem 84 shown in FIG. 3j. In FIG. 3j, light beam R32C passes through lens 66 and emerges as light beam R32D comprised of light beams R32D-1,-2,-3,-4. Light beam R32D is focused by lens 66 to point image 48 in in-focus image plane 47 on single pixel detector 114.

The remainder of the third embodiment depicted in FIG. 3a–j is preferably the same as described in the description of FIGS. 1a–j and will not be described again.

Figure 4A:
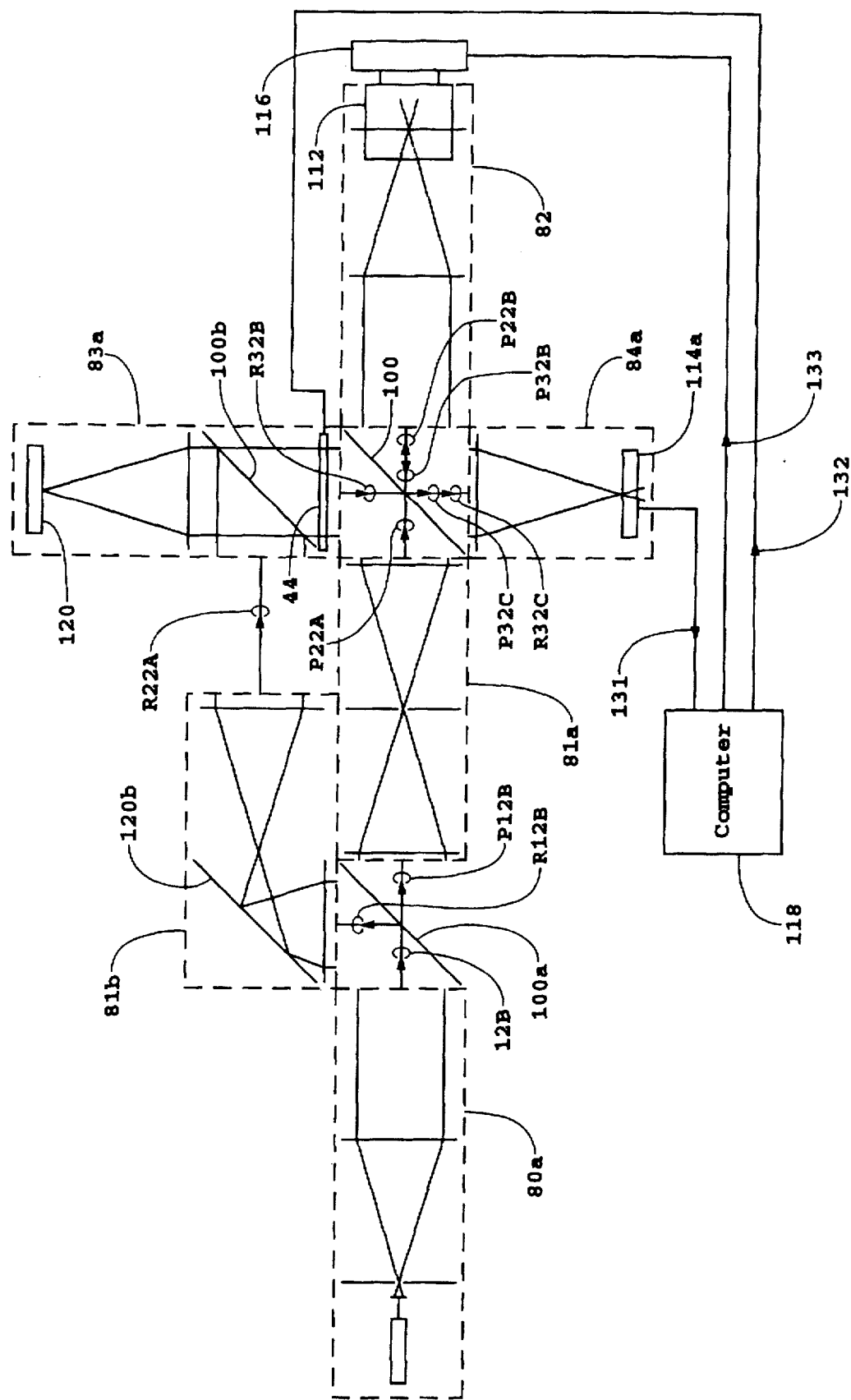
FIGS. 4a–d taken together illustrate, in schematic form, the presently preferred fourth embodiment of the present invention with FIG. 4a showing optical oaths between subsystems 80a and 81a, 80a and 81b, 81a and 82, 81b and 83a, 82 and 84a, and 83a and 84a, paths of the electronic signals from computer 118 to translator 116 and to phase shifter 44 in subsystem 83a, and path of electronic signal from detector 114a in subsystem 84 to computer 118.
Figure 4B:
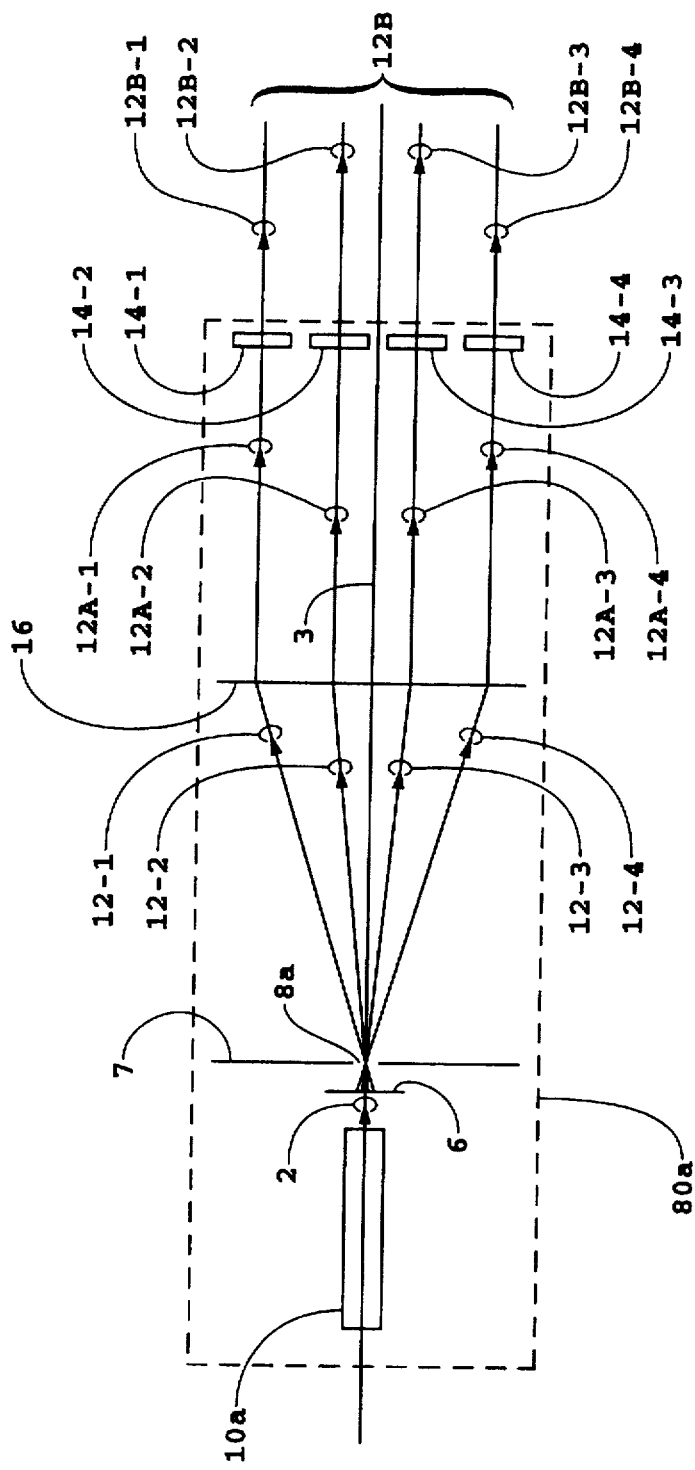
Figure 4C:
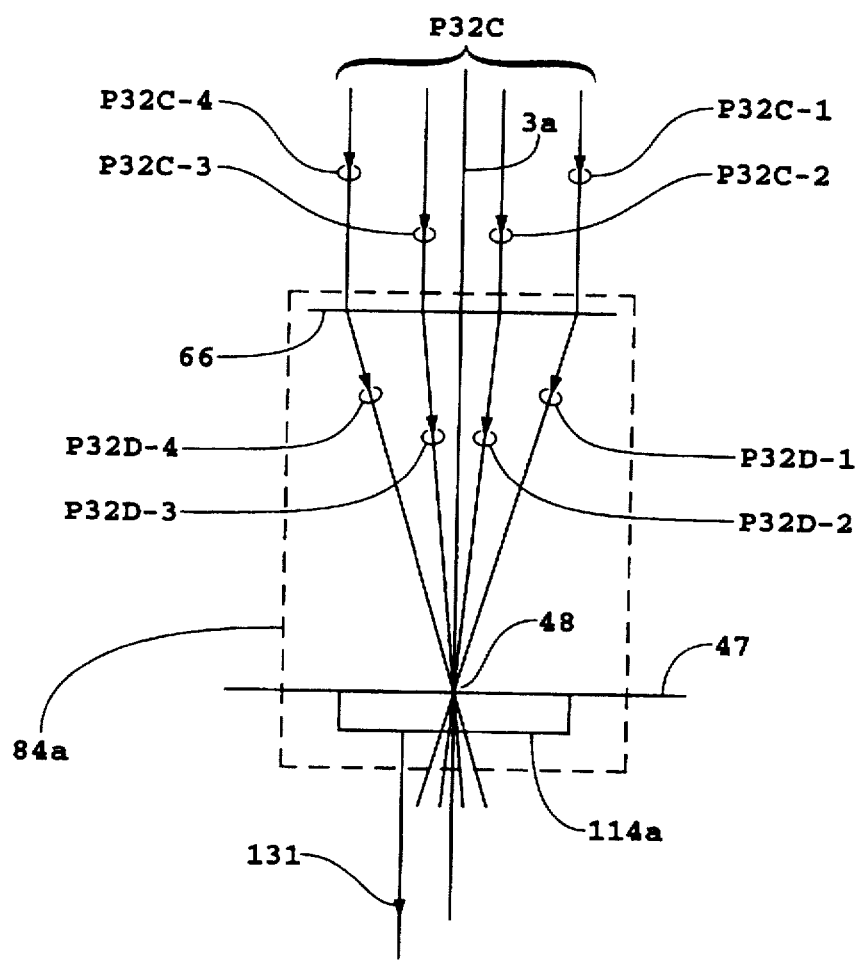
Figure 4D:
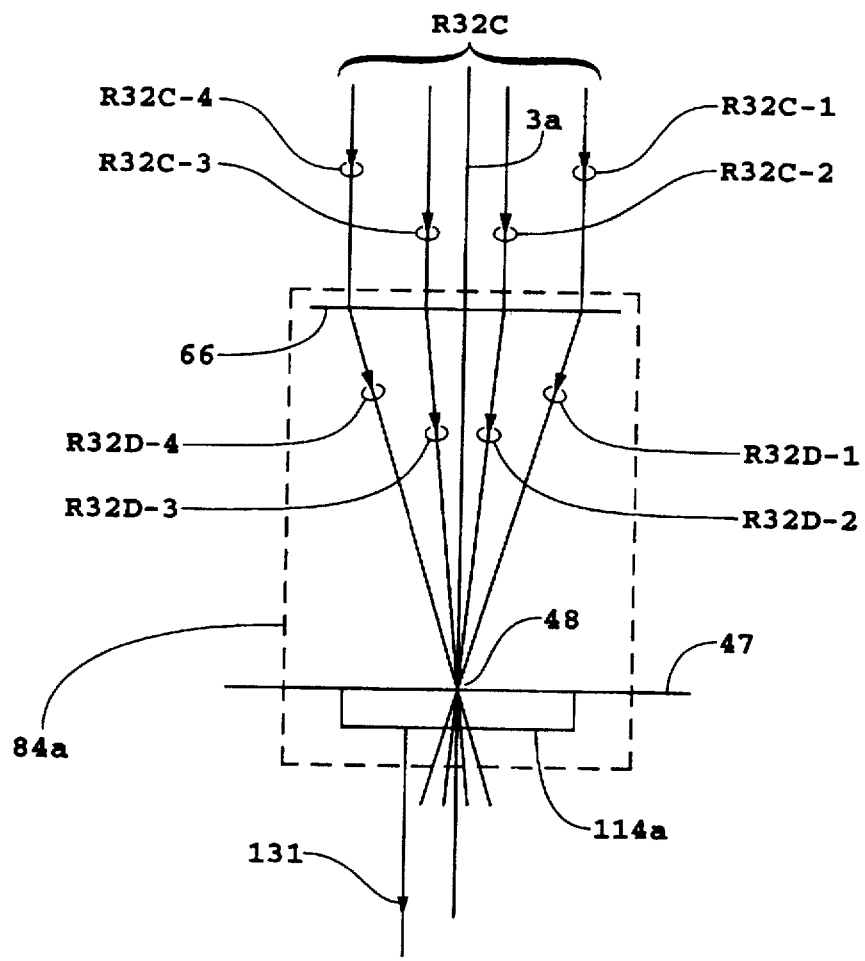

Referring now to FIGS. 4a–d, FIGS. 4a–d depict in schematic form a fourth embodiment of the instant invention in which the source subsystem 80a and the detector subsystem 84a are preferably configured for slit confocal microscopy. Like reference numerals are used in FIGS. 4a–d for like elements previously described with reference to FIGS. 3a–j. The modifications in subsystem 80a shown in FIG. 4b exist in the area of the source 10a which is now preferably comprised of a broadband, spatially incoherent line source, preferably a lamp filament or laser diode array, and in the area of the pinhole 8 of the third embodiment which is now preferably comprised of a linear array of source pinholes 8a aligned with the image of line source 10a formed by lens 6. The modifications in subsystem 84a shown in FIGS. 4c and 4d exist in the area of the detector 114a where the pinhole in the image plane 47 of the third embodiment is now preferably a linear array of detector pinholes aligned with the image of the linear array of source pinholes 8a in image plane 47 and the single pixel detector 114 of the third embodiment is now preferably a linear array detector 114a comprised of a linear array of pixels. In FIG. 4b, the linear array of source pinholes 8a and source 10a are aligned perpendicular to the plane of FIG. 4b and in FIGS. 4c and 4d, the linear array of detector pinholes and the linear array of detector pixels is aligned perpendicular to the plane of FIGS. 4c and 4d.

The remainder of the fourth embodiment depicted in FIGS. 4a–d is preferably the same as described for the third preferred embodiment in the description of FIGS. 3a–j and will not be described again.

Referring now to FIGS. 5a–f, there is shown an alternative fifth embodiment of the present invention in which the paths for the reference and probe beams of the first and third embodiments have been modified for the purpose of discriminating between the complex amplitude of an in-focus image and the complex amplitude of an out-of-focus image for images obtained from light transmitted through the object material nominally in the same direction as the direction of propagation of the probe beam. As shown in FIGS. 5a–f, the fifth preferred embodiment of the present invention is an interferometer comprised of a beam splitters 100a and 100c, object material 112, folding mirrors 120b and 120c, and a detector 114. This configuration is known in the art as a Mach-Zehnder interferometer, and is shown as a simple illustration. Other forms of the interferometer known in the art may be incorporated into the apparatus of FIGS. 5a–f without significantly departing from the spirit and scope of the preferred fifth embodiment of the present invention.

Figure 5A:
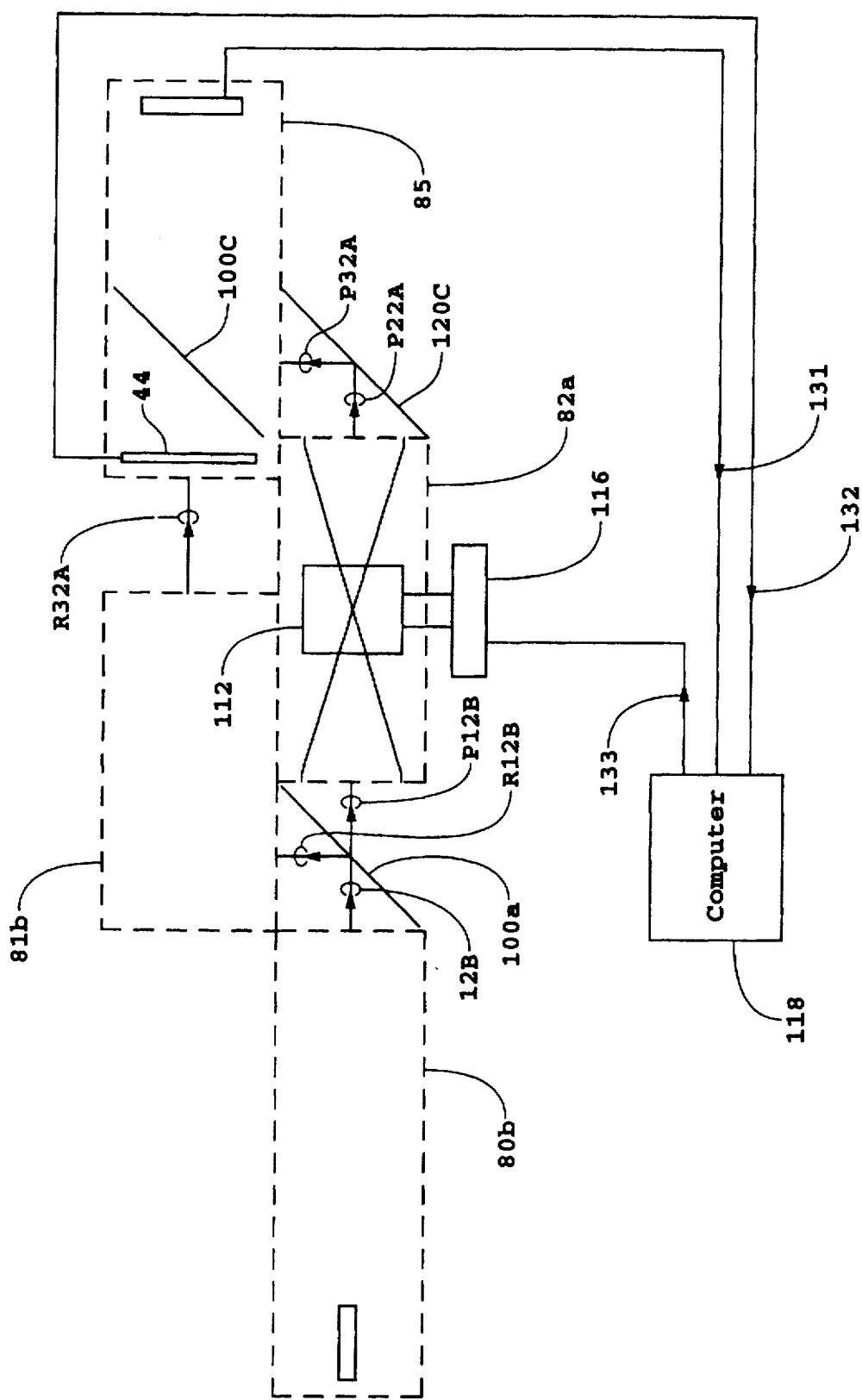
FIGS. 5a–f taken together illustrate, in schematic form, the presently preferred third embodiment of the present invention with FIG. 5a showing optical paths between subsystems 80b and 82a, 80b and 81b, 82a and 85, 81b and 85, paths of the electronic signals from computer 118 to translator 116 and to phase shifter 44 in subsystem 85, and path of electronic signal from detector 114 in subsystem 85 to computer 118.
Figure 5B:
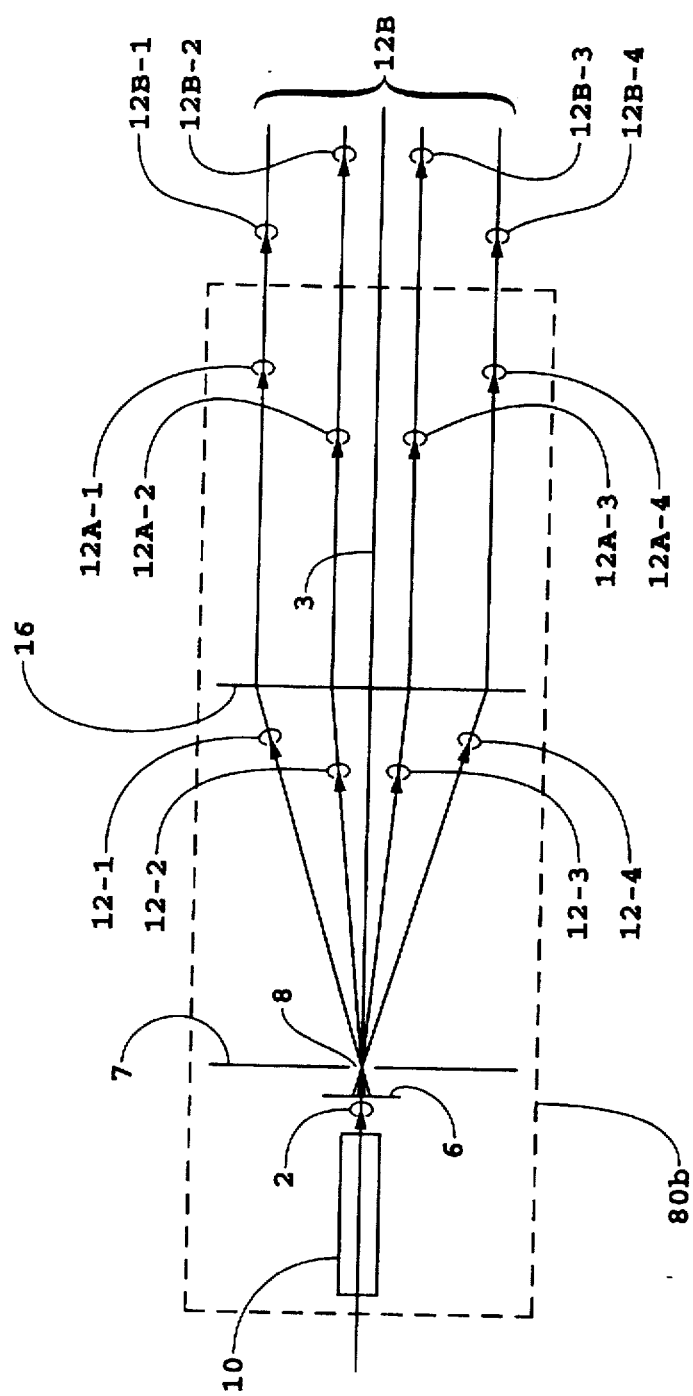

FIG. 5b depicts in schematic form the embodiment of the subsystem 80b shown in FIG. 5a. For the fifth preferred embodiment, light source 10 is preferably a point source or a spatially incoherent source of radiation across surface of the source, preferably a laser or like source of coherent or partially coherent radiation, and preferably polarized. Light source 10 emits input beam 2 aligned with the subsystem 80b optical axis 3. As shown in FIG. 5b, light beam 2 enters focusing lens 6 and is focused at pinhole 8 in image plane 7. Light beam 12 comprised of a plurality of light beams 12-1,-2,-3,-4 diverges from the pinhole 8 and enter lens 16 having an optical axis aligned with subsystem 80b optical axis 3. Light beam 12 emerges from lens 16 as collimated light beam 12A comprised of light beams 12A-1,-2,-3,-4 and exits subsystem 80b.

Figure 5C:
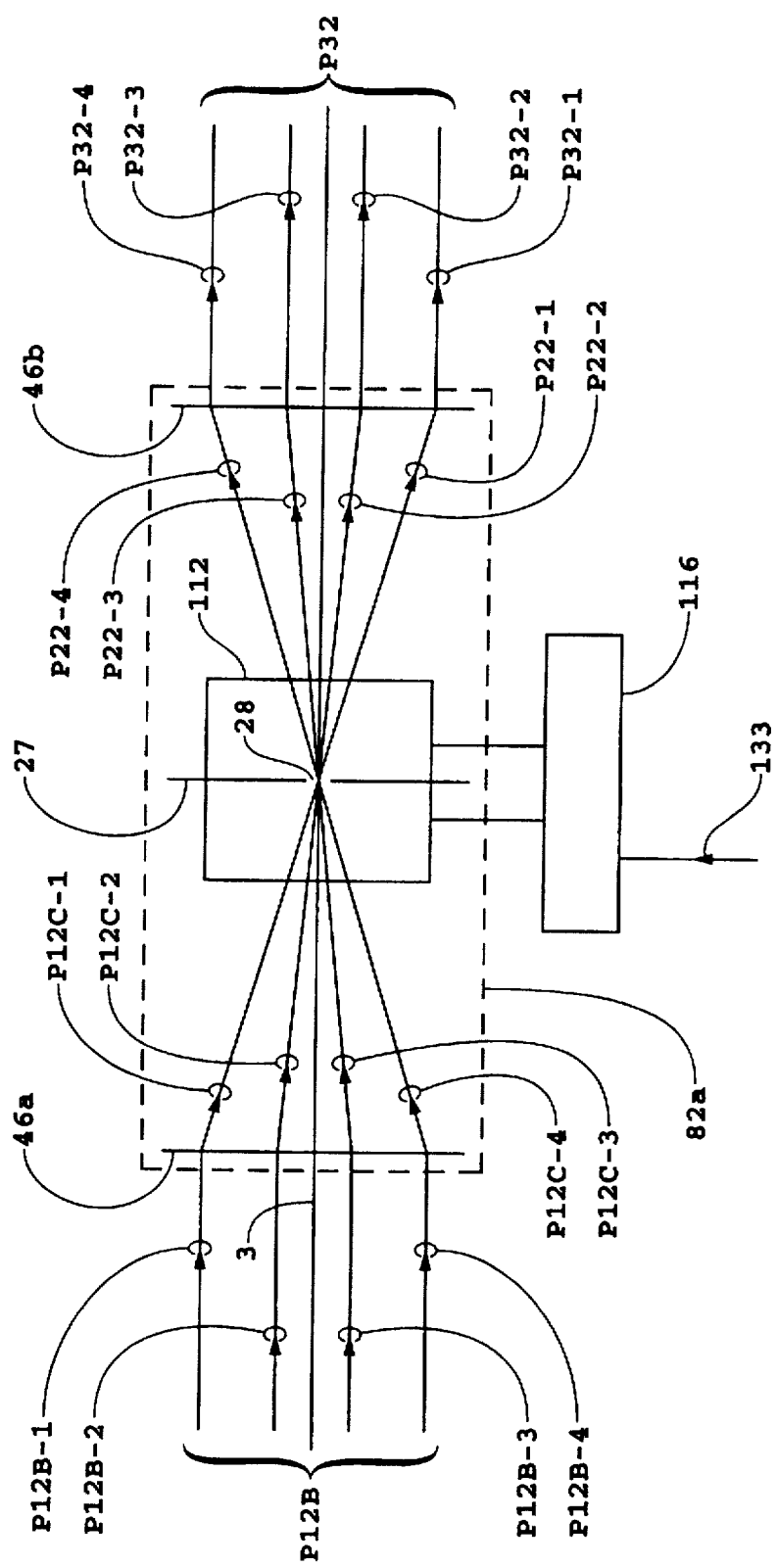

In FIG. 5a, light beam 12A exits subsystem 80b as light beam 12B and light beam 12B is partially transmitted by beam splitter 100a as light beam P12B comprised of light beams P12B-1,-2,-3,-4. Light beam P12B enters subsystem 82a. In FIG. 5c, light beam P12B enters lens 46a and emerges as light beam P12C comprised of light beams P12C-1,-2,-3,-4. Lens 46a focuses light beam P12C to point image 48 in in-focus image plane 47 in object material 112. Optical axis of lens 46a is aligned with optical axis 3 of subsystem 82a. In FIG. 5c, a portion of light beam P12C is transmitted by the object material 112 after passing through point image 48 as a plurality of light beams P22-1,-2,-3,-4 comprising light beam P22. Light beam P22 diverges from point image 48 in in-focus image plane 47 and enters lens 46b. As shown in FIG. 5c, light beam P22 emerges from lens 46b as collimated light beam P32 comprised of light beams P32-1,-2,-3,4. Light beam P32 exits subsystem 82a.

In FIG. 5a, light beam 12B is partially reflected by beam splitter 100a as light beam R12B comprised of light beams R12B-1,-2,-3,-4. Light beam R12B enters subsystem 81b.

Figure 5D:
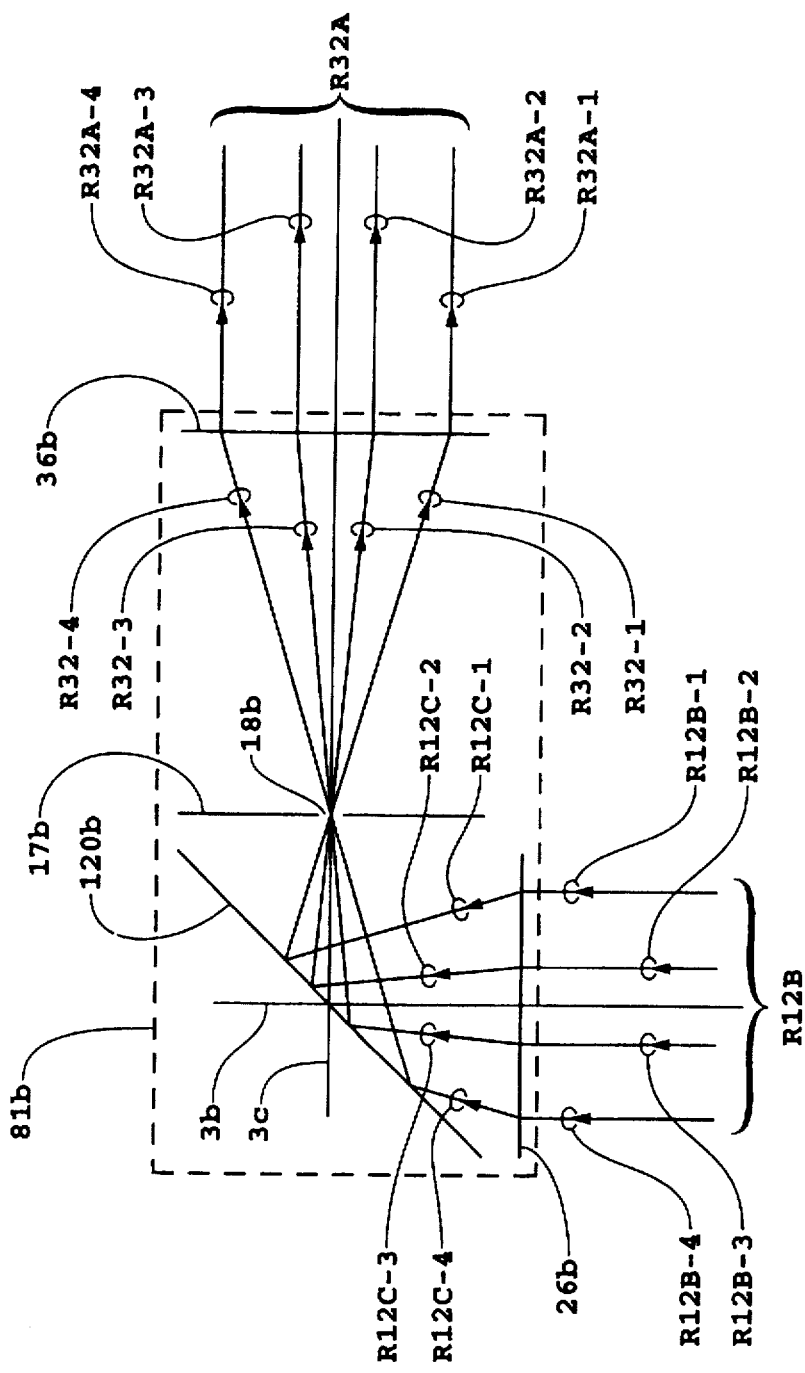

In FIG. 5d, light beam R12B enters lens 26b and emerges as light beam R12C comprised of light beams R12C-1,-2,-3,-4. Lens 26b has an optical axis aligned with optical axis 3b of subsystem 81b. Lens 26b in conjunction with plane mirror 120b focuses light beam R12C to point image 18b in in-focus image plane 17b. Light beam R12C emerges from point image 18b as light beam R32 comprised of light beams R32-1,-2,-3,-4. Light beam R32 enters lens 36b having an optical axis aligned with optical axis 3c of subsystem 81b. Light beam R32 emerges from lens 36b and exits subsystem 81b as collimated light beam R32A comprised of light beams R32A-1,-2,-3,-4.

Figure 5E:
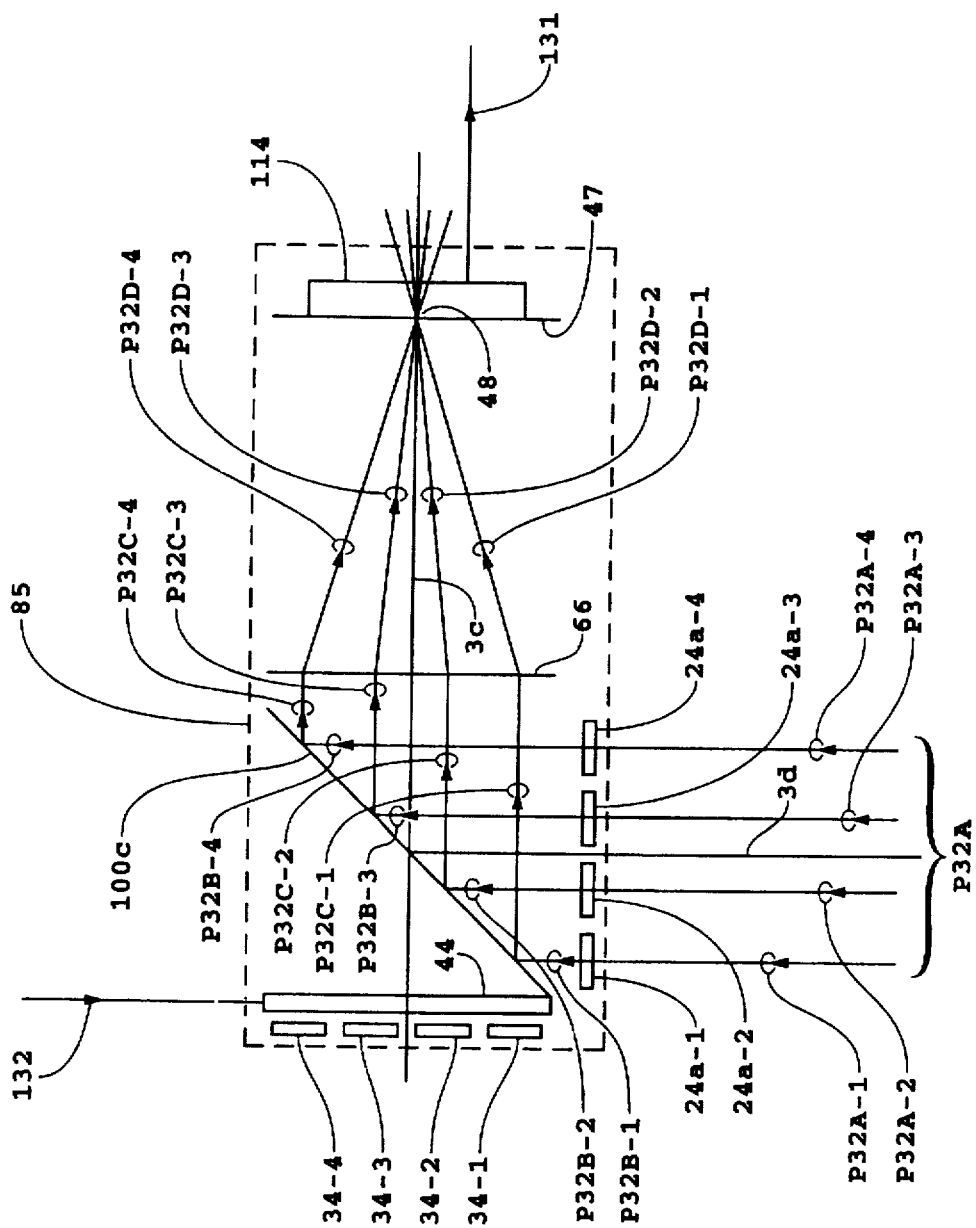
Figure 5F:
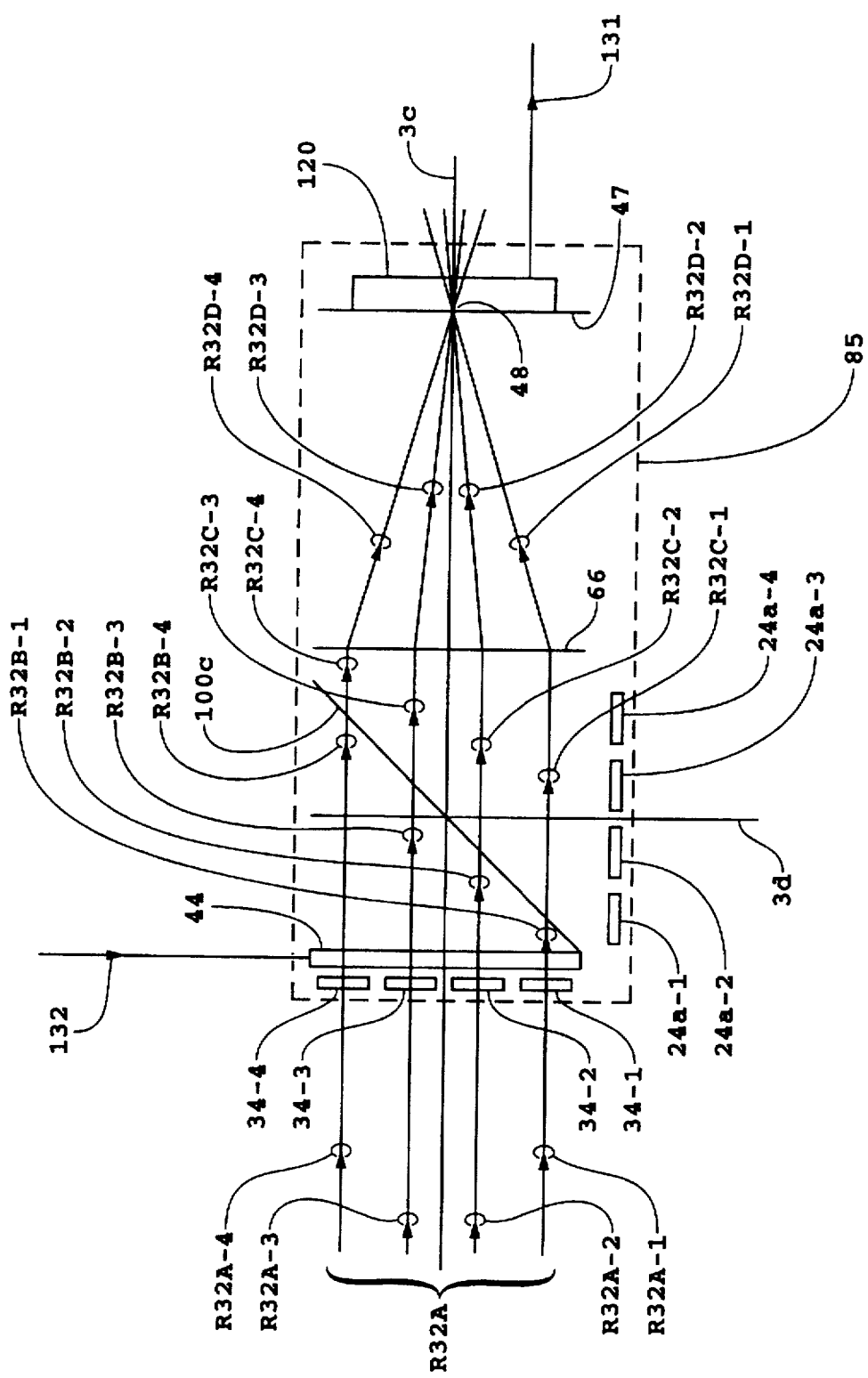

Referring to FIG. 5a, it is shown that light beam P32 is reflected by mirror 120c and enters subsection 85 as light beam P32A. In FIG. 5e, light beam enters subsection 85 and impinges of phase shifter 24a. Light beams P32A-1,-2,-3,-4 pass through phase shifters 24a-1,-2,-3,-4, respectively, and emerge as light beams P32B-1,-2,-3,-4, respectively. Light beams P32B-1,-2,-3,-4 comprise light beam P32B. The phase shifts introduced by phase shifters 24a-1 and 24a-3 are of equal values which are π radians more than the phase shifts introduced by either phase shifter 24a-2 or 24a-4, the phase shifts introduced by phase shifters 24a-2 and 24a-4 being of equal values.

It is shown in FIG. 5e that light beam P32B is partially reflected by beam splitter 100c as light beam P32C comprised of light beams P32C-1,-2,-3,-4. Light beam P32C passes through lens 66 and emerges as light beam P32D comprised of light beams P32D-1,-2,-3,-4. Light beam P32D is focused by lens 66 to point image 48 in in-focus image plane 47 on single pixel detector 114. Optical axis of lens 66 is aligned with subsystem optical axis 3c of cell 85.

Returning to FIG. 5a, it shown that light beam R32A enters subsystem 85. In subsystem 85 shown in FIG. 5f, light beams R32A-1,-2,-3,-4 pass first through phase shifters 34-1,-2,-3,-4, respectively, and then through phase shifter 44 to emerge as light beams R32B-1,-2,-3,-4, respectively. Light beams R32B-1,-2,-3,-4 comprise light beam R32B. The phase shift introduced by phase shifter 44 is controlled by signal 132 from computer 118. The phase shifts introduced by phase shifters 34-1 and 34-3 are of equal values which are π radians more than the phase shifts introduced by either phase shifter 34-2 or 34-4, the phase shifts introduced by phase shifters 34-2 and 34-4 being of equal values. Light beam R32B is partially transmitted by beam splitter 100c as light beam R32C comprised of light beams R32C-1,-2,-3,-4. Light beam R32C passes through lens 66 and emerges as light beam R32D comprised of light beams R32D-1,-2,-3,-4. Light beam R32D is focused by lens 66 to point image 48 in in-focus image plane 47 on single pixel detector 114.

The remainder of the fifth embodiment depicted in FIG. 5a–f is preferably the same as described in the description of FIGS. 1a–j and FIGS. 3a-3 and will not be described again.

Figure 6A:
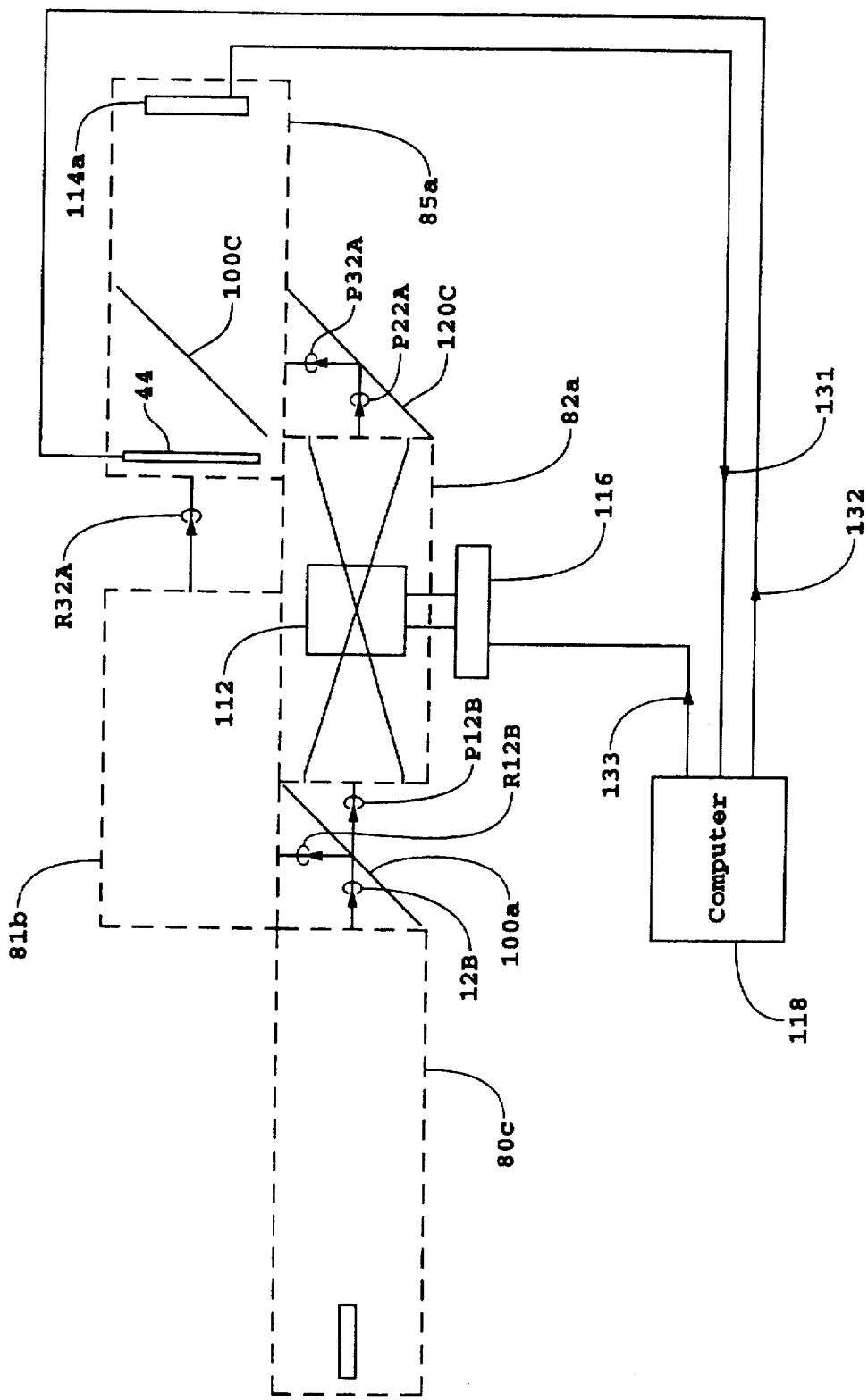
FIGS. 6a–d taken together illustrate, in schematic form, the presently preferred third embodiment of the present invention with FIG. 6a showing optical paths between subsystems 80c and 82a, 80c and 81b, 82a and 85a, 81b and 85a, paths of the electronic signals from computer 118 to translator 116 and to phase shifter 44 in subsystem 85, and path of electronic signal from detector 114a in subsystem 85 to computer 118.
Figure 6B:
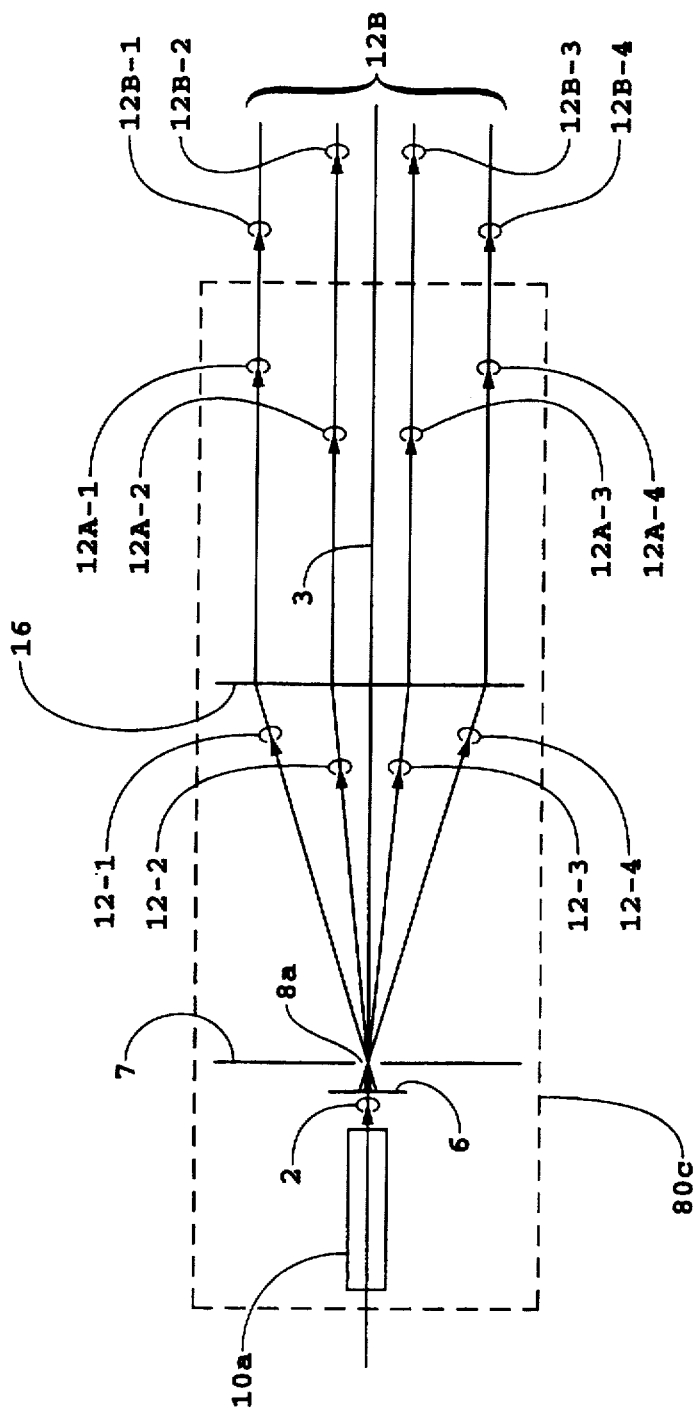
Figure 6C:
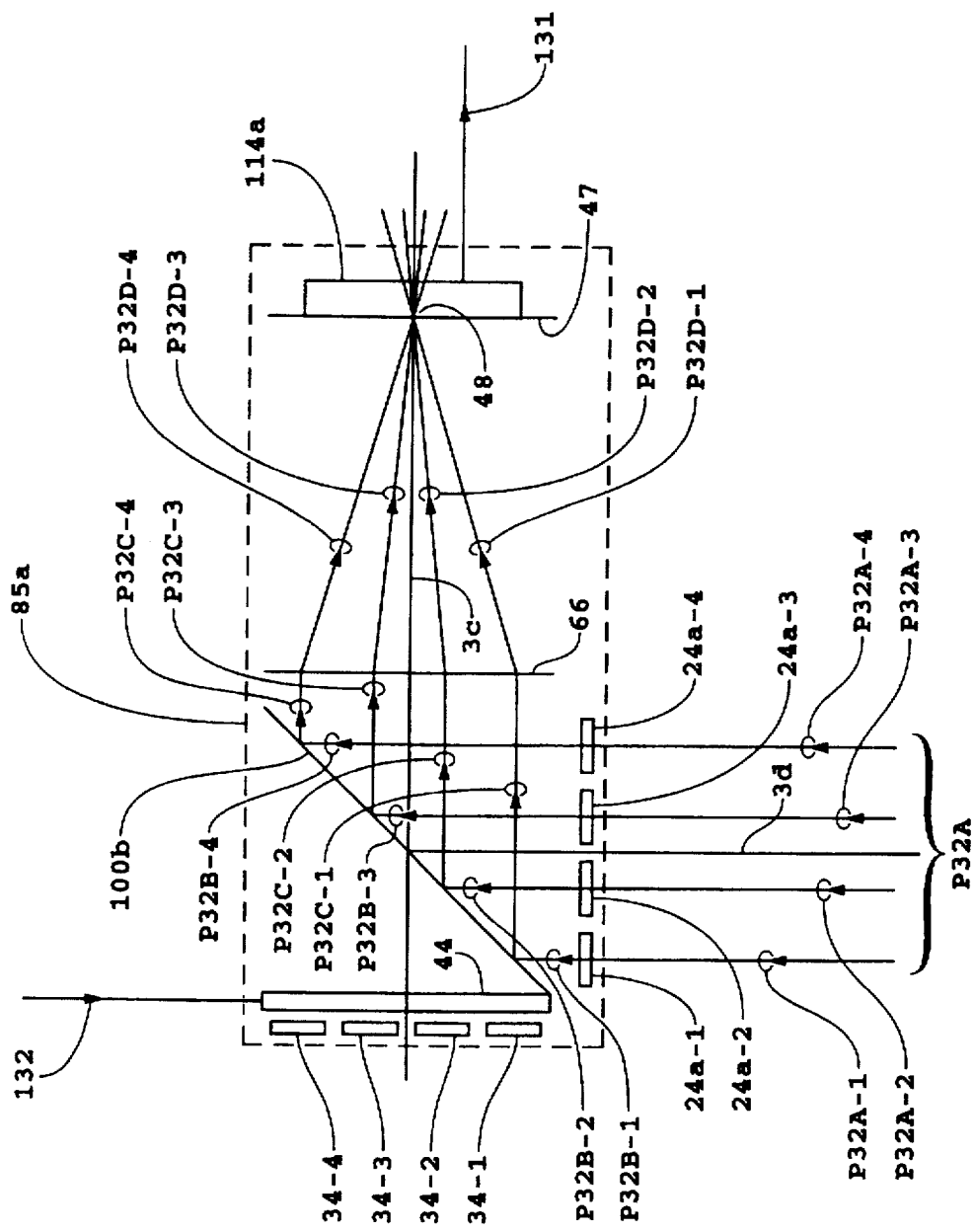
Figure 6D:
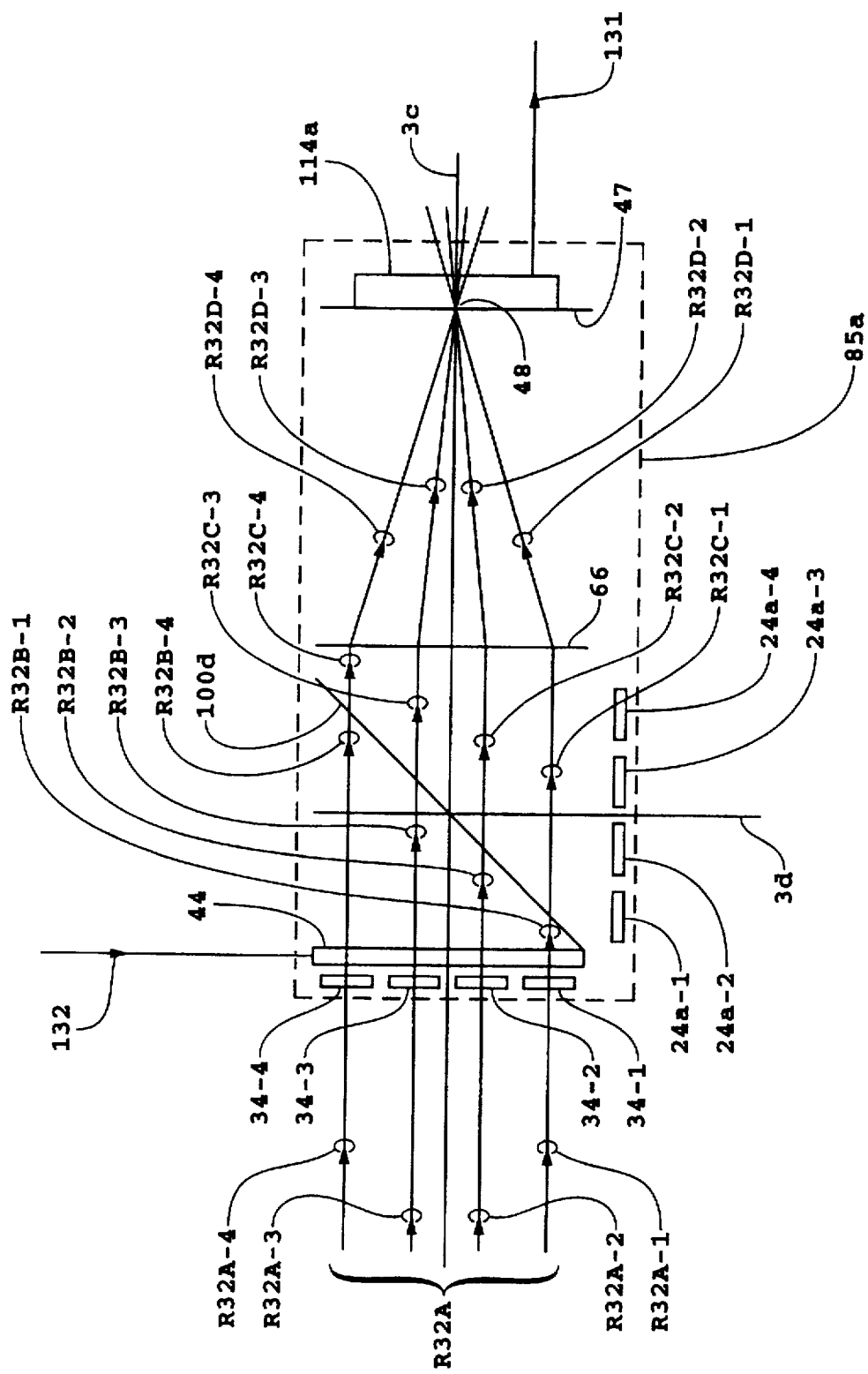

Referring now to FIGS. 6a–d, FIGS. 6a–d depict in schematic form a sixth embodiment of the instant invention in which the source subsystem 80c and the detector subsystem 85a are preferably configured for slit confocal microscopy. Like reference numerals are used in FIGS. 6a–d for like elements previously described with reference to FIGS. 5a–f. The modifications in subsystem 80c shown in FIG. 6b exist in the area of the source 10a which is now preferably comprised of a broadband, spatially incoherent line source, preferably a lamp filament or laser diode array, and in the area of the pinhole 8 of the fifth embodiment which is now preferably comprised of a linear array of source pinholes 8a aligned with the image of line source 10a formed by lens 6. The modifications in subsystem 85a shown in FIGS. 6c and 6d exist in the area of the detector 114a in which the pinhole in the image plane 47 of the fifth embodiment is now preferably a linear array of detector pinholes aligned with the image of the linear array of source pinholes 8a in image plane 47 and the single pixel detector 114 of the fifth embodiment is now preferably a linear array detector 114a comprised of a linear array of pixels. In FIG. 6b, the linear array of source pinholes 8a and source 10a are aligned perpendicular to the plane of FIG. 6b and in FIGS. 6c and 6d, the linear array of detector pinholes and the linear array of detector pixels is aligned perpendicular to the plane of FIGS. 6c and 6d.

The remainder of the sixth embodiment depicted in FIGS. 6a–d is preferably the same as described for the fifth preferred embodiment in the description of FIGS. 5a–f and will not be described again.

It will appreciated by those skilled in the art that phase shifters 14, 24, 24a, 34, and 34a may be apodized in order to alter the properties of the apparatus of the present invention vis-à-vis the magnitude of reduction of signals from out-of-focus images and the spatial resolving power without departing from the spirit and scope of the present invention. It will also be appreciated by those skilled in the art that the function of the phase shifters 14, 24, 24a, 34, and 34a may be achieved by other combinations of phase shifters or be configured with elements comprised of sections of a set of concentric annuli or other geometric patterns without departing from the spirit and scope of the present invention.

Phase shifters 14, 24, 24a, 34, 34a, and 44 may be of the electro-optical type or of the dispersive optical element type. References to a dispersive optical element type are given in the following paragraph in regards to broadband operation. Alternatively, the phase shifts described as being introduced by phase shifter 44 may alternatively be produced by making displacements of mirrors such as, for example, reference mirror 120 in the direction of the subsystem optical axis 3a of subsystems 83 and 83a.

Improved performance of the apparatus of the present invention for broadband sources will be obtained when the phase shifts produced by phase shifters 14, 24, 24a, 34, 34a, and 44 are not dependent on wavelength. It is possible to meet broadband phase shifter requirements by appropriately designing phase shifters 14, 24, 24a, 34, 34a, and 44 as types such as disclosed by H. A. Hill, J. W. Figoski, and P. T. Ballard in U.S. Pat. No. 4,213,706 issued July., 1980 and entitled "Background Compensating Interferometer" and by H. A. Hill, J. W. Figoski, and P. T. Ballard in U.S. Pat. No. 4,304,464 issued December., 1981 which is also entitled "Background Compensating Interferometer", both incorporated herein by reference. A design of a broadband phase shifter appropriate for the six preferred embodiments which is based on above cited U.S. Pat. No. 4,304,464 is disclosed in Hill, Oglesby, and Ziebell op. cit.

THEORY

Background Amplitude Reduction

The apparatus described in the preferred embodiments are all examples of either a pinhole confocal interference microscopy system or a slit confocal interference microscopy system. The background reduction capacity of a confocal microscopy system is one of its most important attributes and results from the strong optical sectioning property of confocal microscopy. This is of a completely different nature from the restricted depth of field in conventional microscopy, the difference being that in a conventional microscope out-of-focus information is merely blurred, whilst in the confocal system it is actually detected much less strongly: light scattered at some place axially separated from the focal plane is defocused at the detector plane and hence fails to pass efficiently through a mask placed there [cf. C. J. R. Sheppard and C. J. Cogswell, "Three-dimensional Imaging In Confocal Microscopy", *Confocal Microscopy*, edited by T. Wilson, (Academic Press, London), pp. 143–169 (1990)].

An unusual characteristic of the confocal interference microscope of the present invention in FIGS. 1a–j, 2a–d, 3a–j, 4a–d, 5a–f, and 6a–d is that the reflected or transmitted reference beam and the scattered or transmitted probe beam are both substantially altered at the in-focus image point 48 by pupil function modifications whereas the portion of the off-of-focus beam at in-focus image point 48 is substantially unaltered. Confocal interference microscopy systems are known in the art as a means to improve optical sectioning for the purpose of obtaining two- and three- dimensional images of an object and pupil function modification schemes for microscopes [cf. M. Born and E. Wolf, *Principles of Optics*, Section 8.6.3, pp. 423–427 (Pergamon Press, New York) 1959] are known in the art as a means to improve contrast for specific applications. However, the combination of confocal interference microscopy and pupil function modifications in the same system for the purpose of reduction of systematic errors and statistical errors arising from background light is believed by the inventor to be taught herein for the first time.

Impulse Response Function For In-Focus Image

There are two useful modes of the non-fluorescent confocal scanning microscope [C. J. R. Sheppard, "Scanning Optical Microscopy", in: *Advances in Optical and Electron Microscopy*, 10, (Academic, London, 1987); C. J. R. Sheppard and A. Choudhury, *Optica Acta*, 24(10), pp. 1051–1073 (1977)]: the reflection-mode and the transmission-mode. In practice, it is easy to achieve with the confocal microscope the optical sectioning by scanning the object along the axial direction [C. J. R. Sheppard and C. J. Cogswell, *J. Microscopy*, 159(Pt 2), pp. 179–194 (1990); C. J. R. Sheppard and T. Wilson, *Optics Lett.*, 3, pp. 115–117 (1978); C. J. R. Sheppard, D. K. Hamilton, and I. J. Cox, *Proc. R. Soc. Lond.*, A 387, pp. 171–186 (1983)] and thus form three dimensional images.

Figure 7:
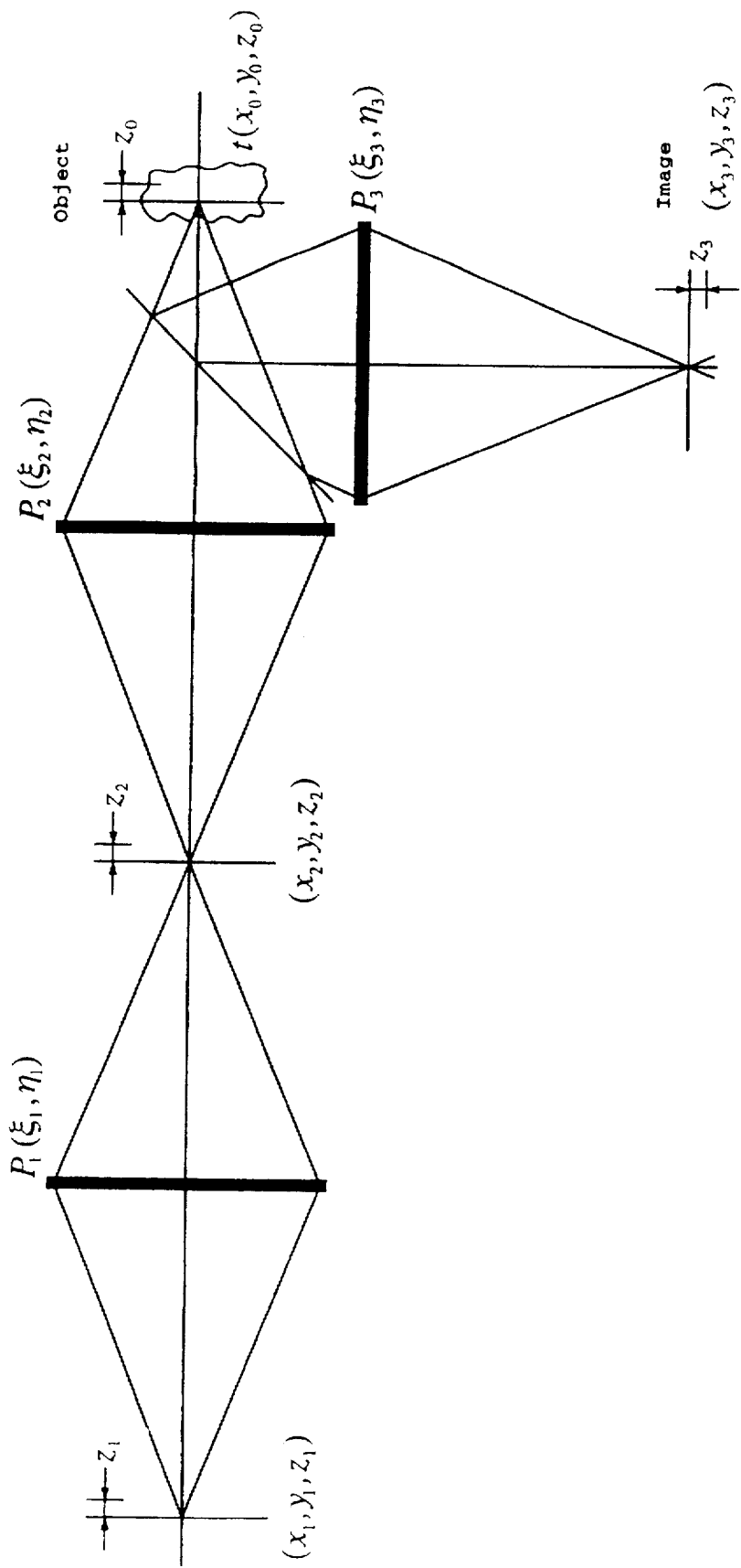
FIG. 7 depicts the geometry of a reflecting confocal microscope with three imaging sections.

Consider a reflection-mode confocal microscope configuration (FIG. 7) with three imaging sections, the properties of a transmission-mode confocal microscope being obtainable from the reflection-mode properties with the appropriate change in coordinates and treatment of the unscattered probe beam. For the combination of subsystems referenced in FIGS. 1b–j which contain the source 10, the object 112, and the detector 114, lens 1 of FIG. 7 is the equivalent to the combination of lenses 16 and 26, lens 2 of FIG. 7 is the equivalent to the combination of lenses 36 and 46, and lens 3 of FIG. 7 is the equivalent to the combination of lenses 46 and 66. We define optical coordinates $(v_i, w_i, u_i)$ for four spaces; the image plane 7A space, the image plane 17A space, either the object 112 space or reference mirror 120 space, and the detector 114 image space 47A with i=1, 2, 0, and 3, respectively:

$$v_i = k\tilde{x}_i \sin \alpha_i,$$

$$w_i = k\tilde{y}_i \sin \alpha_i,$$

$$u_i = 4k\tilde{z}_i \sin^2(\alpha_i/2), \tag{1}$$

where $\sin\alpha_i$ is the numerical aperture of the i th space, wavenumber $k=2\pi/\lambda$, $\lambda$ is the wavelength of the radiation in vacuum, and $\tilde{x}_i$, $\tilde{y}_i$, and $\tilde{z}_i$ are the optical path distances in the i th space. The optical path distances are defined as $$\begin{aligned}
\tilde{x}_i &= \int_0^{x_i} n(x'_i, y'_i, z'_i)dx'_i, \\
\tilde{y}_i &= \int_0^{y_i} n(x'_i, y'_i, z'_i)dy'_i, \\
\tilde{z}_i &= \int_0^{z_i} n(x'_i, y'_i, z'_i)dz'_i
\end{aligned} \tag{2}$$

where the integration is along the path of a respective light ray and $n(x_i', y_i', z_i')$ is the refractive index at position $(x_i', y_i', z_i')$.

It has been shown that imaging in a confocal microscope behaves as a coherent microscope (Sheppard and Choudhury, op. cit.) in which the image can be described by a coherent transfer function, the coherent transfer function being the Fourier transform of the impulse response function. Thus, the effective three dimensional impulse response function $h_e(v_3, v_0, v_2, v_1)$ for the system in FIG. 7 can be expressed as $$h_e(v_3, v_0, v_2, v_1) = h_3(v_3-v_0)\, h_2(v_0-v_2)h_1(v_2-v_1), \tag{3}$$

where $$h_1(v) = \iint P_1(\xi_1, \eta_1) \exp\left\{ ju \left[ \frac{1}{4\sin^2(\alpha_1/2)} - \frac{1}{2}(\xi_1^2 + \eta_1^2) \right] \right\} \times \exp[-j(\xi_1 v + \eta_1 w) + jkW_1] d\xi_1 d\eta_1; \quad (4a)$$

$$h_2(v) = \iint P_2(\xi_2, \eta_2) \exp\left\{ ju \left[ \frac{1}{4\sin^2(\alpha_2/2)} - \frac{1}{2}(\xi_2^2 + \eta_2^2) \right] \right\} \times \exp[-j(\xi_2 v + \eta_2 w) + W_2] d\xi_2 d\eta_2; \quad (4b)$$

$$h_3(v) = \iint P_3(\xi_3, \eta_3) \exp\left\{ -ju \left[ \frac{1}{4\sin^2(\alpha_3/2)} - \frac{1}{2}(\xi_3^2 + \eta_3^2) \right] \right\} \times \exp[-j(\xi_3 v + \eta_3 w) + W_3] d\xi_3 d\eta_3; \quad (4c)$$

$h_i$, $P_i$, and $W_i$ are the impulse response function, the pupil function, and the wave aberration function [cf. Refs. 10–12 in M. Gu and C. J. R. Sheppard, Appl. Opt., 31(14), pp. 2541–2549, (1992)], respectively, for the i th equivalent lens; and j is $(-1)^{1/2}$. The impulse response function is the amplitude in the image plane in response to a point-source object. The functions of the phase shifters 14, 24, 34, and 44 are incorporated into the appropriate pupil functions $P_i$. The role of any apodization of the phase shifters 14, 24, 34, and 44 are also incorporated into the appropriate $P_i$.

Assume that the three-dimensional object may be characterized by a scattering distribution $t(v_0)$ [cf. C. J. R. Sheppard and X. Q. Mao, J. Opt. Soc. Am. A, 6(9), pp. 1260–1269 (1989)], representing the scattering per unit volume, which is related to the refractive index n by $$t(v_0) = jk^2[1 - n^2(v_0)] \quad (5)$$

[E. Wolf, Opt. Commun., 1, pp. 153–156 (1969)]. Both n and t are in general complex, and the j in Eq. (5) accounts for the fact that in a lossless medium the scattered wave is in phase quadrature to the direct wave. We assume that the effects of multiple scattering are negligible. We also neglect the unscattered radiation, which is a valid assumption for reflection-mode microscopy because no direct (unscattered) radiation contributes to the image. The image amplitude can be summed over the elemental slices that constitute the object because the principle of superposition is valid. Furthermore it must be integrated over the incoherent source of amplitude distribution $A(v_1)$. The attenuation function $a(v_0)$ accounting for the attenuation of the radiation in the object must also be included for both the incident radiation on the object and the reflected/scattered radiation by the object. The amplitude of the in-focus scattered probe beam $U_S$ in the image space 47A is thus given by $$U_S(v_3) = (R_1 T_1)^{1/2} \iint A(v_1) \{ \iiiint \iint h_1(v_2-v_1) h_2(v_0-v_2) \, dv_2 ] \times a(v_0) t(v_0) h_3(v_3-v_0) dv_0 \} dv_1 \quad (6)$$

where $R_1$ and $T_1$ are the reflection and transmission coefficients, respectively, for the beam splitter 100.

The impulse response functions of the lenses can be written as $$h_1(v_2-v_1) = \{\exp[jk(\tilde{z}_2-\tilde{z}_1)]\} h_1'(v_2-v_1), \quad (7a)$$

$$h_2(v_0-v_2) = \{\exp[jk(\tilde{z}_0-\tilde{z}_2)]\} h_2'(v_0-v_2), \quad (7b)$$

$$h_3(v_3-v_0) = \{\exp[jk(\tilde{z}_0-\tilde{z}_3)]\} h_3'(v_3-v_0), \quad (7c)$$

$$h_1'(v_2-v_1) = \iint P_1(\xi_1, \eta_1) \exp\left\{ ju_2 \left[ \frac{1}{2}(\xi_1^2 + \eta_1^2) \right] \right\} \times ((\exp\{-j[\xi_1(v_2-v_1) + \eta_1(w_2-w_1)] + jkW_1\})) d\xi_1 d\eta_1, \quad (8a)$$

$$h_2'(v_0-v_2) = \iint P_2(\xi_2, \eta_2) \exp\left\{ j(u_0-u_2) \left[ \frac{1}{2}(\xi_2^2 + \eta_2^2) \right] \right\} \times ((\exp\{-j[\xi_2(v_0-v_2) + \eta_2(w_0-w_2)] + jkW_2\})) d\xi_2 d\eta_2, \quad (8b)$$

$$h_3'(v_3-v_0) = \iint P_3(\xi_3, \eta_3) \exp\left\{ -ju_0 \left[ \frac{1}{2}(\xi_3^2 + \eta_3^2) \right] \right\} \times ((\exp\{-j[\xi_3(v_3-v_0) + \eta_3(w_3-w_0)] + jkW_3\})) d\xi_2 d\eta_2. \quad (8b)$$

The sign change in the factor $\exp[jk(\tilde{z}_0-\tilde{z}_3)]$ in Eq. (7c) in relation to the corresponding factors in Eqs. (7a) and (7b) is because of the reflection that takes place in the $v_0$ space. Substituting Eqs. (7a), (7b), and (7c) into Eq. (6) and performing the integration over the $v_2$ space gives the following expression for $U_S(v_3)$:

$$U_S(v_3) = (R_1 T_1)^{1/2} \iint A(v_1) \{ \exp(j2k\tilde{z}_0) [ \iint h_1'(v_0-v_1) a(v_0) t(v_0) \times a(v_0) h_3'(v_3-v_0) dv_0 dw_0 ] dz_0 \} dv_1 dw_1 \quad (9)$$

where it has been assumed that there is no spatial filtering in image space 17A and the aberration function $W_2$ has been combined with aberration function $W_1$. The appropriate equation for $U_S(v_3)$ for the transmission mode confocal microscope configuration is obtained from Eq. (9) by setting $\tilde{z}_0 = 0$, i.e., $\exp(j2k\tilde{z}_0) = 1$.

It is assumed for simplicity in the present disclosure that the aberration functions $W_i = 1$ and that there is no apodization of the pupil functions $P_i$, i.e. no apodization of the phase shifters 14, 24, 24a, 34, 34a, and 44. Those skilled in the art will appreciate that when apodization is employed to modify the resolution, for example, the resulting mathematical expression for $U_S(v_3)$ will be more complicated, but nonetheless will retain the important features with regards to its symmetric or antisymmetric spatial properties. The integration of Eq. (9) for these simplifing assumptions and for the case of Level 1 discrimination yields $$U_S(v_3) = \quad (10)$$

$$\left(\frac{1}{2}\right)\left(\frac{a'}{d_0}\right)(R_1 T_1)^{1/2} \iint A(v_1) dv_1 \iint \text{sinc}[(a'/2d_0)(v_0-v_1)] \times$$

$$\left\{ \frac{\sin[m(v_0-v_1)]}{m\sin[(1/2)(v_0-v_1)]} \right\} a(v_0) t(v_0) a(v_0) \text{sinc}[(a'/2d_0)(v_3-v_0)] \times$$

$$\left\{ \frac{\sin[m(v_3-v_0)]}{m\sin(v_3-v_0)} \right\} \sin[(1/2)(v_3-v_0)] \exp(j2k\tilde{z}_S) dv_0 dz_0$$

where $\tilde{z}_0$ has been replaced by $\tilde{z}_S$, $a'$ and $d_0$ are the width and the center to center distance, respectively, of the elements in phase shifters 14, 24, 24a, 34, and 34a and sinc $x \equiv (\sin x)/x$. The $w_i$ dependence has been suppressed since it is not relevant in Level 1 discrimination to the reduction of the background from off-of-focus images.

The corresponding expression for the amplitude of the reflected reference beam is $$U_R(v_3) = \tag{11}$$

$$\left(\frac{1}{2}\right)\left(\frac{a'}{d_0}\right)(T_1R_1)^{1/2}\int A(v_1)dv_1 \text{sinc}[(a'/2d_0)(v_0 - v_1)] \times$$

$$\left\{\frac{\sin[m(v_0 - v_1)]}{m\sin[(1/2)(v_0 - v_1)]}\right\} \text{sinc}[(a'/2d_0)(v_3 - v_0)] \times$$

$$\left\{\frac{\sin[m(v_3 - v_0)]}{m\sin(v_3 - v_0)}\right\} \sin[(1/2)(v_3 - v_0)]\exp(j2k\tilde{z}_R)dv_0$$

where $\tilde{z}_0$ has been replaced by $\tilde{z}_R$.

Lets consider the special case where $a'=d_0$. Eqs. (10) and (11) then reduce to $$U_S(v_3) = \tag{12}$$

$$\left(\frac{1}{2}\right)(R_1T_1)^{1/2}\int A(v_1)dv_1\iint 2\text{sinc}[m(v_0 - v_1)] \times$$

$$a(v_0)f(v_0)a(v_0)\text{sinc}[(1/2)(v_3 - v_0)]\left\{\frac{\sin[m(v_3 - v_0)]}{m\sin(v_3 - v_0)}\right\} \times$$

$$\sin[(1/2)(v_3 - v_0)]\exp(j2k\tilde{z}_S)dv_0dz_0,$$

$$U_R(v_3) = \tag{13}$$

$$\left(\frac{1}{2}\right)(T_1R_1)^{1/2}\int A(v_1)dv_1\iint 2\text{sinc}[m(v_0 - v_1)] \times$$

$$\text{sinc}[(1/2)(v_3 - v_0)]\left\{\frac{\sin[m(v_3 - v_0)]}{m\sin(v_3 - v_0)}\right\} \times$$

$$\sin[(1/2)(v_3 - v_0)]\exp(j2k\tilde{z}_R)dv_0,$$

respectively

The integration over $v_0$ in Eq. (13) can be performed with the result $$U_R(v_3) = \left(\frac{1}{2}\right)(T_1R_1)^{1/2}\int A(v_1)(1/m)\text{sinc}[(1/2)(v_3 - v_1)] \times \tag{14}$$

$$\left\{\frac{\sin[m(v_3 - v_1)]}{m\sin(v_3 - v_1)}\right\} \sin[(1/2)(v_3 - v_1)]\exp(j2k\tilde{z}_R)dv_1.$$

Figure 8:
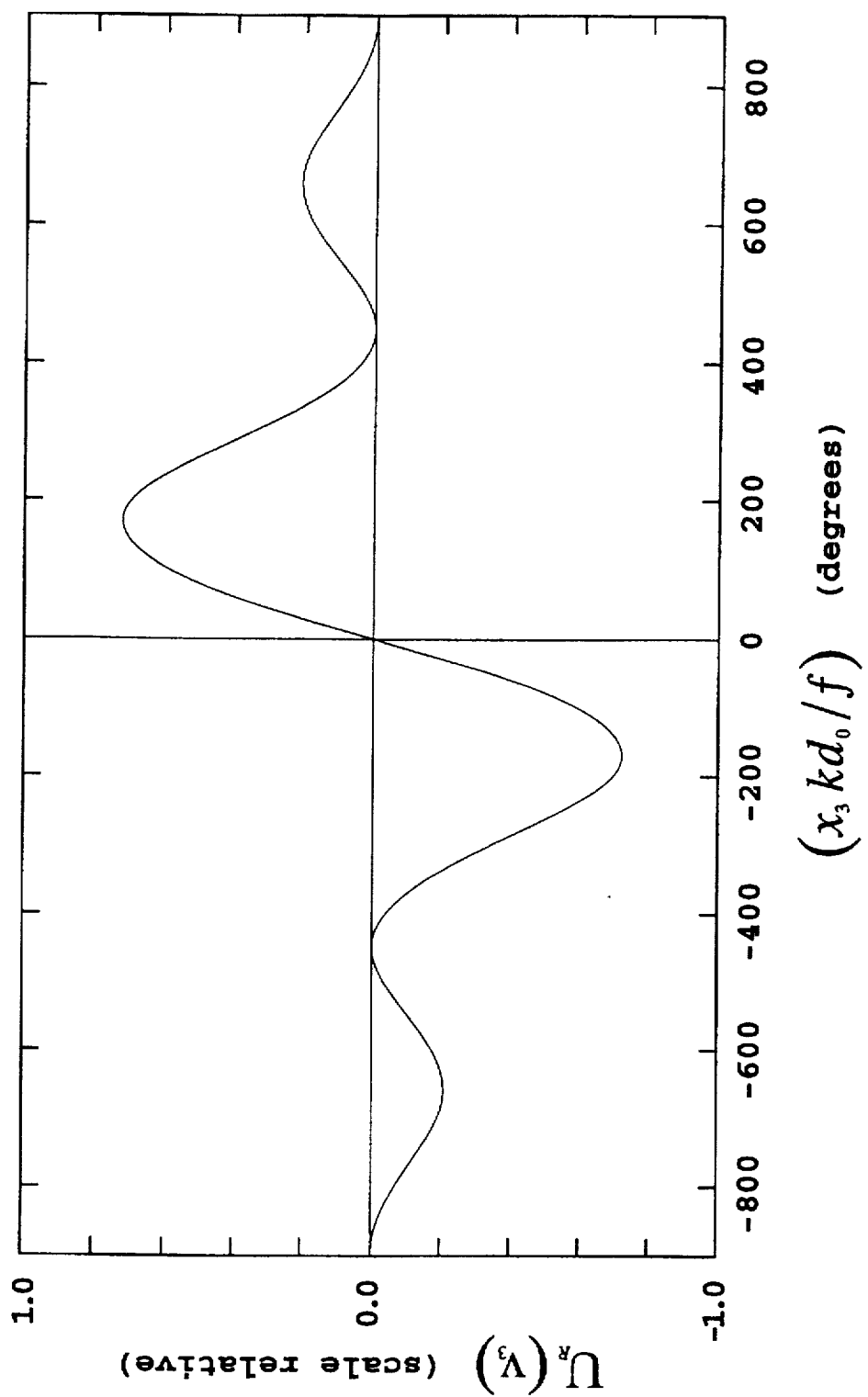
FIG. 8 is a graph depicting a reflected reference beam amplitude $U_R(v_3)$ in the in-focus image plane 47 at the single pixel detector 114 for a two element phase shifting system (m=1) as a function of $(x_3 kd_0/f)$ for $y_3=0$, $z_3=0$, and $v_1=0$ in accordance with the six preferred embodiments of the present invention.

An example of $U_R(v_3)$ is shown in FIG. 8 for a two element phase shifting system (m=1) as a function of $(x_3kd_0/f)$ for $y_3=0$, $z_3=0$, and $v_1=0$. The antisymmetric spatial distribution of $U_R(v_3)$ about $v_3$ is clearly exhibited in Eq. (14) through the factor $\sin[(1/2)(v_3-v_1)]$.

The spatial distribution of $U_S(v_3)$ will in general display similar behavior since Eq. (12) is of the same mathematical structure as Eq. (13). It is this antisymmetric spatial distribution which is exploited in the preferential reduction of the amplitude of the background from out-of-focus images.

The Amplitude of Out-of-Focus Image

The amplitude of the out-of-focus beam $U_B$ in the detector in-focus image plane 47 can be express in terms of the Fresnel internals $C(z)$ and $S(z)$ which are defined as $$C(z) = \int_0^z \cos\left(\frac{\pi}{2} t^2\right) dt, \tag{15}$$

$$S(z) = \int_0^z \sin\left(\frac{\pi}{2} t^2\right) dt. \tag{16}$$

[cf. Abramowitz and Stegun, *Handbook of Mathematical Functions*, (Nat. Bur. of Standards, Appl. Math. Ser. 55), Sect. 7.3, pp. 300–302, 1964]. The expression for $U_B$ is $$U_B(v_3) = \tag{17}$$

$$-\left(\frac{j}{k}\right)\left(\frac{A_B}{f^2}\right)\left(\frac{\pi f^2}{kz_B}\right)\exp[jk(\tilde{z}_B)]\exp[jk(x_B^2 + y_B^2)/(2z_B)] \times$$

$$\iint P_3(\xi_3, \eta_3)\exp\left[-j\frac{\pi}{2}(\xi_3^2 + \eta_3^2)\right] d\xi_3 d\eta_3$$

for a point source 8 located at $v_1=(0,0,0)$. The result after the integration over $\xi_3$ and $\eta_3$ for Level 2 discrimination is $$U_B(v_3) = \tag{18}$$

$$-\left(\frac{j}{k}\right)\left(\frac{A_B}{f^2}\right)\left(\frac{\pi f^2}{kz_B}\right)\exp[jk(\tilde{z}_B)]\exp[jk(x_B^2 + y_B^2)/(2z_B)] \times$$

$$\{[C(\xi'_5) - 2C(\xi'_4) + 2C(\xi'_3) - 2C(\xi'_2) + C(\xi'_1)] -$$

$$j[S(\xi'_5) - 2S(\xi'_4) + 2S(\xi'_3) - 2S(\xi'_2) + S(\xi'_1)]\} \times$$

$$\{[C(\eta'_5) - 2C(\eta'_4) + 2C(\eta'_3) - 2C(\eta'_2) + C(\eta'_1)] -$$

$$j[S(\eta'_5) - 2S(\eta'_4) + 2S(\eta'_3) - 2S(\eta'_2) + S(\eta'_1)]\}$$

where $$\xi'_p = \left(\frac{kz_B}{\pi f^2}\right)^{1/2}\left[(p - 3)a + \frac{x_B}{z_B}f\right]; p = 1, \ldots, 5, \tag{19}$$

$$\eta'_p = \left(\frac{kz_B}{\pi f^2}\right)^{1/2}\left[(p - 3)a + \frac{y_B}{z_B}f\right]; p = 1, \ldots, 5. \tag{20}$$

$f$ is the radius of curvature of the wavefront of the beam at the exit pupil of lens 3; $(x_B, y_B, z_B)$ are the out-of-focus coordinates in in-focus image plane 47; and $(A_B/f)$ is the amplitude of the out-of-focus beam at the exit pupil of lens 3. The result for the Level 1 discrimation operating for example in the $v_3$ direction is $$U_B(v_3) = \tag{21}$$

$$-\left(\frac{j}{k}\right)\left(\frac{A_B}{f^2}\right)\left(\frac{\pi f^2}{kz_B}\right)\exp[jk(\tilde{z}_B)]\exp[jk(x_B^2 + y_B^2)/(2z_B)] \times$$

$$\{[C(\xi'_5) - 2C(\xi'_4) + 2C(\xi'_3) - 2C(\xi'_2) + C(\xi'_1)] -$$

$$j[S(\xi'_5) - 2S(\xi'_4) + 2S(\xi'_3) - 2S(\xi'_2) + S(\xi'_1)]\}.$$

Figure 9:
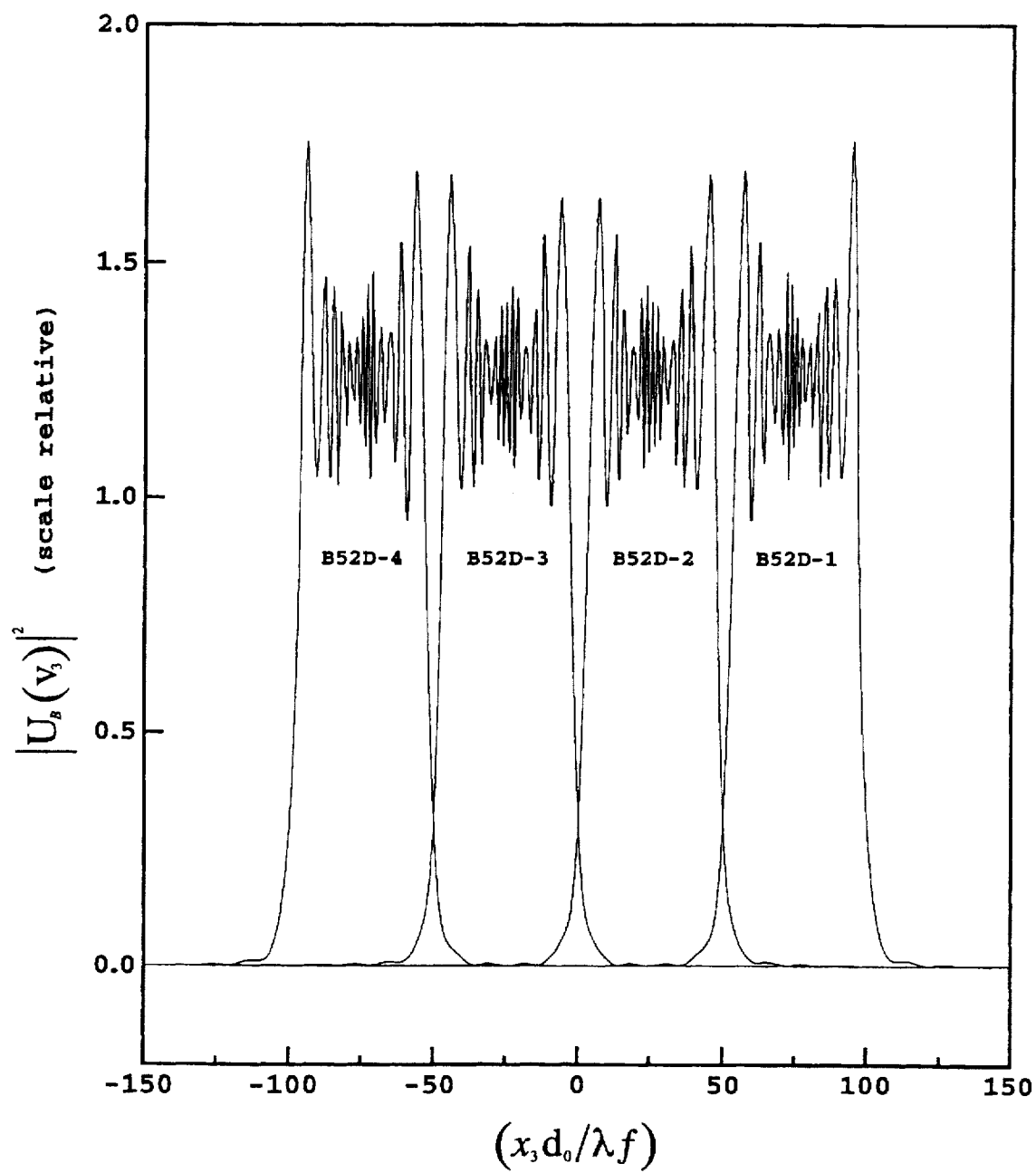
FIG. 9 is a graph depicting the square of the magnitude of the background amplitude for each of the beams B52D-1,-2,-3,-4 (cf.

An example of $|U_B(v_3)|^2$ for of the beams B52D-1, -2, -3, -4 for the Level 1 discrimination is shown in FIG. 9 as a function of $(x_3d_0/\lambda f)$ for $y_3=0$ and $z_3=50 \lambda(f/d_0)^2$.

It is possible to demonstrate using the properties of Fresnel internals [cf. Abramowitz and Stegun, op. cit.] that the integral of $(U_RU^*_B+U^*_RU_B)$ over the detector pinhole behaves in the following manner for the case of prior art confocal interferometric microscopy and for the case of the invention disclosed herein:

$$\iint(U_RU^*_B + U^*_RU_B)dx_3dy_3 \propto \begin{cases} (1/z_B) & ; \text{prior art} \\ (1/z_B)^{3/2} & ; \text{present invention, Level 1} \\ (1/z_B)^2 & ; \text{present invention, Level 2} \end{cases} \tag{22}$$

where $U^*$ denotes the complex conjugate of $U$ and the integration is over intervals centered about the position where $U_R$ is antisymmetric in $x_3$ for Level 1 discrimination and in both $x_3$ and $Y_3$ for Level 2 discrimination.

A very significant feature of the properties of apparatus which embodies the present invention is that the enhanced reduction of the interference term is effective for each independent volume element of the source of out-of-focus images. Therefore, the reduction leads to both a reduction in the statistical error as well as an enhanced reduction in the systematic error produced by the background from out-of-focus images.

Statistical Error

Consider the response of the apparatus of the present invention to a planar transverse section of an arbitrary three-dimensional scattering object 112. The output current I from a pixel of the detector for the given transverse planar section of the scattering object 112 is of the form $$I(z_{0,S} - z_{0,R}, \chi) = \iint_p |U_R|^2 dx_3 dy_3 + \tag{23}$$

$$\iint_p |U_B|^2 dx_3 dy_3 + \iint_p |U_S|^2 dx_3 dy_3 +$$

$$\cos\chi \iint_p (U_R U^*_S + U^*_R U_S) dx_3 dy_3 +$$

$$j\sin\chi \iint_p (U_R U^*_S - U^*_R U_S) dx_3 dy_3 +$$

$$\cos\chi \iint_p (U_R U^*_B + U^*_R U_B) dx_3 dy_3 +$$

$$j\sin\chi \iint_p (U_R U^*_B - U^*_R U_B) dx_3 dy_3 +$$

$$\iint_p (U_S U^*_B - U^*_S U_B) dx_3 dy_3$$

where the integration $\iint_p$ is over the area of the pixel and $\chi$ is the phase shift introduced by phase shifter 44. The corresponding equations for the intensity differences $I_1 - I_2$ and $I_3 - I_4$ are $$I_1 - I_2 = 2\iint_p (U_R U^*_B + U^*_R U_B) dx_3 dy_3 + \tag{24a}$$

$$2\iint_p (U_R U^*_S + U^*_R U_S) dx_3 dy_3,$$

$$I_3 - I_4 = j2\iint_p (U_R U^*_B - U^*_R U_B) dx_3 dy_3 + \tag{24b}$$

$$j2\iint_p (U_R U^*_S - U^*_R U_S) dx_3 dy_3,$$

where $I_p$ is defined by the equation $$I_p = I(\chi = \chi_p), \ \chi_1 = 0, \ \chi_2 = \pi, \ \chi_3 = \pi/2, \ \chi_4 = 3\pi/2. \tag{25}$$

The statistical errors for $\iint_p (U_R U_S^* + U_R^* U_S) dx_3 dy_3$ and $j\iint_p (U_R U_S^* - U_R^* U_S) dx_3 dy_3$ can be expresses as $$\frac{\sigma^2 \left[ \iint_p (U_R U_S^* + U_R^* U_S) dx_3 dy_3 \right]}{\iint_p |U_R|^2 dx_3 dy_3} = \tag{26a}$$

$$\frac{1}{2} + \frac{1}{2} \frac{\iint_p |U_B|^2 dx_3 dy_3}{\iint_p |U_R|^2 dx_3 dy_3} + \frac{1}{2} \frac{\iint_p |U_S|^2 dx_3 dy_3}{\iint_p |U_R|^2 dx_3 dy_3} +$$

$$\frac{1}{2} \frac{\sigma^2 \left[ \iint_p (U_R U_B^* + U_R^* U_B) dx_3 dy_3 \right]}{\iint_p |U_R|^2 dx_3 dy_3} +$$

$$\frac{1}{2} \frac{\sigma^2 \left[ \iint_p (U_S U_B^* + U_S^* U_B) dx_3 dy_3 \right]}{\iint_p |U_R|^2 dx_3 dy_3},$$

$$\frac{\sigma^2 \left[ j\iint_p (U_R U_S^* - U_R^* U_S) dx_3 dy_3 \right]}{\iint_p |U_R|^2 dx_3 dy_3} = \tag{26b}$$

$$\frac{1}{2} + \frac{1}{2} \frac{\iint_p |U_B|^2 dx_3 dy_3}{\iint_p |U_R|^2 dx_3 dy_3} + \frac{1}{2} \frac{\iint_p |U_S|^2 dx_3 dy_3}{\iint_p |U_R|^2 dx_3 dy_3} +$$

$$\frac{1}{2} \frac{\sigma^2 \left[ j\iint_p (U_R U_B^* - U_R^* U_B) dx_3 dy_3 \right]}{\iint_p |U_R|^2 dx_3 dy_3} +$$

$$\frac{1}{2} \frac{\sigma^2 \left[ \iint_p (U_S U_B^* + U_S^* U_B) dx_3 dy_3 \right]}{\iint_p |U_R|^2 dx_3 dy_3},$$

respectively. It has been assumed in the derivation of Eqs. (26a) and (26b) that $\sigma^2(\iint_p |U_R|^2 dx_3 dy_3) = \iint_p |U_R|^2 dx_3 dy_3$ and $\sigma^2(\iint_p |U_B|^2 dx_3 dy_3) = \iint_p |U_B|^2 dx_3 dy_3$, i.e. the statistical noise in the system is determined by the Poisson statistics of the number of photoemissive electrons detected and both $\iint_p |U_R|^2 dx_3 dy_3$ and $\iint_p |U_B|^2 dx_3 dy_3$ correspond to a large number of photoemissive electrons. For the case where $\iint_p |U_R|^2 dx_3 dy_3 \gg \iint_p |U_S|^2 dx_3 dy_3$ and $\iint_p |U_B|^2 dx_3 dy_3 \gg \iint_p |U_S|^2 dx_3 dy_3$, the terms on the right hand sides of Eqs. (26a) and (26b) which depend of $U_S$ can be neglected which leads to the simplified equations $$\frac{\sigma^2 \left[ \iint_p (U_R U_S^* + U_R^* U_S) dx_3 dy_3 \right]}{\iint_p |U_R|^2 dx_3 dy_3} = \tag{27a}$$

-continued $$\frac{1}{2} + \frac{1}{2} \frac{\iint_p |U_B|^2 dx_3 dy_3}{\iint_p |U_R|^2 dx_3 dy_3} +$$

$$\frac{1}{2} \frac{\sigma^2 \left[ \iint_p (U_R U_B^* + U_R^* U_B) dx_3 dy_3 \right]}{\iint_p |U_R|^2 dx_3 dy_3},$$

$$\frac{\sigma^2 \left[ j \iint_p (U_R U_S^* - U_R^* U_S) dx_3 dy_3 \right]}{\iint_p |U_R|^2 dx_3 dy_3} = \quad (27b)$$

$$\frac{1}{2} + \frac{1}{2} \frac{\iint_p |U_B|^2 dx_3 dy_3}{\iint_p |U_R|^2 dx_3 dy_3} +$$

$$\frac{1}{2} \frac{\sigma^2 \left[ j \iint_p (U_R U_B^* - U_R^* U_B) dx_3 dy_3 \right]}{\iint_p |U_R|^2 dx_3 dy_3}.$$

It is of value to note that the additional gain in the signal-to-noise ratios for $\iint_p (U_R U_S^* + U_R^* U_S) dx_3 dy_3$ and $j\iint_p (U_R U_S^* - U_R^* U_S) dx_3 dy_3$ obtained in going from $\iint_p |U_R|^2 dx_3 dy_3 = 2\iint_p |U_B|^2 dx_3 dy_3$ to $\iint_p |U_R|^2 dx_3 dy_3 >> \iint_p |U_B|^2 dx_3 dy_3$ is a factor of approximately (3/2). However, this latter gain is made at the expense of a considerable increase in the power of the source and in the required dynamic range of the signal processing electronics. Therefore, the optimum choice for $|U_R|$ will typically be with $$\iint_p |U_R|^2 dx_3 dy_3 \geq 2\iint_p |U_B|^2 dx_3 dy_3. \quad (28)$$

When the condition expressed by Eq. (28) is satisfied, the statistical errors given by Eqs. (27a) and (27b) are bounded as expressed in the following inequalities:

$$\frac{1}{2} < \frac{\sigma^2 \left[ \iint_p (U_R U_S^* + U_R^* U_S) dx_3 dy_3 \right]}{\iint_p |U_R|^2 dx_3 dy_3} \leq \frac{9}{8}, \quad (29a)$$

$$\frac{1}{2} < \frac{\sigma^2 \left[ \iint_p (U_R U_S^* - U_R^* U_S) dx_3 dy_3 \right]}{\iint_p |U_R|^2 dx_3 dy_3} \leq \frac{9}{8}. \quad (29b)$$

It is clearly evident on examination of Eqs. (26a) and (26b) or Eqs. (27a) and (27b) that apparatus embodying the present invention with its reduced background from out-of-focus images has intrinsically lower statistical errors for given operating values of $U_S$ and $U_R$ in relation to prior art confocal interference microscopy systems. Typically, the signal-to-noise ratios obtained when using apparatus embodying the present invention will be larger by a factor of $(3/2)^{1/2}$ over that obtained by a confocal interference microscope not employing the invention disclosed herein.

The interpretation of Eqs. (26a) and (26b), Eqs. (27a) and (27b), and Eqs. (29a) and (29b) is the following: it is possible with the invention disclosed herein to achieve from a set of four intensity measurements the components of the complex scattering amplitude such that for each independent position in the object, the statistical error for each of the components of the inferred complex scattering amplitude is typically within a factor of $(3/2)^{1/2}$ of the limiting statistical error fixed by the statistics of the complex scattering amplitude itself, and that the referred to statistical error can be achieved with lower operating power levels of the source and lower required dynamic range capacity in the signal processing electronics in relation to prior art confocal interference microscopes. The term independent position is used to mean that the associated sets of four measured intensities are statistically independent sets.

It may be possible to achieve the condition expressed by Eq. (28) for the first and second embodiments illustrated in FIGS. 1a–j and FIGS. 2a–d by reducing the transmission of phase shifter 24 so as to attenuate simultaneously the scattered probe beam and the out-of-focus image beam at the image plane 47. In order to obtain a given signal-to-noise ratio, this attenuation procedure may require the increase of the strength of the light source 10 as the attenuation at phase shifter 24 is increased. The alternative third and fourth embodiments of the invention illustrated in FIGS. 3a–j and FIGS. 4a–d permits the condition given by Eq. (28) to be satisfied by adjusting the transmission/reflection properties of beam splitters 100, 100a, and 100b relative to each other. When either the third or fourth embodiments are used to meet the condition expressed by Eq. (28), the light source 10 or 10a may in general be operated at lower power levels relative to that required by the above described attenuation procedure based on the reduction of transmission of beam splitter 24.

The equations for $U_S$, $U_B$, and $U_R$ appropriate for the alternative fifth and sixth embodiments can be obtained from the equations for the respective quantities for the first and second embodiments by multiplying the phasors by the respective factors listed in Table 1. Table 1 tabulates $R_i$ and $T_i$, the reflection and transmission coefficients, respectively, with i=1, 2, and 3 for the beam splitters 100, 100a, and 100b, respectively.

TABLE 1

| Amplitude | Multiplier |
|---|---|
| $U_S, U_B$ | $(T_2)^{1/2}$ |
| $U_R$ | $(R_2 R_3 T_3/R_1)^{1/2}$ |

Systematic Error Due To Out-Of-Focus Images

Eqs. (24a) and (24b) can be used in conjunction with measured values of $I_1-I_2$ and $I_3-I_4$ to obtain measurements of the real and imaginary parts of the phasor $U_S$ as long as $|U_R|$ is measured. This may be done with additional optical means and detector known to those skilled in the art. There remains the potential systematic error terms, $$\iint_p (U_R U_B^* + U_R^* U_B) dx_3 dy_3, \quad (30a)$$

$$\iint_p (U_R U_B^* - U_R^* U_B) dx_3 dy_3. \quad (30b)$$

These systematic error terms can be significant when $|U_B| >> |U_S|$. Consequently, it is desirable for the interference terms expressed by Eqs. (30a) and (30b) to be compensated to an acceptable level.

The compensation for the $\iint_p(U_R U_B{}^* + U_R{}^* U_B) dx_3 dy_3$ and terms in the invention disclosed herein requires in general much less in the way of computer processing than that required in prior art confocal interference microscopy. This is because the spatial properties of $U_B$ depend on the scattering properties of the three dimensional object 112 under examination and therefore on $U_S$ through an integral equation. These internal equations, Eqs. (24a) and (24b), are Fredholm integral equations of the second kind. The computer processing required to perform the inversion of the respective integral equations to obtain $U_S$ decreases when the $\iint_p(U_R U_B{}^* + U_R{}^* U_B) dx_3 dy_3$ and $\iint_p(U_R U_B{}^* - U_R{}^* U_B) dx_3 dy_3$ terms are reduced such as in apparatus which embodies the present invention. Generally, the rate of decrease in the required computer processing is faster then the rate of reduction of the $\iint_p(U_R U_B{}^* + U_R{}^* U_B) dx_3 dy_3$ and $\iint_p(U_R U_B{}^* - U_R{}^* U_B) dx_3 dy_3$ terms.

For those interferometric measurements where the mutual interference terms the $\iint_p(U_S U_B{}^* + U_S{}^*{}_{UB}) dx_3 dy_3$ term is not compensated in contrast to that in apparatus embodying the present invention, the integral equations corresponding to Eqs. (24a) and (24b) are nonlinear integral equations: they are integral equations that are second order in $U_S$. Nonlinear integral equations require in general considerably more sophistication in regards to the computer hardware and software for their solution than do linear integral equations. Thus, the transformation by apparatus embodying the present invention from working with a $\iint_p(U_S U_B{}^* + U_S U_B) dx_3 dy_3$ term to $\iint_p(U_R U_B{}^* + U_R{}^* U_B) dx_3 dy_3$ and $\iint_p(U_R U_B{}^* - U_R{}^* U_B) dx_3 dy_3$ terms represents an important feature of the invention in relation to prior art pinhole confocal microscopy.

Note also that the reduction of the systematic error due to the background signal $\iint_p |U_B|^2 dx_3 dy_3$ is complete in apparatus embodying the present invention in contrast to that achieved with the prior art pinhole confocal microscope.

Broadband Operation

One of the significant features of the invention is that the enhanced reduction of the effects of background from out-of-focus images is operative when source 10 is a broadband source. From system properties such as exhibited in Eq. (14), it is evident that a high sensitivity for $U_S(v_3)$ given by Eq. (12) is maintained for the in-focus image as long as the phase $(v_3-v_1)$ meets the condition that $$\sigma(v_3 - v_1) \leq \frac{\pi}{2m} \tag{31}$$

where $[\sigma(q)]^2$ is the variance of argument q.

Contributions to the signals for given values of $(v_3-v_1)$ have a hyperbolic correlation between $(x_3-x_1)/f$ and k, $(v_3-v_1)$ being proportional to $k(x_3-x_1)/f$. Therefore a restriction may be placed on k so that the corresponding allowed values of k and $(x_3-x_1)/f$ will permit Eq. (31) to be satisfied and an image to be obtained with the detector that will yield an improved signal-to-noise ratio (with respect to strength of in-focus signals relative to strength of out-of-focus signals). From Eq. (31), we obtain the relationship $$(kd_0)^2 \{\sigma[(x_3 - x_1)/f]\}^2 + \tag{32}$$

-continued $$(kd_0)^2 [(x_3 - x_1)/f]^2 \left(\frac{\sigma_k}{k}\right)^2 \leq \left(\frac{\pi}{2m}\right)^2.$$

Choosing to operate in a mode where each of the two terms on the left hand side of Eq. (32) contribute equally to the left side, we have $$(kd_0)\sigma[(x_3 - x_1)/f] \leq \frac{\pi}{2^{3/2}m} \tag{33}$$

and $$(kd_0)[(x_3 - x_1)/f]\left(\frac{\sigma_k}{k}\right) \leq \frac{\pi}{2^{3/2}m}. \tag{34}$$

An equation is obtained for $(\sigma_k/k)$ by combining Eq. (34) with the equation $$(v_3-v_1)=[kd_0(x_3-x_0)/f]=r\pi; \; r=1,3,\ldots \tag{35}$$

where $r\pi$ represents the subset of values of $(v_3-v_1)$ which give rise to peaks in the factor $$\left\{\frac{\sin[m(v_3 - v_1)]}{m\sin(v_3 - v_1)}\right\}. \tag{36}$$

The result is $$\left(\frac{\sigma_k}{k}\right) \leq \left(\frac{1}{2^{3/2}mr}\right). \tag{37}$$

It is evident from Eq. (37) that apparatus embodying the present invention is effective for relatively broadband operations in $\lambda$. For example, $(\sigma_k/k) \leq 0.35$ for m=1 and r=1 and $(\sigma_k/k) \leq 0.18$ for m=2 and r=1.

There is a limitation on the range of the values of r that may be affectively used. This limitation comes from consideration of signal-to-noise ratio. For each peak in the factor given by Eq. (36) that contributes to the observed signal, there is an improved signal strength. However, as the number of peaks included is increased and thus the maximum value of r, $r_{max}$, is increased, the bandwidth on k must be reduced according to Eq. (37).

There is also a restriction on the spacing between source pinholes when using Level 2 discrimination in either the second, fourth, or sixth embodiments of the present invention. This restriction can be obtained using an analysis similar to the type of analysis of the section on broadband operation. From system properties such as exhibited in Eq. (14), it is evident that a high sensitivity for $U_S(v_3)$ is maintained for the in-focus image as long as $$\delta v_1 \geq 4\pi \tag{38}$$

where $\delta v_1$ is the spacing between contiguous pinholes of the respective linear array source of pinholes.

Note that the right hand side of the constraints expressed by Eqs. (33) and (34) do not depend explicitly on $x_1$ or $y_1$. Thus, apparatus embodying the present invention is affective for point like sources with no intrinsic restriction on the range of values for $x_1$ and $y_1$.

Observing Through a Turbid Medium

Another significant feature of the invention disclosed herein is that the enhanced reduction of the effects of background from out-of-focus images can be operative when observing through a turbulent medium. The impulse response function $h_{A,M}$ for observing through a turbulent medium is $$h_{A,M} = h_A * h_M \tag{39}$$

where $h_A$ is the impulse response function for the apparatus when observing through non turbulent medium, $h_M$ is the impulse response function for the turbulent medium, and * denotes the convolution of $h_A$ and $h_M$. The Fourier transform of $h_A * h_M$ is $$\tilde{h}_{A,M} = \tilde{h}_A \tilde{h}_M \qquad (40)$$

where $\tilde{h}$ is the Fourier transform of $h$.

The impulse response function $h_M$ is very well represented by a Gaussian distribution $$h_M(v_l - v_m) = \frac{1}{\sqrt{2\pi}\sigma} \exp\left[ -\frac{(v_l - v_m)^2 + (w_l - w_m)^2}{2\sigma^2} \right] \qquad (41)$$

where $\sigma^2$ is the variance of $h_M$.

The Fourier transform of $h_M$ is given by $$\tilde{h}_M = \exp\left( -\frac{q \cdot q \sigma^2}{2} \right) \qquad (42)$$

where $q$ is the angular spatial frequency vector conjugate to $v$. The lowest frequency peak in $h_A$ is located at the frequency $$q = 2\pi(d_0/\lambda). \qquad (43)$$

It is apparent from Eqs. (40) and (42) that a relatively large value for $h_{A,M}$ is maintained at $q = (d_0/\lambda)$ when $$\tilde{h}_M \geq (1/e) \qquad (44)$$

or $$\frac{q \cdot q \sigma^2}{2} \leq 1. \qquad (45)$$

Using equations (43) and (45), it follows that the values of $d_0$ that can be used are constrained by the condition $$d_0 \leq \frac{\lambda}{\sqrt{2\pi}\sigma}. \qquad (46)$$

Thus, it is possible to configure the tomographic imaging system embodying the present invention to maintain a relatively high sensitivity for spatial frequencies below the cut off frequency imposed by $h_M$.

In accordance with the present invention it is recognized that for a reference beam amplitude of arbitrary spatial properties, the interference term between the amplitudes of the background light (i.e., the out-of-focus return probe beam) and the reference beam may dominate generation of undesired systematic errors and be important in generation of undesired statistical errors. The interference term between the amplitudes of the background light and the reference beam is reduced in the above embodiments of the invention because of the antisymmetric spatial properties produced in the reference beam by phase shifting. Since this interference term is reduced, it does not cause generation of unacceptably large systematic errors and statistical errors in data produced by the single pixel detector.

It is also recognized that the amplitude of the reference beam and the interference term between the reference beam and the in-focus return probe beam (i.e., the "desired signal") are correlated. The reference beam is detected as the square of the amplitude of the reference beam. The in-focus return probe beam is detected as the interference term between the return reference beam and the in-focus return probe beam, i.e., the amplitude of the in-focus return probe beam multiplied by the amplitude of the reference beam. The detected reference beam and the detected return probe beam therefore are correlated, because the amplitude of the reference beam is present in each. This correlation makes the determination of properties of the object material from such interference term more statistically accurate. Consequently, accurate characterization of the in-focus object material can be obtained from data produced by the single pixel detector in response to the interference term between the reference beam and the in-focus return probe beam. This is because the statistical accuracy is limited by the number of photoelectrons produced in the single pixel detector in response to the square of the amplitude of the in-focus probe beam, but not in response to either the square of the amplitude of the reference beam or the square of the amplitude of the out-of-focus return probe beam.

It will be further appreciated by those skilled in the art that alternative and/or additional optical elements and detectors may be incorporated into one of the disclosed embodiments of the present invention. For example, polarizing beam splitters alternatively may be used and or used with additional phase shifting elements to alter the properties of the radiation used to probe the object material. A further example would be the addition of a detector to monitor the intensity of the light source. These and other obvious modifications may be introduced without departing from the spirit and scope of the present invention.

It should also be appreciated that phase shifter 34 could be omitted for example in FIGS. 1a–j, in which case the image of point light source 8 produced at image point 38 in the in-focus image plane 37 will be different than described above although the image of point light source 8 produced by the reflected reference beam at image point 48 in the in-focus image plane 47 will not be altered substantially from that described above. Nonetheless, the above described cancellation of out-of-focus images would be achieved. Similarly, phase shifter 34 could be omitted in FIGS. 2a–d and phase shifters 34 and 34a could be omitted in FIGS. 3a–j and 4a–d.

It should also be appreciated that spatial configurations of the phase shifter elements of phase shifters 14, 24, 24a, 34, and 34a may be different from that described above and/or apodized as long as the spatial distribution of the amplitude of the reflected reference beam in the single pixel detector plane produces a substantially spatially antisymmetric distribution. However, the image data produced by the single pixel detector must be processed slightly differently for the above described embodiments of the invention to produce the desired tomographic image of the object material 112.

It should further be appreciated that the interferometers of the embodiments described above could be of the polarizing type, for example for the purpose of probing the object material 112 with polarized light or for increasing the throughput of light through the interferometer to the single or multipixel detector. However, an additional optical element such as a polarizing beam splitter will need to be added to the apparatus described above for the purpose of mixing the reflected reference beam and the scattered probe beam at the single or multipixel detector.

I claim:

1. A method for discriminating an in-focus image from an out-of-focus image so as to reduce statistical errors in a measurement of the in-focus image, comprising the steps of:

(a) producing a probe beam and a reference beam from a point source;

(b) producing antisymmetric spatial properties in the reference beam;

(c) producing an in-focus return probe beam by directing the probe beam into an in-focus image point;

(d) producing antisymmetric spatial properties in the in-focus return probe beam;

(e) interfering the reference beam with a beam from an out-of-focus image point;

(f) interfering the reference beam with the in-focus return probe beam;

(g) detecting
  i. the reference beam as a square of an amplitude of the reference beam and
  ii. the in-focus return probe beam as an interference term between a return reference beam and the in-focus return probe beam by means of a single-pixel detector, an amplitude of an interference term between an amplitude of the out-of-focus image beam and an amplitude of the return reference beam being substantially reduced and thereby reducing statistical errors in data produced by the single-pixel detector.

2. The method of claim 1 wherein the beam from the off-of-focus image point is an out-of-focus return probe beam.

3. The method of claim 1 wherein step (a) includes producing a plurality of probe beams and reference beams from a plurality of points, respectively, constituting a line light source, and step (d) includes detecting each of the reference beams and each of a plurality of corresponding in-focus return probe beams by means of a plurality of corresponding single-pixel detectors, respectively.

4. A method for discriminating an in-focus image from an out-of-focus image, comprising the steps of:

(a) shifting the phases of a plurality of portions of a beam produced from a point light source to produce an antisymmetric phase shifted first beam;

(b) splitting the phase shifted first beam into a reference beam and an antisymmetric probe beam;

(c) shifting the phases of a plurality of portions of the antisymmetric probe beam to produce a symmetric phase shifted probe beam;

(d) imaging the symmetric phase shifted probe beam into an in-focus point, object material at the in-focus point reflecting and/or scattering and/or transmitting the symmetric phase shifted beam to produce an in-focus symmetric return probe beam;

(e) shifting the phases of a plurality of portions of the in-focus symmetric return probe beam to produce a phase shifted in-focus antisymmetric return probe beam;

(f) imaging the reference beam onto a reference mirror in an in-focus image plane and reflecting it to produce a return reference beam;

(g) interfering the return reference beam with the phase shifted in-focus return probe beam to produce an interference beam representing object material at the in-focus point and imaging it onto an in-focus image point on a single detector pixel;

(h) a portion of the symmetric phase shifted probe beam being reflected and/or scattered and/or transmitted by object material at an out-of-focus image plane to produce an out-of-focus non-antisymmetric return probe beam; and (i) shifting the phases of a plurality of portions of the out-of-focus non-antisymmetric return probe beam to produce a phase shifted out-of-focus non-antisymmetric return probe beam, and interfering the phase shifted out-of-focus non-antisymmetric return probe beam with the return reference beam to cause cancellation of a substantial portion of the out-of-focus non-antisymmetric return probe beam at the single detector pixel to thereby substantially eliminate effects of out-of-focus light from the object material.

5. The method of claim 4 including performing the phase shifting recited in steps (e) and (i) by means of the same phase shifter.

6. The method of claim 4 including performing the phase shifting recited in steps (e) and (i) by means of different phase shifters.

7. The method of claim 4 including the steps of:

(a) shifting the phases of a plurality of portions of the reference beam to produce a symmetric reference beam;

(b) imaging the symmetric reference beam onto the reference mirror on an in-focus image plane and reflecting it to produce a symmetric return reference beam; and (c) shifting the phases of a plurality of portions of the symmetric return reference beam to produce a phase shifted antisymmetric return reference beam.

8. The method of claim 7 including measuring a first output signal produced by the single detector pixel, the first signal representing a first intensity.

9. The method of claim 8 including (1) shifting the phases of the plurality of portions of each of the reference beam and the return reference beam by a total of $\pi$ radians from an initial phase shift produced by means of a phase shifter and then measuring a second output signal produced by the single detector pixel, the second output signal representing a second intensity, and subtracting the second intensity from the first intensity to produce a measurement of a first component of the amplitude of the in-focus symmetric return probe beam with the effects of light of the out-of-focus non-antisymmetric return probe beam being substantially cancelled out;

(2) shifting the phases of the plurality of portions of each of the reference beam and the return reference beam by a total of $\pi/2$ radians from the initial phase shift and then measuring a third output signal produced by the single detector pixel, the third output signal representing a third intensity;

(3) shifting the phases of the plurality of portions of each of the reference beam and the symmetric return reference beam by a total of $3\pi/2$ radians from the initial phase shift and then measuring a fourth output signal produced by the single detector pixel, the fourth output signal representing a fourth intensity, and subtracting the fourth intensity from the third intensity to produce a measurement of a second component of the amplitude of the in-focus symmetric return probe beam with the effects of light of the out-of-focus non-antisymmetric return probe beam being substantially cancelled, the first and second components of the amplitude of the in-focus return probe beam together being representative of the complex amplitude of the in-focus symmetric return probe beam.

10. The method of claim 9 including performing steps (1) through (3) by means of a computer.

11. The method of claim 4 including mechanically translating the object material to allow steps (a) through (i) to be performed for another portion of the object material at the in-focus point.

12. The method of claim 9 including mechanically translating the object material to allow steps (a) through (i) to be performed for another portion of the object material at the in-focus point.

13. The method of claim 4 including producing the beam from a plurality of point light sources constituting a line light source, the method including performing steps (a) through (i) for each point light source and a corresponding single detector pixel, respectively.

14. A system for discriminating an in-focus image from an out-of-focus image, comprising in combination:

(a) a point light source producing a beam;

(b) a first phase shifter disposed in a path of the beam and adapted to shift the phases of a plurality of portions of the beam to produce an antisymmetric phase shifted first beam;

(c) a first splitter disposed in a path of the phase shifted first beam and splitting the phase shifted first beam into a reference beam and an antisymmetric probe beam;

(d) a second phase shifter disposed in a path of the antisymmetric probe beam operating to shift the phases of a plurality of portions of the antisymmetric probe beam to produce a symmetric phase shifted probe beam;

(e) a first optical imaging device disposed in a path of the symmetric phase shifted probe beam operating to image the symmetric phase shifted probe beam into an in-focus point, object material at the in-focus point reflecting and/or scattering and/or transmitting the symmetric phase shifted beam to produce an in-focus symmetric return probe beam;

(f) a phase shifter disposed in a path of the in-focus symmetric return probe beam operating to shift the phases of a plurality of portions of the in-focus symmetric return probe beam to produce a phase shifted in-focus antisymmetric return probe beam;

(g) a second optical imaging device disposed in a path of the reference beam operating to image the antisymmetric reference beam onto a reference mirror in an in-focus image plane and reflecting it to produce an return reference beam;

(h) a third optical imaging device interfering the return reference beam with the phase shifted in-focus antisymmetric return probe beam to produce an interference beam representing object material at the in-focus point and imaging the interference beam onto an image point on a single detector pixel;

(i) a portion of the symmetric phase shifted probe beam being reflected and/or scattered and/or transmitted by object material at an out-of-focus image plane to produce an out-of-focus return probe beam; and (j) the second phase shifter operating to shift the phases of a plurality of portions of the out-of-focus return probe beam to produce a phase shifted out-of-focus non-antisymmetric return probe beam, the third optical imaging system device interfering the phase shifted out-of-focus non-antisymmetric return probe beam with the in-focus return reference beam to cause cancellation of a substantial portion of the out-of-focus non-antisymmetric return probe beam at the single detector pixel to thereby substantially eliminate effects of out-of-focus light from the object material.

15. The system of claim 14 wherein the phase shifter disposed in the path of the in-focus symmetric return probe beam is the second phase shifter.

16. The system of claim 14 wherein the phase shifter disposed in the path of the in-focus symmetric return probe beam is a phase shifter other than the second phase shifter.

17. The system of claim 14 including:

(a) a third phase shifter disposed in the path of the reference beam operating to shift the phases of a plurality of portions of the reference beam to produce a symmetric reference beam;

(b) a second optical imaging device operating to image the symmetric reference beam onto the reference mirror on an in-focus image plane and reflecting it to produce a symmetric return reference beam; and (c) the third phase shifter operating to shift the phases of a plurality of portions of the symmetric return reference beam to produce a phase shifted antisymmetric return reference beam.

18. The system of claim 17 including a computing device measuring a first output signal produced by the single detector pixel, the first signal representing a first intensity.

19. The system of claim 18 including a phase shifting means disposed in the paths of the reference beam and the return reference beam for (1) shifting the phases of the plurality of portions of each of the reference beam and the return reference beam by a total of $\pi$ radians from an initial phase shift and then measuring a second output signal produced by the single detector pixel, the second output signal representing a second intensity, (2) shifting the phases of the plurality of portions of each of the reference beam and the return reference beam by a total of $\pi/2$ radians from the initial phase shift, and (3) shifting the phases of the plurality of portions of each of the reference beam and the symmetric return reference beam by a total of $3\pi/2$ radians from the initial phase shift.

20. The system of claim 19 including a computing means for (1) subtracting the second intensity from the first intensity to produce a measurement of a first component of the amplitude of the in-focus symmetric return probe beam with the effects of light of the out-of-focus non-antisymmetric return probe beam being substantially cancelled out, (2) measuring a third output signal produced by the single detector pixel, the third output signal representing a third intensity, and (3) measuring a fourth output signal produced by the single detector pixel, the fourth output signal representing a fourth intensity, and subtracting the fourth intensity from the third intensity to produce a measurement of a second component of the amplitude of the in-focus symmetric return probe beam with the effects of light of the out-of-focus non-antisymmetric return probe beam being substantially cancelled, the first and second components of the amplitude of the in-focus return probe beam together being representative of the complex amplitude of the in-focus symmetric return probe beam.

21. The system of claim 14 including a mechanical translator adapted to translate the object material to position another portion of the object material at the in-focus point.

22. The system of claim 20 including a mechanical translator coupled to the computing means and adapted to translate the object material to position another portion of the object material at the in-focus point.

23. The system of claim 14 wherein the beam is from one of a plurality of point light sources constituting a line light source, the system including a plurality of single detector pixels corresponding to each point light source, respectively.

24. A method for discriminating an in-focus image from an out-of-focus image, comprising the steps of:
(a) splitting a first beam into a reference beam and a probe beam;
(b) imaging the probe beam into an in-focus point, object material at the in-focus point transmitting the beam to produce an in-focus transmitted probe beam;
(c) shifting the phases of a plurality of portions of the in-focus transmitted probe beam to produce a phase shifted in-focus antisymmetric transmitted probe beam;
(d) imaging the reference beam onto an in-focus image point and transmitting it to produce a return reference beam;
(e) shifting the phases of a plurality of portions of the reference beam to produce a phase shifted antisymmetric reference beam;
(f) interfering the phase shifted antisymmetric return reference beam with the phase shifted in-focus antisymmetric probe beam to produce an interference beam representing object material at the in-focus point and imaging it onto an image point on a single detector pixel;
(g) a portion of the probe beam being transmitted by object material at an out-of-focus image point to produce an out-of-focus transmitted probe beam; and
(h) shifting the phases of a plurality of portions of the out-of-focus transmitted probe beam to produce a phase shifted out-of-focus non-antisymmetric transmitted probe beam, and interfering the phase shifted out-of-focus non-antisymmetric transmitted probe beam with the in-focus antisymmetric reference beam to cause cancellation of a substantial portion of the out-of-focus non-antisymmetric transmitted probe beam at the single detector pixel to thereby substantially eliminate effects of out-of-focus light from the object material.

25. A system for discriminating an in-focus image from an out-of-focus image, comprising in combination:
(a) a point light source producing a first beam;
(b) a first splitter disposed in a path of the first beam and splitting the first beam into a reference beam and a probe beam;
(c) a first optical imaging device imaging the probe beam into an in-focus point, wherein object material at the in-focus point transmits the beam to produce an in-focus transmitted probe beam;
(d) a first phase shifter disposed in a path of the in-focus transmitted probe beam operating to shift the phases of a plurality of portions of the in-focus transmitted probe beam to produce a phase shifted in-focus antisymmetric transmitted probe beam;
(e) a second optical imaging device imaging the reference beam onto an in-focus image point and transmitting it to produce a return reference beam;
(f) a second phase shifter disposed in a path of the reference beam operating to shift the phases of a plurality of portions of the reference beam to produce a phase shifted antisymmetric reference beam;
(g) a third optical imaging device operating to interfere the phase shifted antisymmetric return reference beam with the phase shifted in-focus antisymmetric probe beam to produce an interference beam representing object material at the in-focus point and imaging it onto an image point on a single detector pixel;
(h) a portion of the probe beam being transmitted by object material at an out-of-focus image point to produce an out-of-focus transmitted probe beam; and (i) the second phase shifter operating to shift the phases of a plurality of portions of the out-of-focus transmitted probe beam to produce a phase shifted out-of-focus non-antisymmetric transmitted probe beam, the third optical imaging device operating to interfere the phase shifted out-of-focus non-antisymmetric transmitted probe beam with the in-focus antisymmetric reference beam to cause cancellation of a substantial portion of the out-of-focus non-antisymmetric transmitted probe beam at the single detector pixel to thereby substantially eliminate effects of out-of-focus light from the object material.

26. A method for discriminating an in-focus image from an out-of-focus image, comprising the steps of:
(a) shifting the phases of a plurality of portions of a beam produced from a point light source to produce an antisymmetric phase shifted first beam such that if the antisymmetric phase shifted beam were brought to a focus in a plane, the amplitude distribution thereof in the plane would be antisymmetric about the center of an image at least along one axis in the plane;
(b) splitting the phase shifted first beam into an antisymmetric reference beam and an antisymmetric probe beam;
(c) shifting the phases of a plurality of portions of the antisymmetric probe beam to produce a symmetric phase shifted probe beam such that if the symmetric phase shifted probe beam were brought to a focus in a plane, the amplitude distribution thereof in the plane would be symmetric about the center of the image;
(d) imaging the symmetric phase shifted probe beam into an in-focus point, object material at the in-focus point reflecting and/or scattering the symmetric phase shifted beam to produce an in-focus nominally symmetric return probe beam;
(e) shifting the phases of a plurality of portions of the in-focus nominally symmetric return probe beam to produce a phase shifted in-focus nominally antisymmetric return probe beam;
(f) imaging the symmetric reference beam onto a reference mirror in an in-focus image plane and reflecting it to produce an in-focus antisymmetric return reference beam;
(g) interfering the phase shifted in-focus antisymmetric return reference beam with the phase shifted in-focus nominally antisymmetric return probe beam to produce an interference beam representing object material at the in-focus point and imaging it onto an in-focus image point on a single detector pixel;
(h) a portion of the symmetric phase shifted probe beam being reflected and/or scattered by object material at an out-of-focus point to produce an out-of-focus nominally symmetric return probe beam; and
(i) shifting the phases of a plurality of portions of the out-of-focus nominally symmetric return probe beam to produce a phase shifted out-of-focus non-antisymmetric return probe beam, and interfering the phase shifted out-of-focus non-antisymmetric return probe beam with the phase shifted in-focus antisymmetric return reference beam to cause cancellation of a substantial portion of the out-of-focus non-antisymmetric return probe beam at the single detector pixel to thereby substantially eliminate effects of out-of-focus light from the object material.

27. The method of claim 26 including measuring a first output signal produced by the single detector pixel, the first signal representing a first intensity.

28. The method of claim 27 including (1) shifting the phases of the plurality of portions of each of the antisymmetric reference beam and the phase shifted in-focus antisymmetric return reference beam by a total of $\pi$ radians from an initial phase shift produced by means of a phase shifter and then measuring a second output signal produced by the single detector pixel, the second output signal representing a second intensity, and subtracting the second intensity from the first intensity to produce a measurement of a first component of the amplitude of the in-focus symmetric return probe beam with the effects of light of the out-of-focus non-antisymmetric return probe beam being substantially cancelled out;

(2) shifting the phases of the plurality of portions of each of the antisymmetric reference beam and the phase shifted in-focus antisymmetric return reference beam by a total of $\pi/2$ radians from the initial phase shift and then measuring a third output signal produced by the single detector pixel, the third output signal representing a third intensity;

(3) shifting the phases of the plurality of portions of each of the antisymmetric reference beam and the phase shifted in-focus antisymmetric return reference beam by a total of $3\pi/2$ radians from the initial phase shift and then measuring a fourth output signal produced by the single detector pixel, the fourth output signal representing a fourth intensity, and subtracting the fourth intensity from the third intensity to produce a measurement of a second component of the amplitude of the in-focus symmetric return probe beam with the effects of light of the phase shifted out-of-focus non-antisymmetric return probe beam being substantially cancelled, the first and second components of the amplitude of the in-focus return probe beam together being representative of the complex amplitude of the in-focus symmetric return probe beam.

29. The method of claim 28 including performing steps (1) through (3) by means of a computer.

30. The method of claim 26 including mechanically translating the object material to allow steps (a) through (i) to be performed for another portion of the object material at the in-focus point.

31. The method of claim 28 including mechanically translating the object material to allow steps (a) through (i) to be performed for another portion of the object material at the in-focus point.

32. The method of claim 26 including producing the beam from a plurality of point light sources constituting a line light source, the method including performing steps (a) through (i) for each point light source and a corresponding single detector pixel, respectively.

33. A system for discriminating an in-focus image from an out-of-focus image, comprising in combination:

(a) a point light source producing a beam;

(b) a first phase shifter disposed in a path of the beam and adapted to shift the phases of a plurality of portions of the beam to produce an antisymmetric phase shifted first beam such that if the antisymmetric phase shifted beam were brought to a focus in a plane, the amplitude distribution thereof in the plane would be antisymmetric about the center of an image at least along one axis in the plane;

(c) a first splitter disposed in a path of the phase shifted first beam and splitting the phase shifted first beam into an antisymmetric reference beam and an antisymmetric probe beam;

(d) a second phase shifter disposed in a path of the antisymmetric probe beam operating to shift the phases of a plurality of portions of the antisymmetric probe beam to produce a symmetric phase shifted probe beam such that if the symmetric phase shifted probe beam were brought to a focus in a plane, the amplitude distribution thereof in the plane would be symmetric about the center of the image;

(e) a first optical imaging device disposed in a path of the symmetric phase shifted probe beam operating to image the symmetric phase shifted probe beam into an in-focus point, object material at the in-focus point reflecting and/or scattering and/or transmitting the symmetric phase shifted beam to produce an in-focus nominally symmetric return probe beam;

(f) a phase shifter disposed in a path of the in-focus nominally symmetric return probe beam operating to shift the phases of a plurality of portions of the in-focus nominally symmetric return probe beam to produce a phase shifted in-focus nominally antisymmetric return probe beam;

(g) a third phase shifter disposed in a path of the antisymmetric reference beam operating to shift the phases of a plurality of portions of the antisymmetric reference beam to produce a symmetric reference beam;

(h) a second optical imaging device disposed in a path of the symmetric reference beam operating to image the symmetric reference beam onto a reference mirror in an in-focus image plane and reflecting it to produce an in-focus symmetric return reference beam;

(i) the third phase shifter operating to shift the phases of a plurality of portions of the in-focus symmetric return reference beam to produce a phase shifted in-focus antisymmetric return reference beam;

(j) a third optical imaging device interfering the phase shifted in-focus antisymmetric return reference beam with the phase shifted in-focus nominally antisymmetric return probe beam to produce an interference beam representing object material at the in-focus point and imaging the interference beam onto an image point on a single detector pixel;

(k) a portion of the symmetric phase shifted probe beam being reflected and/or scattered by object material at an out-of-focus point to produce an out-of-focus nominally symmetric return probe beam; and (l) the second phase shifter operating to shift the phases of a plurality of portions of the out-of-focus nominally symmetric return probe beam to produce a phase shifted out-of-focus non-antisymmetric return probe beam, the third optical imaging system device interfering the phase shifted out-of-focus non-antisymmetric return probe beam with the phase shifted in-focus antisymmetric return reference beam to cause cancellation of a substantial portion of the out-of-focus non-antisymmetric return probe beam at the single detector pixel to thereby substantially eliminate effects of out-of-focus light from the object material.

34. The system of claim 33 including a computing device measuring a first output signal produced by the single detector pixel, the first signal representing a first intensity.

35. The system of claim 34 including a phase shifting means disposed in the paths of the reference beam and the return reference beam for (1) shifting the phases of the plurality of portions of each of the antisymmetric reference beam and the phase shifted in-focus antisymmetric return reference beam by a total of $\pi$ radians from an initial phase shift and then measuring a second output signal produced by the single detector pixel, the second output signal representing a second intensity, (2) shifting the phases of the plurality of portions of each of the antisymmetric reference beam and the phase shifted in-focus antisymmetric return reference beam by a total of $\pi/2$ radians from the initial phase shift, and (3) shifting the phases of the plurality of portions of each of the antisymmetric reference beam and the phase shifted in-focus antisymmetric return reference beam by a total of $3\pi/2$ radians from the initial phase shift.

36. The system of claim 35 including a computing means for (1) subtracting the second intensity from the first intensity to produce a measurement of a first component of the amplitude of the in-focus nominally symmetric return probe beam with the effects of light of the out-of-focus non-antisymmetric return probe beam being substantially cancelled out, (2) measuring a third output signal produced by the single detector pixel, the third output signal representing a third intensity, and (3) measuring a fourth output signal produced by the single detector pixel, the fourth output signal representing a fourth intensity, and subtracting the fourth intensity from the third intensity to produce a measurement of a second component of the amplitude of the in-focus nominally symmetric return probe beam with the effects of light of the phase shifted out-of-focus non-antisymmetric return probe beam being substantially cancelled, the first and second components of the amplitude of the in-focus return probe beam together being representative of the complex amplitude of the in-focus nominally symmetric return probe beam.

37. The system of claim 33 including a mechanical translator adapted to translate the object material to position another portion of the object material at the in-focus point.

38. The system of claim 36 including a mechanical translator coupled to the computing means and adapted to translate the object material to position another portion of the object material at the in-focus point.

39. The system of claim 33 wherein the beam is from one of a plurality of point light sources constituting a line light source, the system including a plurality of single detector pixels corresponding to each point light source, respectively.

* * * * *